US011650073B2

(12) United States Patent
Skupin

(10) Patent No.: US 11,650,073 B2
(45) Date of Patent: May 16, 2023

(54) KNOWLEDGE SPACE ANALYTICS

(71) Applicant: André Skupin, Lakeside, CA (US)

(72) Inventor: André Skupin, Lakeside, CA (US)

( * ) Notice: Subject to any disclaimer, the term of this patent is extended or adjusted under 35 U.S.C. 154(b) by 0 days.

(21) Appl. No.: 17/662,697

(22) Filed: May 10, 2022

(65) Prior Publication Data

US 2022/0357177 A1 Nov. 10, 2022

Related U.S. Application Data

(60) Provisional application No. 63/186,258, filed on May 10, 2021.

(51) Int. Cl.
| | |
|---|---|
| *G06N 5/04* | (2006.01) |
| *G01C 21/00* | (2006.01) |
| *G06N 5/022* | (2023.01) |
| *G06F 16/38* | (2019.01) |
| *G06K 9/62* | (2022.01) |
| *G06F 16/335* | (2019.01) |

(52) U.S. Cl.
CPC ....... *G01C 21/3804* (2020.08); *G06F 16/335* (2019.01); *G06F 16/38* (2019.01); *G06K 9/6215* (2013.01); *G06N 5/022* (2013.01); *G06N 5/04* (2013.01)

(58) Field of Classification Search
None
See application file for complete search history.

(56) References Cited

U.S. PATENT DOCUMENTS

| | | |
|---|---|---|
| 2010/0191773 A1 | 7/2010 | Stefik et al. |
| 2017/0228654 A1 | 8/2017 | Skupin et al. |
| 2019/0043348 A1 | 2/2019 | Eno et al. |
| 2019/0180327 A1 | 6/2019 | Balagopalan et al. |
| 2019/0317239 A1 | 10/2019 | Olsson et al. |

FOREIGN PATENT DOCUMENTS

| | | |
|---|---|---|
| WO | 2008036381 A2 | 3/2008 |
| WO | 2016057984 A1 | 4/2016 |

OTHER PUBLICATIONS

Coelho, Modeling the space of subcellular location patterns using images and other sources of information, CMU-CB-11-104, Doctoral thesis, 2011, pp. 1-140 (Year: 2011).*
Blair et al., Aggregated topic models for increasing social media topic coherence. Artificial Intelligence, 2020, 50, published online Jul. 10, 2019, 138-156.
Longley et al., Geographic Information Science and Systems, 4th Edition, Wiley, Mar. 2015, pp. 152-172.
Murdock and Allen, Visualization Techniques for Topic Model Checking, Proceedings of the Twenty-Ninth AAAI Conference on Artificial Intelligence, March 2015, pp. 4284-4285.

(Continued)

*Primary Examiner* — Wilbert L Starks
(74) *Attorney, Agent, or Firm* — MLO, a professional corp.

(57) ABSTRACT

Provided herein is topic modeling involving multiple topic models being combined to create high-dimensional knowledge reference systems, the creation of detailed, multi-scale base maps from large numbers of documents, and analytical operators that integrate reference systems and base maps to enable search, visualization, and analytics on text documents.

12 Claims, 29 Drawing Sheets

(56) References Cited

OTHER PUBLICATIONS

Shen et al., Topic Modeling Ensembles, IEEE International Conference on Data Mining, Dec. 2010, pp. 1031-1036.

Sievert and Shirley, LDAvis: A method for visualizing and interpreting topics, Proceedings of the Workshop on Interactive Language Learning, Visualization, and Interfaces, Jun. 2014, pp. 63-70, Baltimore, Maryland, USA: Association for Computational Linguistics.

Smith et al., Hierarchie: Interactive Visualization for Hierarchical Topic Models, Proceedings of the Workshop on Interactive Language Learning, Visualization, and Interfaces, Jun. 2014, pp. 71-78, Baltimore, MD: Association for Computational Linguistics.

International Search Report and Written Opinion dated Aug. 12, 2022 for PCT Patent Application No. PCT/IB2022/054300.

\* cited by examiner

*Tables 2a-2d. Ranking of topic weights drives clustering of base map elements. Scale level determines when a cluster that the base map element participates in is displayed, including its label.*

(a) Single-model base map; loadings ranked within model

|  | Dimensions: 3 | | |
|---|---|---|---|
|  | Model (topic count: 3) | | |
| Rank within Base Map Element | Rank 1 | Rank 2 | Rank 3 |
| Scale Level | Small | Medium | Large |

| Example | Rank 1 | Rank 2 | Rank 3 |
|---|---|---|---|
| Element 1 |  | Topic 3 | Topic 1 |
| Element 2 | Topic 2 | Topic 3 | Topic 1 |
| Element 3 |  | Topic 1 | Topic 3 |
| ... | | | |
| Element 5547 | Topic 2 | Topic 1 | Topic 3 |
| Element 5548 | Topic 2 | Topic 1 | Topic 3 |
| ... | | | |
| Element 9999 | Topic 1 | Topic 3 | Topic 2 |
| Element 10000 | Topic 1 | Topic 2 | Topic 3 |

(b) Multi-model base map; loadings ranked across models

|  | Dimensions: 9 | | | | | | | | |
|---|---|---|---|---|---|---|---|---|---|
|  | Model 1 | | | Model 2 | | | Model 3 | | |
| Rank within Base Map Element | 2 | 3 | 6 | 4 | 8 | 9 | 1 | 5 | 7 |
| Scale Level | Small | Medium | Large | Medium | Large | Large | Small | Medium | Large |

(c) Multi-granularity base map; loadings ranked within models

|  | Dimensions: 12 | | | | | | | | | | | |
|---|---|---|---|---|---|---|---|---|---|---|---|---|
|  | Model 1 - Coarse Detail | | | Model 2 - Medium Detail | | | | Model 3 - High Detail | | | | |
| Rank within Base Map Element | 1 | 2 | 3 | 1 | 2 | 3 | 4 | 1 | 2 | 3 | 4 | 5 |
| Scale Level | Small | --- | --- | Medium | --- | --- | --- | Large | --- | --- | --- | --- |

(d) Multi-domain base map; loadings ranked within models

|  | Dimensions: 9 | | | | | | | | |
|---|---|---|---|---|---|---|---|---|---|
|  | Model 1 - Domain 1 | | | Model 2 - Domain 2 | | | Model 3 - Domain 3 | | |
| Rank within Base Map Element | 1 | 2 | 3 | 1 | 2 | 3 | 1 | 2 | 3 |
| Scale Level | Small | Medium | Large | Small | Medium | Large | Small | Medium | Large |

FIG. 29

KNOWLEDGE SPACE ANALYTICS

CROSS-REFERENCE TO RELATED APPLICATIONS

This application claims the benefit of U.S. Provisional Application No. 63/186,258, filed May 10, 2021, and entitled "Systems and Methods for Knowledge Space Analytics," which is incorporated by reference herein in its entirety.

BACKGROUND

Contemporary society places increasing demands on people becoming knowledge workers who are able to fulfill diverse roles by ingesting and producing large numbers of knowledge artifacts in the course of everyday activities. Knowledge workers with varied disciplinary backgrounds—accustomed to speaking in the divergent languages of distinct domains—are challenged to find common ground as the basis for effective communication, collaboration, and shared understanding.

Geographic principles and technologies, from cartography to GIS and GPS, have long provided for an integrative role for varied disciplinary backgrounds. Thus, "geographic space" has become foundational for exploration, learning and informed decision-making in fields as diverse as urban planning, environmental protection, or national defense. This technology is grounded in the use of locational reference systems in which the location of any geographic phenomenon can be expressed. Standardized map projections are used to project these locations into a map space. Base maps, as carefully constructed inventories of geographic space, form unifying backdrops for thematic overlays and the monitoring of dynamic events.

In contrast, similarly integrative, operational, and visually engaging solutions are non-existent when it comes to "knowledge spaces." The visual, analytical and communicative capabilities that are taken for granted with geographic mapping are missing when one desires to represent actors, artifacts, and activities in a knowledge space. Thus, there are no platform technologies that allow integration of such capabilities into broader information technology solutions.

SUMMARY

In some embodiments, a system or method involves the following. Content of first text documents are received. Multiple topic models are trained based on the content of the first text documents. The multiple topic models are filtered and harmonized. Topic labeling is performed for the multiple topic models. Topic model inferencers are produced for the multiple topic models.

In some embodiments, reference system scores are created for second text documents based on the topic model inferencers. A base map model is trained using the reference system scores. The trained base map model is stored. A base map is visualized by using the trained base map model and the topic labels.

In some embodiments, a map server is used to serve the base map as a tile map service, web map service, or web feature service.

In some embodiments, the topic model inferencers are loaded. A base map model is loaded. The content of third text documents is accessed. A reference system API is provided. A base map API is provided.

In some embodiments, a database server stores the topic model inferencers, the third text documents, reference system scores, the base map model, and map scores.

In some embodiments, the reference system scores are computed by accessing the topic model inferencers and performing inferencing on the third text documents. The map scores are computed by accessing the base map model and the reference system scores.

In some embodiments, the base map API comprises using an application server to produce a query response to a text input. An overlay reference system score is produced by accessing the topic model inferencers and performing topic inference on a text string extracted from the text input. An overlay map score is produced by computing a similarity measure between the overlay reference system score and reference system scores associated with base map elements of the base map model. A response geometry is constructed using the overlay map score and a geometry of the base map elements.

In some embodiments, the response geometry is constructed by analyzing the overlay map score and utilizing the geometry of one or more of the base map elements to create point objects, line objects, area objects, or landscape objects.

In some embodiments, the reference system API uses an application server to respond to either a text-based query, a document-based query, or a map-based query, with a query response being produced using processes as follows. A query reference system score is determined. A similarity value is computed between the query reference system score and reference system scores stored by a database server. Document identifiers are retrieved for selected text documents from the third text documents whose similarity value compared to the query reference system score falls within user-definable upper and lower bounds. Document metadata is obtained by using the document identifiers to find the selected text documents stored by the database server. Document geometry is obtained by using document identifiers to find map scores for the selected text documents stored by the database server. The query response is constructed containing geometry information and metadata for the selected text documents.

In some embodiments, determining the query reference system score in response to the text-based query is as follows. A text string is extracted from the text-based query. The topic model inferencers are accessed. Topic inferencing is performed on the text string using the topic model inferencers.

In some embodiments, determining the query reference system score in response to the document-based query is as follows. A document identifier is extracted from the document-based query. The document identifier is used to find a document reference system score among the reference system scores stored by the database server. The found document reference system score is used as the query reference system score.

In some embodiments, determining the query reference system score in response to the map-based query is as follows. Query geometry is extracted from the map-based query. Spatial overlay is performed between the query geometry and a target geometry to find matching query targets. The matching query targets are used to find matching documents from among the documents stored by the database server.

In some embodiments, a set of query targets is identical to a set of the third text documents being queried and the spatial overlay between the query geometry and the target geometry directly identifies the matching documents.

In some embodiments, a set of query targets is not identical to a set of the third text documents being queried and a process for finding matching documents is as follows. The reference system scores of matched query targets are retrieved. The retrieved reference system scores are aggregated into the query reference system score.

In some embodiments, a set of query targets is not identical to a set of the third text documents being queried and a process for finding matching documents is as follows. One or more query objects is extracted from the map-based query. The spatial overlay is performed between each query object and the target geometry to find the matching query targets. For each matching query target, its target reference system score is retrieved. For each target reference system score, the similarity value to each of the reference system scores is computed, and documents are filtered within user-definable bounds of similarity. One local document set for each query object is formed by combining sets of documents associated with individual query targets through local logic operators and local numeric operators. A global document set is formed by combining the sets of documents associated with each local document set through global logic operators and global numeric operators. The global document set is transformed into the query response by retrieving geometry information and metadata for the selected text documents.

In some embodiments, the map-based query contains positive query objects and negative query objects that are combined using a process as follows. One or more of the positive query objects are extracted from the map-based query. One or more of the negative query objects are extracted from the map-based query. A positive global document set is created by using the positive query objects. A negative global document set is created by using the negative query objects. The global document set is formed by combining the positive global document set and the negative global document set through negative logic operators and negative numeric operators. The global document set is transformed into the query response by retrieving geometry information and metadata for documents.

In some embodiments, computing for each target reference system score the similarity to each of the reference system scores includes a look-up of target-to-document similarity, which includes accessing inverted map scores.

BRIEF DESCRIPTION OF THE DRAWINGS

FIG. 29 shows tables illustrating how base map models created from multiple topic models may support multiple means for generating and displaying clusters of map elements and their labels.

DETAILED DESCRIPTION

Systems and methods designed to support visual and computational analytics operations on domain knowledge spaces and document repositories are described herein. They encompass novel methods for preparing topic models for inference to accommodate a variety of domain definitions and scenarios and provide novel analytical operators for visual query overlays and search in knowledge spaces.

Figure 1:
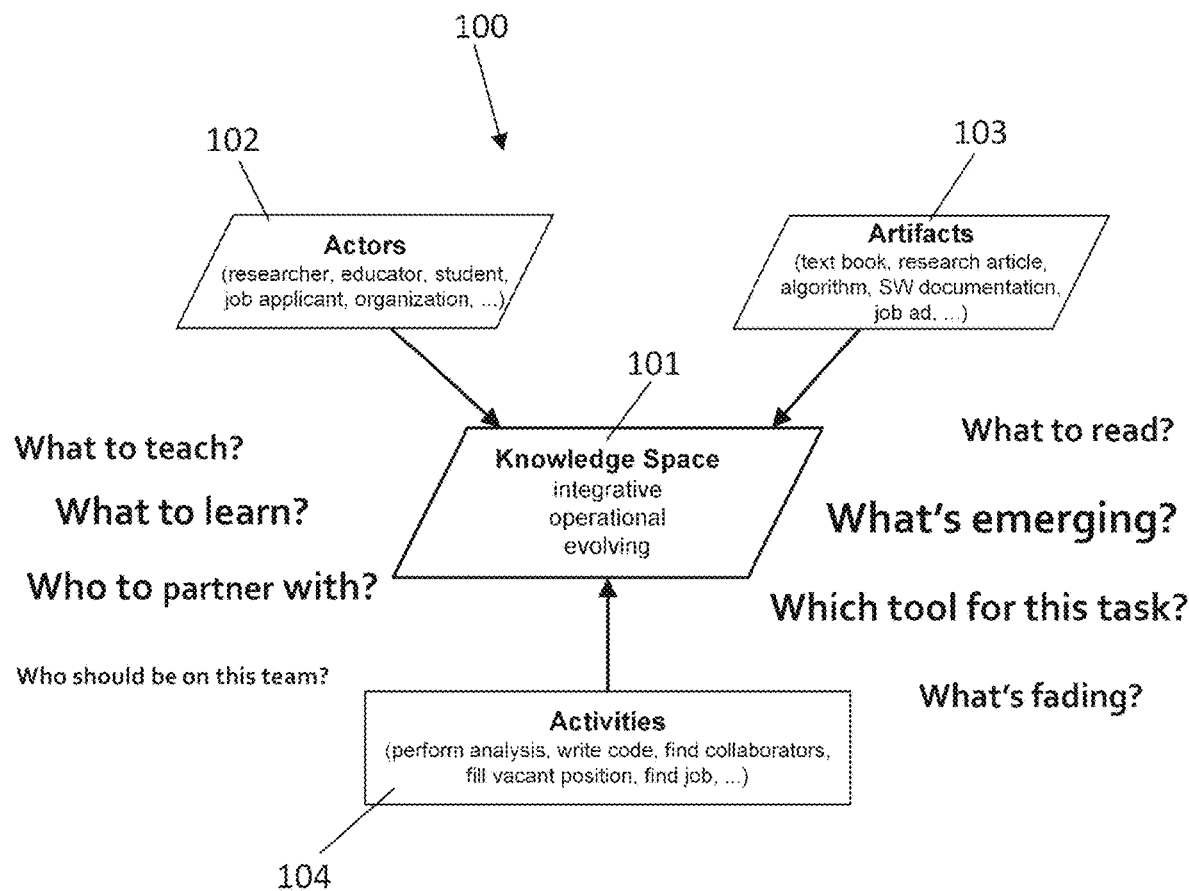
FIG. 1 is a diagram of a knowledge space integrating actors, artifacts, and activities of a knowledge ecosystem, in accordance with some embodiments.

An example knowledge ecosystem 100 is shown in FIG. 1 in which a knowledge space 101 integrates actors 102, artifacts 103, and activities 104 together, in accordance with some embodiments. Examples of the actors 102 may include researchers, educators, students, job applicants, an organization, among other people or entities in need of the systems and methods described herein. Examples of the artifacts 103 may include text books, research articles, algorithms, software documentation, a job advertisement, among other items (typically text based) that can be searched and organized by the systems and methods described herein. Examples of the activities 104 may include performing analyses, writing code, finding collaborators, filling a vacant job position, finding an open job position, among other actions that can produce results using the systems and methods described herein. The sort of questions answered or results achievable by the systems and methods described herein may be, for example, to determine what to teach, what to learn, who to partner with, who to put on a project team, what to read, what is emerging in a field, which tool is appropriate for a given task, what is fading from a particular field, among other possibilities. The knowledge space 101 provides integrative, operational and evolving capabilities for achieving such results.

In one general aspect, a method for construction of a knowledge reference system is disclosed. The method involves the combination of multiple topic models into to a unified, yet flexible, inference mechanism. Multiple topic models are combined that may emanate from the application of different algorithms or different parameters associated with algorithms, and may use different source documents or documents from different knowledge domains as inputs.

In another general aspect, methods are disclosed for performing inferencing that is driven by multiple topic models and for generating a base map. Topic model inferencing is generally performed on text documents, which generates for each document a high-dimensional reference system score that includes a numeric value being produced for each topic from among the multiple topic models. The reference system scores of documents are input to dimensionality reduction computation to produce a base map model. The base map model includes base map elements that each have a low-dimensional location in the map space and a reference system score. The base map model is transformed into a multi-scale base map by applying computational transformation of geometry and topology and applying symbolization. The base map is deployed on a map server and made accessible through several map services.

In another general aspect, methods are disclosed for computing and displaying map overlays in knowledge space, providing for any text string to become projected into and visualized in the map space. This involves topic model inference being applied to a text query, resulting in a reference system score. Then, computation of numeric similarity values between the overlay reference system score and the reference system scores of the base map element results in a map score, which includes a vector of similarity values. A map score is transformed into a visual overlay after applying filtering operations on the map score. Different methods are disclosed that are designed to produce different geometric representations of map scores, including as points, lines, areas, or landscapes. An application programming interface (API) is disclosed through which parameters for the production of map overlays of text strings are communicated to an application server. The application server produces a query response that includes detailed geometric information to allow display of query results in the map space.

In another general aspect, methods and systems are disclosed that provide for integration of text documents into the high-dimensional reference system and the map space, in order to support document search and exploration. A data base component is disclosed for storing model components and document representations in various forms. Stored model components may include topic model inferencers and base map models. Stored document representations may include text documents, inferred reference system scores for documents, map scores for documents, and inverted map scores for base map elements.

In another general aspect, methods are disclosed for computing and displaying the results of queries for documents. Depending on the input information associated with a query, different methods are disclosed for document-based, text-based, and map-based queries. A document-based query is a query that has as inputs one or more documents, whose stored reference system scores are used to search for other documents or artifacts with similar reference system scores. A text-based query is a query that has as an input a text string, to which topic model inference is applied, resulting in a query reference system score, which is used to search for documents or artifacts with similar reference system scores. A map-based query is a query that has as inputs one or more locations in the map space, which take the form of point, line, or area query geometry objects.

Map-based queries are executed by performing spatial overlay between query geometry and the geometry of query targets. In one embodiment of map-based queries, referred to as direct document targeting, the query targets and the documents being queried are identical, allowing the map query to involve spatial overlay between query geometry and the stored geometry of queried documents.

In a second embodiment of map-based queries, referred to as indirect document targeting, the query targets are either the base map elements stored in the base map model or other stored documents that have associated geometry information in the map space. In that embodiment, each of the query targets identified through spatial overlay has a reference system score associated with it. The similarity of the reference system scores of identified query targets to the reference system scores of query documents is the basis for ranking of documents in the query response, with documents ranked by similarity value. Methods are disclosed for how to combine information gathered from multiple query targets into the query response. In one embodiment, the reference system scores of multiple identified query targets are aggregated into a single reference system score for the query, and queried documents are then ranked according to the similarity of their reference system scores to that query reference system score. In another embodiment, the documents whose map scores indicate an association with identified query targets are grouped into sets, with sets delineated by individual query geometry objects. Each individual query geometry object delineates a local set of query targets. For each query target, a set of documents is determined based on the similarity between reference system scores of query targets and query documents, with application of a similarity threshold. Logic operators are applied to create a local set of documents from the sets of documents associated with individual query targets. Numeric operators are used to transform the similarity values of documents associated with multiple query targets into a single similarity value. As each local set of documents is associated with one query geometry object, a global set of documents is then created by applying a global logic operator to the local sets and a global numeric operator is applied to transform the similarity values of documents associated with multiple local sets into a single global similarity value for each document.

Methods are disclosed for using query geometry objects to drive negative selection, which specifies map regions from which selection of documents is not desired. Negative query objects are used either in conjunction with a negative logic operator to exclude documents from the global set of documents, or negative query objects can be used in conjunction with a negative numeric operator that negatively weighs documents appearing in the global set of documents.

Methods are disclosed that enable faster query execution by the use of inverted map scores. Whereas a map score is associated with a document and includes similarity values between that document and each base map element, an inverted map score is associated with a base map element and includes similarity values between that base map element and each document. Storage of inverted map scores allows fast look-up of documents whose reference system scores have high similarity to the reference system scores of base map elements.

1.1 Overview of System Architecture and Functionality

Figure 2:
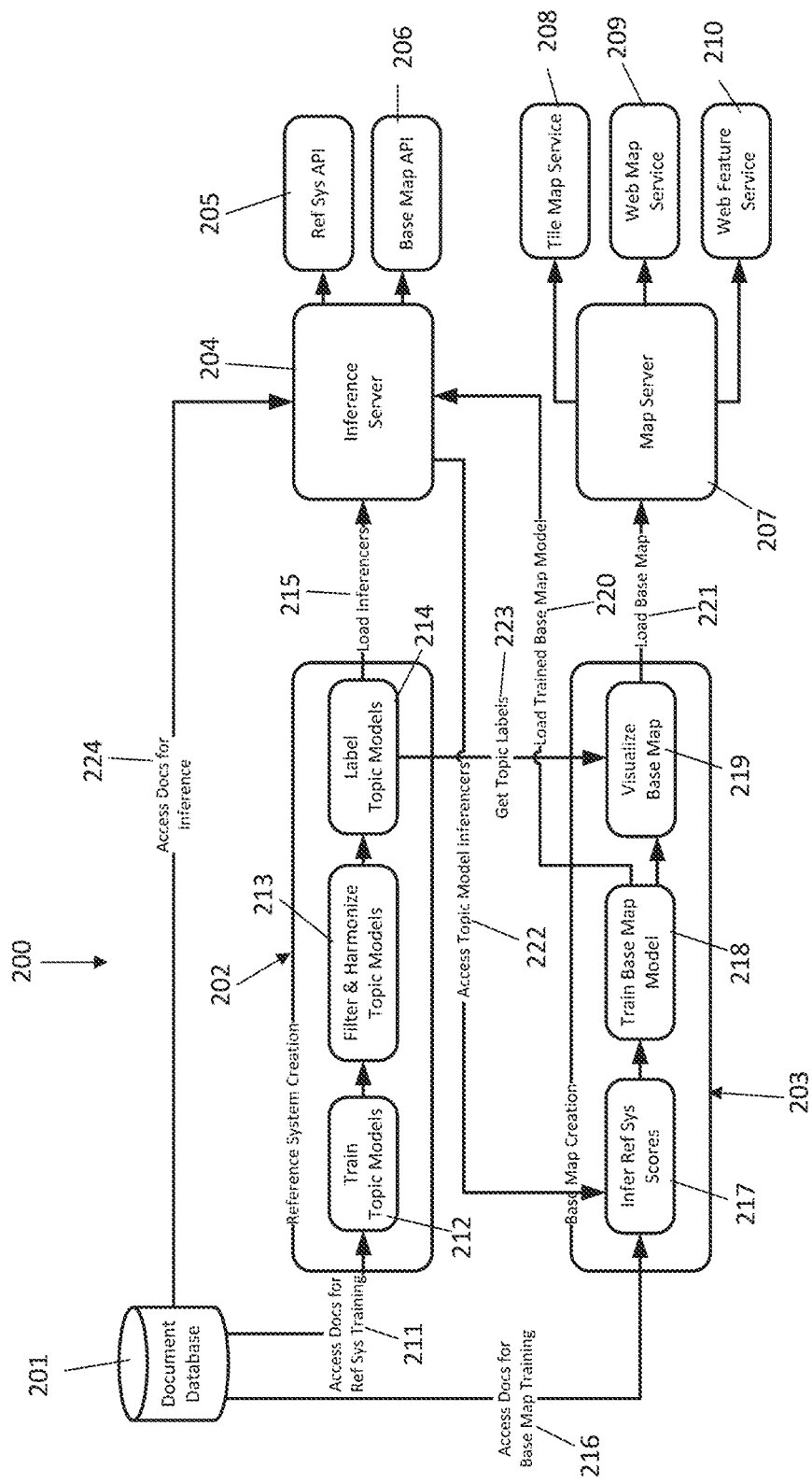
FIG. 2 is a flow chart showing an example process for the creation of a reference system and a base map and the provision of analytical functionality, in accordance with some embodiments of the present disclosure.

A process 200 in the flowchart of FIG. 2 illustrates a high-level function of components of the system disclosed herein. The particular steps, order of steps, and combination of steps is shown for explanatory purposes only. Other embodiments may use other steps or combinations of steps or in a different order to perform the same general functions. Additionally, one or more applications, routines and physical devices can perform the process 200.

Figure 3:
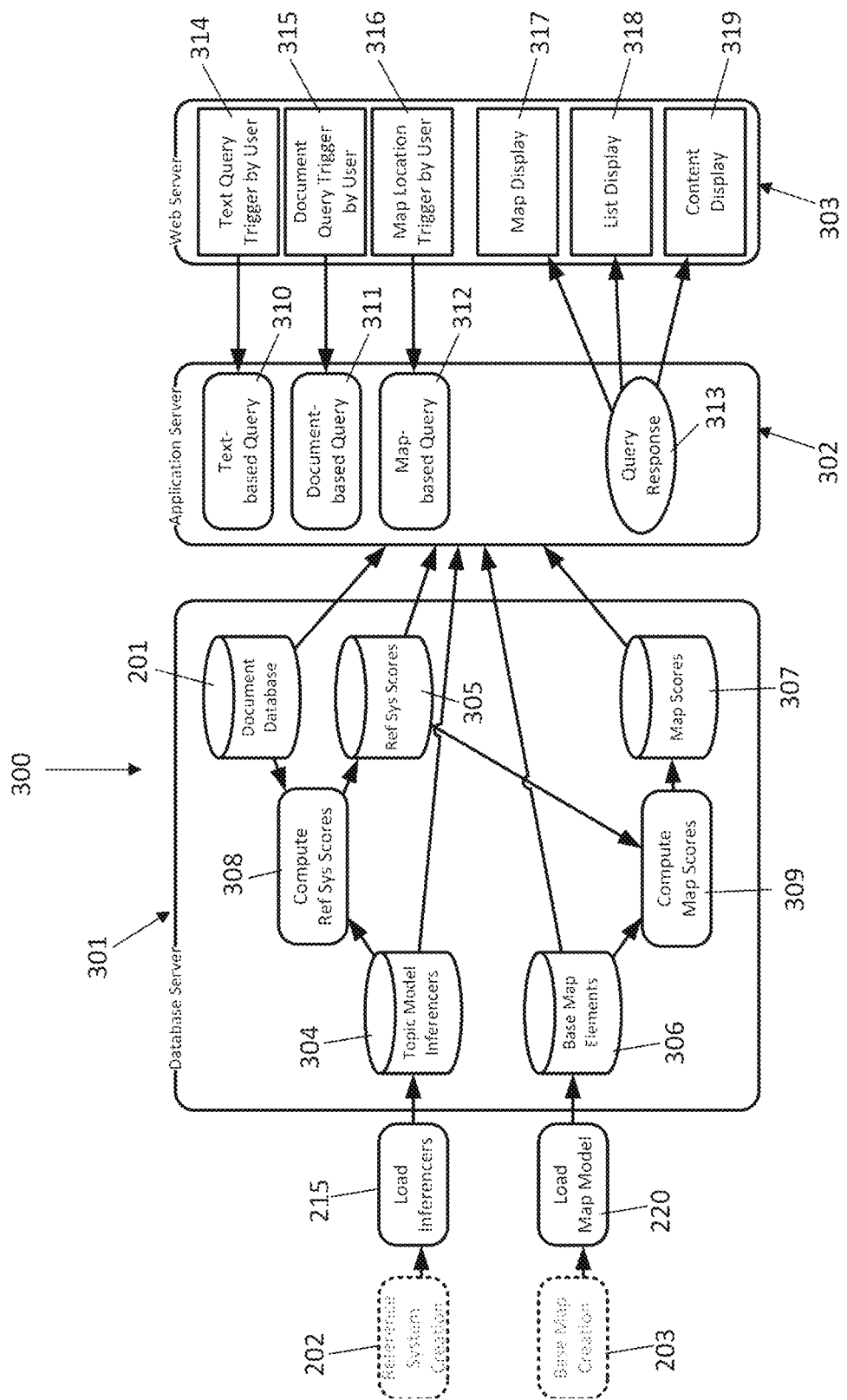
FIG. 3 is a flow chart showing an example process for implementing inference server functionality in accordance with an Inference Server component shown in FIG. 2, in accordance with some embodiments.

The part of the knowledge space analytics system that performs the process 200 disclosed herein includes several components, including (among other components described below):

- a document database component 201 (FIG. 2) that ingests, stores, and serves document data to be used in the system according to the process 200;
- a reference system creation component 202 (FIG. 2);
- a base map creation component 203 (FIG. 2);
- an inference server component 204 (FIG. 2; details shown in FIG. 3) that performs computations integrating base map, reference system and user inputs, accessible through application programming interfaces (Web APIs), including a reference system API 205 (FIG. 2) and a base map API 206 (FIG. 2); and
- a map server component 207 (FIG. 2) that serves base maps through industry-standard services 208, 209, 210 (FIG. 2).

The reference system creation component 202 generally accesses (at 211) documents in the document database component 201 for reference system training. The reference system creation component 202 generates or trains (at 212) one or more topic models from a large number of text documents accessed from the document database component 201. When multiple such topic models are trained and used simultaneously, they are filtered and harmonized (at 213) into a combined topic model representation and individual topic models are labeled (at 214). The output includes one or several topic model inferencers. The topic model inferencers are loaded (at 215), stored and made accessible by the inference server component 204 in order to allow computation of reference system scores for any text string. A reference system score includes a vector of n numeric weights, with n corresponding to the total number of topics.

The base map creation component 203 uses the one or several topic model inferencers produced by the reference system creation component 202 and accessed via the inference server component 204. Additionally, the base map creation component 203 accesses (at 216) documents for base map training from the document database component 201. It first performs topic inferencing to generate or infer (at 217) a reference system score for each of the large number of text documents accessed (at 216) and with respect to topic model inferencers accessed (at 222) from the inference server component 204. The documents to perform this inference on may be the same set of documents or a different set of documents from those accessed (at 211) by the reference system creation component 202 and used in topic model training (at 212). This topic inference operation (at 217) results in each input document becoming represented by an n-dimensional topic vector of numeric loadings over n topics, with the length n of the vector equal to the total number of topics.

Using the n-dimensional topic vectors as inputs, a base map model is then trained (at 218). A base map model includes base map elements, with each such element having associated with it an n-dimensional topic vector and data about the location of the base map element in a low-dimensional map space. Different dimensionality reduction algorithms may be used to populate a base map element's n-dimensional topic vector and low-dimensional map space location. Among these dimensionality reduction algorithms one can distinguish between entity-centered and model-centered techniques, of which multidimensional scaling (MDS) and self-organizing maps (SOM) are respective examples. In some embodiments, the low-dimensional space has two dimensions, e.g., for mapping on a flat two-dimensional surface. In other embodiments, the low-dimensional space has three dimensions for presenting three-dimensional locations (e.g., where the base map elements have some elevation value to form a 3-D surface to indicate patterns in in quantifiable attributes of base map elements, such as topical coherence, cluster coefficients, and strength of local neighborhood similarity).

The base map is then visualized (at 219) as derived from the trained base map model and the topic model labels received (at 223) from the reference system creation component 202. The resulting base map includes two main products: the trained base map model and, derived from it, the visualization of the base map. The trained base map model is loaded (at 220) to the inference server component 204 and used to perform base map inference in the inference server component 204. The visualization or visual appearance of the base map is generated through a series of geometric and semiotic transformations, leading to a multi-scale, zoomable visualization that is loaded (at 221) to, and hosted by, the map server component 207 in form of a tile map service 208, web map service 209, web feature service 210, or similar mechanism.

The inference server component 204 accesses (at 224) documents from the document database component 201, loads the topic model inferencers (at 215), and loads the trained base map model (at 220). As shown in a process 300 of FIG. 3, the core functionality of the inference server component 204 is provided by a database server 301 and an application server 302. The particular steps, order of steps, and combination of steps is shown for explanatory purposes only. Other embodiments may use other steps or combinations of steps or in a different order to perform the same general functions. Additionally, one or more applications, routines and physical devices can perform the process 300.

In addition to providing access from the document database component 201 to stored documents for inference, the database server 301 provides for storing of and access to topic model inferencers 304 (loaded at 215), reference system scores 305 for each document, base map elements 306, and map scores 307 (i.e., the reference system scores for the base map elements). The reference system scores 305 are computed (at 308) based on the topic model inferencers 304 with respect to the stored documents accessed (at 224) for inference from the document database component 201, with the resulting reference system scores 305 being stored by the database server 301. The inference server component 204 also provides for batch computation (at 309) of the map scores 307 based on the reference system scores 305 and the base map elements 306, with the resulting map scores 307 being stored by the database server 301.

Details of the application server 302 are described below with reference to FIGS. 15, 18, 19, 22, 23, 25, and 27. In general, the application server 302 operates in conjunction with a web server 303 (or other appropriate computerized device with which a user can trigger queries to the application server 302 and receive back a response) to receive and handle queries (e.g., test-based queries 310, document-based queries 311, and/or map-based queries 312) from the user and respond back to the user with query responses 313 containing selected text documents.

The web server 303 hosts a plurality of client-facing web applications. Each web application is accessible by a client computer system over a computer network. A client application may interact with a web application hosted by the web server 303. A client application may be a web browser that provides a client-side interface to a web application. Functionality provided in this manner generally includes a user interface through which the user can generate the queries and view the responses. For example, the user can enter text (at 314) to trigger a text-based query 310, enter or select a document (at 315) to trigger a document-based query 311, and/or select a map location (at 316) to trigger a map-based query 312. Upon receiving the query response 313, the web server 303 displays each part of the response, such as the zoomable map (map display 317), a list of relevant documents (list display 318), and the content of one or more of the documents (content display 319).

1.2 Reference System Creation

This section describes the system components and methods to accomplish the creation of knowledge reference systems (e.g., at 202) from a large number of text documents. The reference system creation component 202 takes inspiration from the foundational role played by locational reference systems in simultaneously driving geographic base maps and the analytical components of geographic information systems (GIS). Whereas geographic coordinate systems (e.g., latitude/longitude) are based on centuries of observation and measurement of geographic space by geodesists and surveyors, the present systems and methods are performing observation and measurement of knowledge spaces by means of topic models that distill patterns of domain language from large numbers of text documents. These models, like the abstract latitude/longitude coordinate system, then lead a separate existence from the sources used to create them and can be used to make inferences about other text documents or text objects.

Akin to global positioning systems (GPS) being able to infer the location of an object in the geographic coordinate system, topic models can infer the location of a text object in the knowledge reference system, with that location taking the form of an n-dimensional vector of inferred topic loadings. The length n of that vector corresponds to the number of topics for which loadings are inferred. This n-dimensional vector is referred to as a reference system score. Among the distinguishing marks of the present disclosure are novel forms of topic models can be multi-scale (i.e., involving multiple component models of varying granularity) and multi-domain (i.e., involving component models for different knowledge domains).

1.2.1 Current State of Topic Modeling

Currently, the application of topic modeling tends to be based on creating a single topic model, typically with significant efforts required in determining an appropriate number of topics, eliminating junk topics, and labeling topics. Once optimized and, through topic labeling, made interpretable, that single model is then used for inference, i.e., to determine for an input text the relative loading of each topic. In topic modeling, a loading refers to an inferred quantitative measure of the degree to which input text relates to a particular topic. For a topic model that includes n topics, inference performed on an input text results in n loadings. Some of these loadings will have higher quantitative values than others, indicating a stronger association of corresponding topics with the input text.

In deployment, topic models tend to be used for black box inference, are rarely visualized and, more broadly, are rarely central to the visualization of knowledge spaces. When topic models are visualized it is most commonly in the process of model creation and optimization, where visualization can help to understand, modify, and filter model results, such as in looking for the right number of topics to use or in eliminating junk topics (e.g., as in Murdock, et al. (2015) and Sievert, et al. (2014)). (Murdock, et al. (2015) (Murdock, J., & Allen, C. (2015), Visualization Techniques for Topic Model Checking, *Proceedings of the Twenty-Ninth AAAI Conference on Artificial Intelligence*, (pp. 4284-4285)) is incorporated herein by reference.) (Sievert, et al. (2014) (Sievert, C., & Shirley, K. E. (2014), LDAvis: A method for visualizing and interpreting topics, *Proceedings of the Workshop on Interactive Language Learning, Visualization, and Interfaces* (pp. 63-70), Baltimore, Md., USA: Association for Computational Linguistics) is incorporated herein by reference.)

However, it is rare that the visualization of topic model results as such is an operational goal and central to how end users will ultimately utilize and interact with the model. A notable exception is the proposed use of topic models in a process and system for highly interactive, map-like visualization of a knowledge space represented by a topic model (e.g., as in U.S. patent application Ser. No. 15/502,764).

The systems, methods, and processes described next represent several significant advances, with a focus on moving beyond the use of single topic models towards multiple models being combined in order to enable inference and analytics capabilities that have not been previously articulated.

A further advance lies in the disclosed ability to utilize in the creation of a base map any dimensionality reduction method and process that takes high-dimensional vectors as input. Examples for such methods and processes include self-organizing maps (SOM), principal components analysis (PCA), multidimensional scaling (MDS), Isomap, and t-distributed stochastic neighbor embedding (t-SNE).

1.2.2 Multi-Model Topic Representations

This section discloses novel means for moving beyond the creation and use of a single topic model, towards the combination of multiple topic models. Compared to proposed solutions for aggregation of multiple topic models, such as Zhiyong et al (2010) or Blair et al (2020), motivations for the present invention are quite different and consequently so are the specific methods. Current approaches are commonly driven by their stated goal of creating a single, optimized model. Instead, the disclosed solution is driven by the goal of simultaneously supporting zoomable visualizations (i.e., multi-scale) that may be driven by knowledge artifacts gathered across multiple domains (i.e., multi-domain). This translates into very different methods, as compared to a narrow range of topic model granularity (i.e., number of topics) in the aggregated models (e.g., as in Blair et al (2020)) or composing of ensembles of topic models trained with subsets of the same source data (e.g., as in Zhiyong et al (2010)). (Zhiyong et al (2010) (Zhiyong, S., Ping, L., Yang, S., & Shen, X. (2010), Topic Modeling Ensembles, *IEEE International Conference on Data Mining*, (pp. 1031-1036)) is incorporated herein by reference.) (Blair et al (2020) (Blair, S. J., Bi, Y., & Mulvenna, M. D. (2020), Aggregated topic models for increasing social media topic coherence, *Artificial Intelligence*, 50, 138-156) is incorporated herein by reference.)

1.2.2.1 Multi-Model Sources

A goal here is to combine results of multiple topic models into a single inference mechanism, driven by the ultimate goal of supporting zoomable visualization and novel forms of visual analytics on knowledge spaces. There are different options for accomplishing that with different ends. Three main types of topic model combination are distinguished:

1. Topic models that use different algorithms and/or parameters in executing those algorithms;
2. Topic models that are built from different source documents; and
3. Topic models that are built from different source domains.

Next, these three options are explained.

1.2.2.1.1 Option 1: Different Algorithms and/or Parameters

Figure 4:
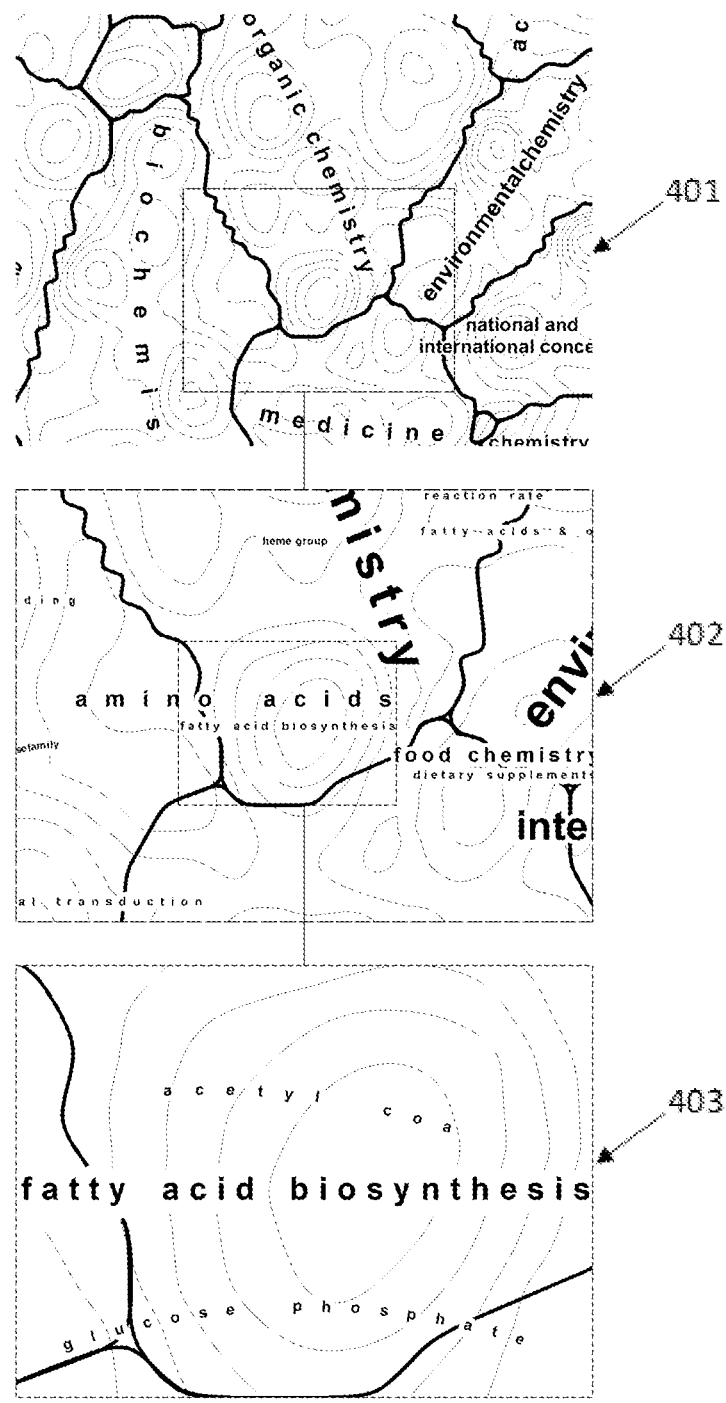
FIG. 4 is an image of an example multi-scale, zoomable visualization of a base map, in accordance with some embodiments of the disclosure.

The same source data or data representing the same knowledge domain are modeled, with the main differentiation being the use of different topic model algorithms and/or the use of different model parameters. A particularly illustrative example is the combination of models with different number of topics, i.e., topic models having different granularity. For example, a topic model that includes 10 topics could be combined with a topic model that includes 50 topics and another topic model that includes 200 topics. In other words, the resulting combined model in this example may include up to 260 topics. An advantage of such a combined, multi-granularity model lies in effectively supporting a multi-scale representation, from coarser to finer scales. While this is in seeming contradiction to the state-of-the-art in topic modeling—with its focus on a single, perfectly tuned model—the departure of the present disclosure from the prescribed methods is especially advantageous for generating scalable visualizations, where the display at low zoom level is driven by coarser topic models, while a high zoom level exposes finer topic models. FIG. 4 shows an example of three zoom levels in a base map of the knowledge domain of chemistry, starting with an overview highly zoomed-out level that reveals broad concepts of the knowledge domain (e.g., "organic chemistry" bordering "biochemistry" and "medicine", as in top panel at 401), followed by intermediate zoom level revealing intermediate level domain concepts (e.g., "amino acids", as in middle panel at 402) and a detailed highly zoomed-in level (bottom panel at 403) that focuses on intermediate concepts (e.g., the "fatty acid biosynthesis" region) and reveals related detailed concepts (e.g., "glucose phosphate" and "acetyl coa"). Each of these zoom levels 401-403 is based on the overall base map for the domain of chemistry, and it is possible to zoom into and out of the overall base map to the zoom levels 401-403 shown, e.g., by receiving input commands from a user's manipulation of a scroll wheel of a computer mouse or a selection of a "+" or "−" option or a pinch zoom control on a touchscreen device or other suitable mechanism as can be done for a conventional zoomable computerized geographic map.

1.2.2.1.2 Option 2: Different Source Documents

Another option is to combine topic models that were created from multiple source documents, even substantially different source documents, such as from different corpora. With the domain of computing technology as an example, an example of three topic models derived therefrom may be:

(1) topic model derived from published patent applications and granted patents,
(2) topic model derived from scientific publications and trade journals, and
(3) topic model derived from company-internal strategy papers, marketing materials and technical documentation.

These three models could be created by different personnel, at different times, and for different purposes, such as the patent model being created to enable semantic search for R&D purposes and the company-internal model created for strategic alignment and knowledge management purposes. Upon combining these individual topic models, a unified knowledge reference system emerges, via which any internal and external knowledge-based activities of the company and its competitors can be integrated.

1.2.2.1.3 Option 3: Different Source Domains

The notion of knowledge domains is very useful for making distinctions among the myriads of knowledge-based activities that an organization or an individual are engaged in. However, there are many circumstances in which a particular activity draws on concepts and documents that related to more than one domain. For example, a company engaged in the development and distribution of software to predict the phenotype of an unknown biological agent based on genotype analysis simultaneously operates in and needs awareness of the domains of biology, software engineering, and data science, but also business management. For some subsets of these, a coherent domain intersection may already exist—like bioinformatics at the intersection of biology and informatics—but at other times a more fitting approach will be to mix topic models for different domains post factum. Moreover, even for a domain like bioinformatics, a topic model specifically generated from the bioinformatics literature will tend to represent the two parent domains with insufficient level of detail as compared to a combination of two models, one for biology, the other for informatics.

1.2.2.2 Methods for Combining Topic Models
1.2.2.2.1 Pre-Inference Join It is possible to combine multiple topic models into a single model, by merging the representation of topic-term/phrase associations that is internal to each model. That has the distinct advantage that, when deployed, only a single inference operation is necessary (an inference being the determination of the topic loadings for some text input), which will be faster than running multiple inferences, one for each model.

Figure 5:
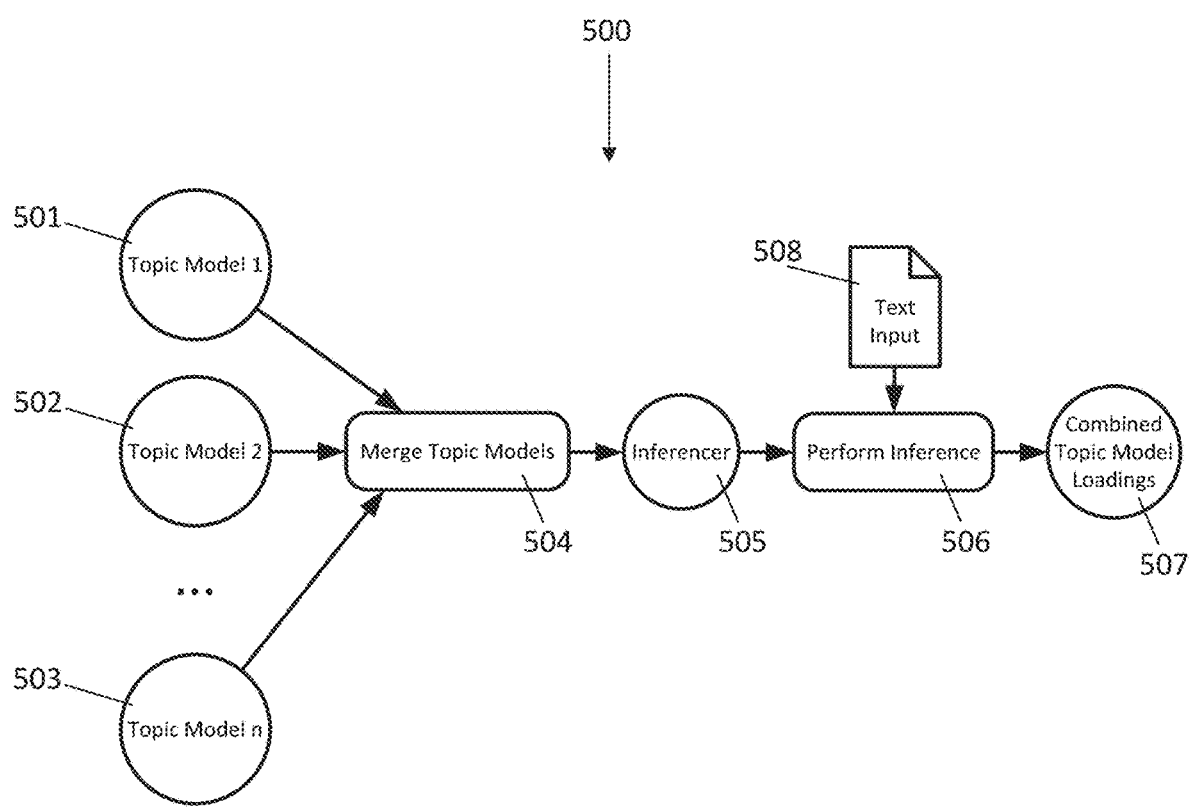
FIG. 5 is a flow chart showing an example process for implementing a pre-inference merging of topic models in accordance with a reference system creation component of FIG. 2, in accordance with some embodiments.

An example process 500 is shown in the flowchart of FIG. 5 for implementing a pre-inference merging of topic models, in accordance with some embodiments. The particular steps, order of steps, and combination of steps is shown for explanatory purposes only. Other embodiments may use other steps or combinations of steps or in a different order to perform the same general functions. Additionally, one or more applications, routines and physical devices can perform the process 500.

Any appropriate or desired number n of topic models can be joined or merged by this process 500. However, for the illustrated example, only three topic models 501, 502, 503 are shown. At 504, the topic models 501-503 are merged or combined. After 504, an inferencer 505 is generated from the combined multi-topic model. The inferencer may be a binary file that allows inferring topic model loadings for a given text input in accordance with the topic model from which the inference is generated. At 506, the inferencer 505 is used to perform an inference operation on the text input 508 to produce combined topic model loadings 507. Text input 508 may be provided at 224 from the document database 201 or provided at 310 from a text query trigger 314 or provided at 311 from a document trigger at 315.

In practice, the combining of multiple models into a single model at 504 is technically more challenging than keeping them separate—including for inference—partly due to the fact that the underlying vocabularies of two different models will tend to NOT be completely distinct. Further, when dealing with a very large number of individual topic models as input (501-503 being only an example that happens to involve three topic models), it may become a combinatorial challenge to combine all of them into the range of possible multi-models, as opposed to performing on-the-fly combination post-inference. Most importantly, while interpretability of individual topics is always a key challenge in deploying topic models, this is presumably even more difficult when the associations of terms/phrases and topics expressed in individual models are merged, such that mixed topics come about that are even harder to label/interpret. For all those reasons, although pre-inference joining is possible, in the system described here, the post-inference joining of models is the preferred choice.

1.2.2.2.2 Post-Inference Join

An alternative to working with a single, combined model is to maintain separate models, each performing separate inferences, but combining the result of such inferences afterwards. An example would be the concatenation of the vectors of topic loadings produced by different topic model inferencers. A key advantage is modularization of models and inferencers. One advantage is that a user of the system can then maintain topic models separately, such as performing updates and integration of streaming data sources, tasks that would be more challenging in pre-inference joined models. Another advantage lies in keeping inferencers separate, which allows for more modular deployment and access. For example, the computational load of inferencing can be distributed, with inferencers running on different servers or in different containers.

Figure 6:
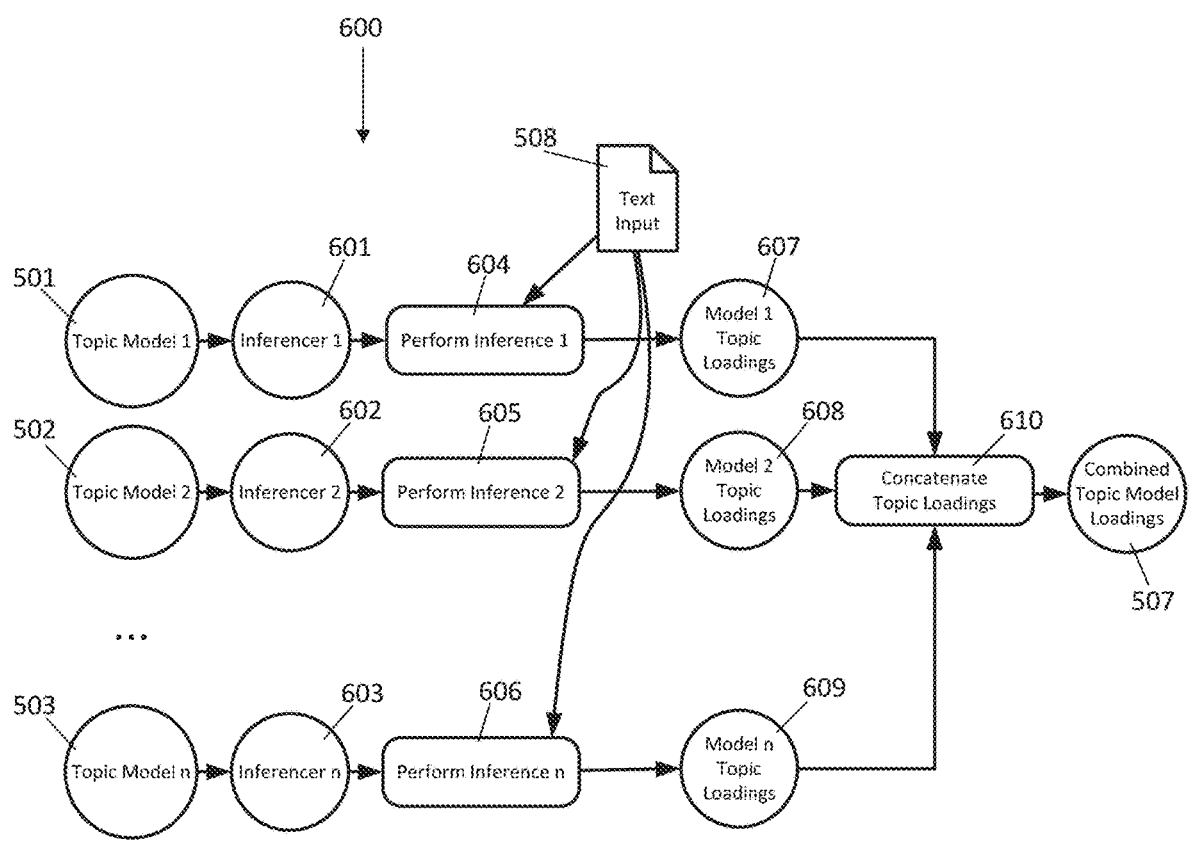
FIG. 6 is a flow chart showing an example process for implementing a post-inference concatenation of topic model inferences in accordance with the reference system creation component of FIG. 2, in accordance with some embodiments.

An example process 600 is shown in the flowchart of FIG. 6 for implementing a post-inference concatenation of topic model inferences, in accordance with some embodiments. The particular steps, order of steps, and combination of steps is shown for explanatory purposes only. Other embodiments may use other steps or combinations of steps or in a different order to perform the same general functions. Additionally, one or more applications, routines and physical devices can perform the process 600.

As for the process 500, any appropriate or desired number n of topic models can be joined or merged by this process 600. However, for the illustrated example, only the three topic models 501, 502, 503 are shown again. The topic models 501, 502 and 503 are used to generate inferencers 601, 602 and 603, respectively. At 604, 605 and 606, the inferencers 601, 602 and 603 are used to perform inference operations on the text input 508, producing individual vectors of topic loadings 607, 608 and 609. Text input 508 may be provided at 224 from the document database 201 or provided at 310 from a text query trigger 314 or provided at 311 from a document trigger at 315. At 610, the individual topic model loadings 607, 608 and 609 are combined (e.g., by concatenating them together) to form the combined topic model loadings 507.

With a web service architecture, for example, these different inferencers could be kept completely separate and just called upon with simple web API calls. For example, a call to http://localhost:8080/bokscore/services/score?modelid=tm1&input=Data%20Science would return an array of numeric topic loadings for the input string "Data Science" with respect to topic model "tm1". The length of the array would be equal to the number of topics in that topic model. Additionally, a REST (Representational State Transfer) service call to http://localhost:8080/bokscore/services/score?modelid=tm2&input=Data%20Science would return an array of numeric topic loadings for the input string "Data Science" with respect to topic model "tm2". The length of that array would be equal to the number of topics in that topic model. There would be as many web API calls as there are separate topic models. The resulting arrays would be concatenated to yield a combined array of topic loadings, whose length is equal to the sum of the number of topics in all input models. (The URLs in this disclosure are provided as examples for explanatory purposes only and are not active hyperlinks.)

An alternative to that level of disaggregation is to allow a single API call, in response to which separate inferences are made for each of the component topic models, with the results concatenated on the server and returned as an array of concatenated topic loadings. For example, a single call to http://localhost:8080/bokscore/services/score?input=Data%20Science would, on the server, trigger as many inferences as there are topic models accessed by the server. The results of those inference calls would then be concatenated and returned.

In this manner it is also possible to combine multiple composite topic models. This becomes simply a process of repeated concatenation of topic loadings, until all inferences on all component models and respective topics are performed and concatenated. For example, inference on a multi-granularity model of the domain of data science including four different models (with 10, 50, 100, and 500 topics, respectively) could be combined with inference on a multi-granularity model of the domain of management consulting (with 5, 20, 100, and 250 topics) to yield a concatenated inferred array of topic loadings with length 1,035.

Whether generated through (1) pre-inference merging of multiple topic models, (2) post-inference concatenation of topic loadings produced with different topic models, or (3) mixtures thereof, the resulting vectors of aggregate topic loadings can be used in the proposed system in many different ways, including but not limited to:

a) serving as input vectors for dimensionality reduction, for example in the training of a base map model 218,
b) allowing to represent a query or a document in order to project it into a low-dimensional space, such as a two-dimensional lattice of the neurons of a self-organizing map,
c) allowing similarity computations among text queries, documents, and synthetic objects, such as the neurons of a self-organizing map.

1.2.3 Multi-Model Harmonization

No matter how topic models are combined—for example through pre-inference or post-inference combination—a fair amount of harmonization is necessary, especially when models were created independently of each other, by different users, in different domains, from different input data, or at different granularity (i.e., different number of topics).

This is different from and in addition to the traditional task in topic modeling of eliminating so-called junk topics or stop topics. Such topics tend to be of a syntactic or procedural nature, with little in the way of semantic distinction in the domain space of interest. Those junk or stop topics can be either (a) ignored post-inference, such as being skipped in similarity computations, or (b) directly removed from the topic model altogether, and the model then used for inference. Alternatively, the terms and phrases most strongly associated with stop topics can become stop words and stop phrases that are then removed from the text inputs prior to further model training or otherwise ignored during model training (e.g., as in U.S. patent application Ser. No. 15/502,764).

In generating merged or combined topic models, an important challenge is the occurrence of duplicate topics. By the nature of topic modeling algorithms, like latent Dirichlet allocation (LDA), this is not a problem when training or using an individual model. However, duplication and near-duplication will tend to occur when merging multiple, separately generated models (Table 1). Table 1 illustrates this duplication with topics extracted from two different topic models: a coarser one that includes 500 topics and a finer one that includes 2500 topics. Judging by the rank-ordering of top phrases and terms, the topics #1 and #2 are so similar that they can be judged to be duplicates. Consequently, topic #2 can be deleted from the 2,500-topic model, resulting in 2,499 remaining topics. Topics #3 and #4 are very similar as well, so that topic #4 can be deleted, then resulting in 2,498 remaining topics in the finer model, etc. Topics are generally eliminated from finer-granularity models when they are duplicates of topics in coarser-granularity models (e.g., 2,500 versus 500 topics).

Other topics the user will typically want to eliminate include general topics (#5, #6). At finer levels, here illustrated with the 2,500-topic model, the user also encounters heterogenous topics (#7, #8). Some of these are very narrow (#7), driven by a very small number of documents (or sometimes even a single document) that happen to cover a broad range of issues, for example, reflecting a mix of methods and application domains. Heterogeneous topics can also be driven by sources whose actual subject matter is diverse and not inherently related, but happen to use similar language. An example is the ambiguous language surrounding "training" in an educational versus machine learning context in topic #8. Heterogenous topics, like #7 and #8, amount to a kind of overfitting that would be deleterious for model performance.

The effect of eliminating stop topics, general topics, duplicate topics, and heterogeneous topics on model size and performance can be dramatic, especially at fine granularity. In an example, in harmonizing the merging of 10-topic, 25-topic, 100-topic, 500-topic, and 2,500-topic models of the Data Science & Analytics domain, the number of topics was reduced to 9, 23, 84, 390, and 1,097, respectively. This resulted in a total dimensionality of 1,603 instead of the original 3,135.

TABLE 1

Detection of duplicate, general, and heterogeneous topics in multi-model harmonization.

| Topic # | Total Model Granularity | Top Phrases (rank-ordered) | Top Terms (rank-ordered) | Label \| Decision |
|---|---|---|---|---|
| 1 | 500 topics | cognitive psychology, cognitive processes, human cognition, mental processes, human behavior | cognitive psychology behavior perception human mental theory cognition behavioral processes | cognitive psychology |
| 2 | 2500 topics | cognitive psychology, cognitive psychologists, cognition, developmental psychology | cognitive psychology cognition theories psychologists thought mind psychologist thinking developmental | DUPLICATE → DELETE |
| 3 | 500 topics | confidence interval, confidence intervals, credible intervals, confidence bands | interval confidence intervals probability distribution parameter uncertainty coverage estimate range | confidence interval |
| 4 | 2500 topics | confidence interval, confidence intervals, credible intervals, coverage | interval confidence intervals coverage lies credible pivotal endpoints fiducial | DUPLICATE → DELETE |
| 5 | 500 topics | early, early work, history of early, early history, modern | early work modern history popular late started today began limited | GENERAL → DELETE |
| 6 | 2500 topics | began, history, history of early, early history, began early | began history early public moved widespread earliest renamed occurred wanted | GENERAL & DUPLICATE → DELETE |
| 7 | 2500 topics | gaze estimation, gaze estimation accuracy, hidden layer, marker calibration, error compensation | gaze accuracy equation svm calibration estimation error layer experimental load | HETEROGENEOUS (narrow sources) → DELETE |
| 8 | 2500 topics | training, learner, topics, letter, manual | training learner topics letter manual overfits multi-layer preferentially mini-batches high-order | HETEROGENEOUS (diverse sources) → DELETE |

1.3 Base Map Creation and Deployment
1.3.1 Base Map Creation

As illustrated in FIG. 2, the base map creation process (at 203) includes three main elements: inference on documents to create reference system scores (at 217), training of the base map model (at 218), and visualization of the base map (at 219).

1.3.1.1 Infer Reference System Scores

With the reference system created (at 202), in the form of one or several topic model inferencers, the system can then compute (at 217) for any text string a set of n topic loadings, with n corresponding to the total number of topics. That vector of n topic loadings represents a reference system score. For example, in the case of the Data Science & Analytics domain discussed above, inferences on one text string, produced by five harmonized topic model inferencers would yield 1,603 topic loadings. If such inference is performed for a large number of documents, a large number of 1,603-dimensional vectors of numeric topic loadings could thus be generated, each vector representing the reference system score for one document.

1.3.1.2 Train Base Map Model

The creation of a low-dimensional base map model (i.e., train a base map model at 218) involves a process of dimensionality reduction (DR) through which base map elements are generated that have an associated list of n weights (i.e. a reference system score) and low-dimensional locator information (i.e. geometry). Two types of dimensionality reduction techniques can be distinguished, namely entity-centered and model-centered techniques, of which the latter are better suited for base map creation and advanced knowledge space analytics:

(1) entity-centered techniques: Discrete entities (e.g., documents) are represented in the high-dimensional input space (i.e., high-dimensional vector representations) and the process of dimensionality reduction generates a low-dimensional representation of those same entities. For example, each document initially represented as a vector of n topic loadings could in the process of dimensionality reduction become represented as a point location (x,y) in a two-dimensional space. Techniques in this group include PCA, MDS, Isomap, and t-SNE. Characteristic to these techniques is that they result in point geometries, with the space in between points remaining ill-defined.

(2) model-centered techniques: While discrete entities, represented in high-dimensional space as reference system vectors, are used as input, the primary output here is a low-dimensional model that exists independently from those discrete entities and can be used as such. One example is the self-organizing map (SOM) technique, which arranges neurons as a low-dimensional lattice. Applying this technique to an n-dimensional input space, each neuron becomes associated with its own n-dimensional vector or score and a low-dimensional location. For any given n-dimensional input entity, it is thus possible to first compute similarities to all n-dimensional neuron vectors, then determine the best-matching neuron, typically the most similar neuron, then retrieve the low-dimensional location of that best-matching neuron and assign that location to the input entity. The finished base map can thus act as a backdrop for data that were not part of the training process. In conjunction with a representation of neurons as either points or areas in common vector geometry data models, it also becomes possible to implement various novel analytical operations that revolve around neurons acting as explicit connectors between n-dimensional and low-dimensional spaces.

The base map model (trained at 218) takes the form of a collection of a large number of base map elements, each representing a small portion of the high-dimensional space. Examples for base map model elements are the neurons of a self-organizing map (SOM) or the point features that are output from a multidimensional scaling (MDS) computation. For each such base map element, these properties are recorded: element identifier, locator information, and a reference system score.. Locator information may take the form of absolute coordinates (e.g., x, y) or relative location (e.g., row ID and column ID for regularly spaced locations). This base map model is input to the visualization of the base map (at 219) and is also passed or loaded (at 220) to the inference server 204 and stored on database server 301 as the base map elements 306.

Given the two goals of supporting (1) full base map functionality and (2) a full range of analytical operations, model-centered techniques (like SOM) are preferable for base map creation and are the focus of embodiments of the present disclosure disclosed here. However, it would be possible to generate a base map model from the results of entity-centered techniques (PCA, MDS, etc.), by treating the projected entities as the equivalent of the output of model-centered techniques and formatting them as such. These would then be passed to the base map visualization (at 219) and to the inference server 204. While the present disclosure foresees and enables this, it is an inferior approach as compared to the model-centered approach, for several reasons. First, the n weights associated with a particular entity (i.e., document) are solely derived from the actual text content of that entity, making them susceptible to any entity-specific idiosyncrasies that do not correspond to actual patterns in the overall knowledge space. A model-centered approach, by comparison, uses input documents in a training mechanism that accentuates patterns found in multiple documents. Second, an entity-centered base map model is lacking control over the resolution of the base map, which refers to the amount of detail that is displayed or that the user can discern and the computational resources required. For example, a base map built from 1,000,000 entities will cause a dramatically larger computational load than one built from 100,000 entities. On the other hand, a model-centered base map model that includes 10,000 elements (e.g., 10,000 neurons of a SOM) is likely to be able to represent the patterns contained in 1,000,000 entities in useful detail, but at much lower computational cost.

1.3.13 Visualize Base Map

The base map model created at 218 and the topic labels created at 214, together with simple metadata (702) containing the number of individual topics included in each of the topic models that make up a multi-topic model, contains everything needed to visually depict the base map. U.S. patent application Ser. No. 15/502,764 discloses many advantages of using cartographic principles and GIS technology with a base map, including the ability to perform various layering and analysis in one display space, enabled by a common locational reference system, map projections, and flexible data models. The present disclosure differs from U.S. patent application Ser. No. 15/502,764 in several substantial aspects. With respect to how the base map is constructed and visualized, the combination of multiple topic models disclosed here (at 500 and 600) leads to a very different approach to the formation of clusters in the display space, specifically in the computation of topic weights for base map elements (at 707) and the computation of topic ranks for base map elements (at 708). (U.S. patent application Ser. No. 15/502,764, filed Oct. 10, 2015, is incorporated herein by reference.)

The field of GIS has long known that a given geographic feature may be simultaneously represented by multiple geometric structures in a database. For example, the city of San Diego may alternatively be represented as a polygon feature or a point feature or subsumed in other features (e.g., within California, the United States, or North America). There will even exist multiple versions of polygon representations of the same city, each reflecting different levels of cartographic generalization to fit the map purpose and scale/zoom level. The present disclosure takes inspiration from the success of these multi-scale geographic representations in the design of multi-scale visualizations of knowledge spaces.

Figure 7:
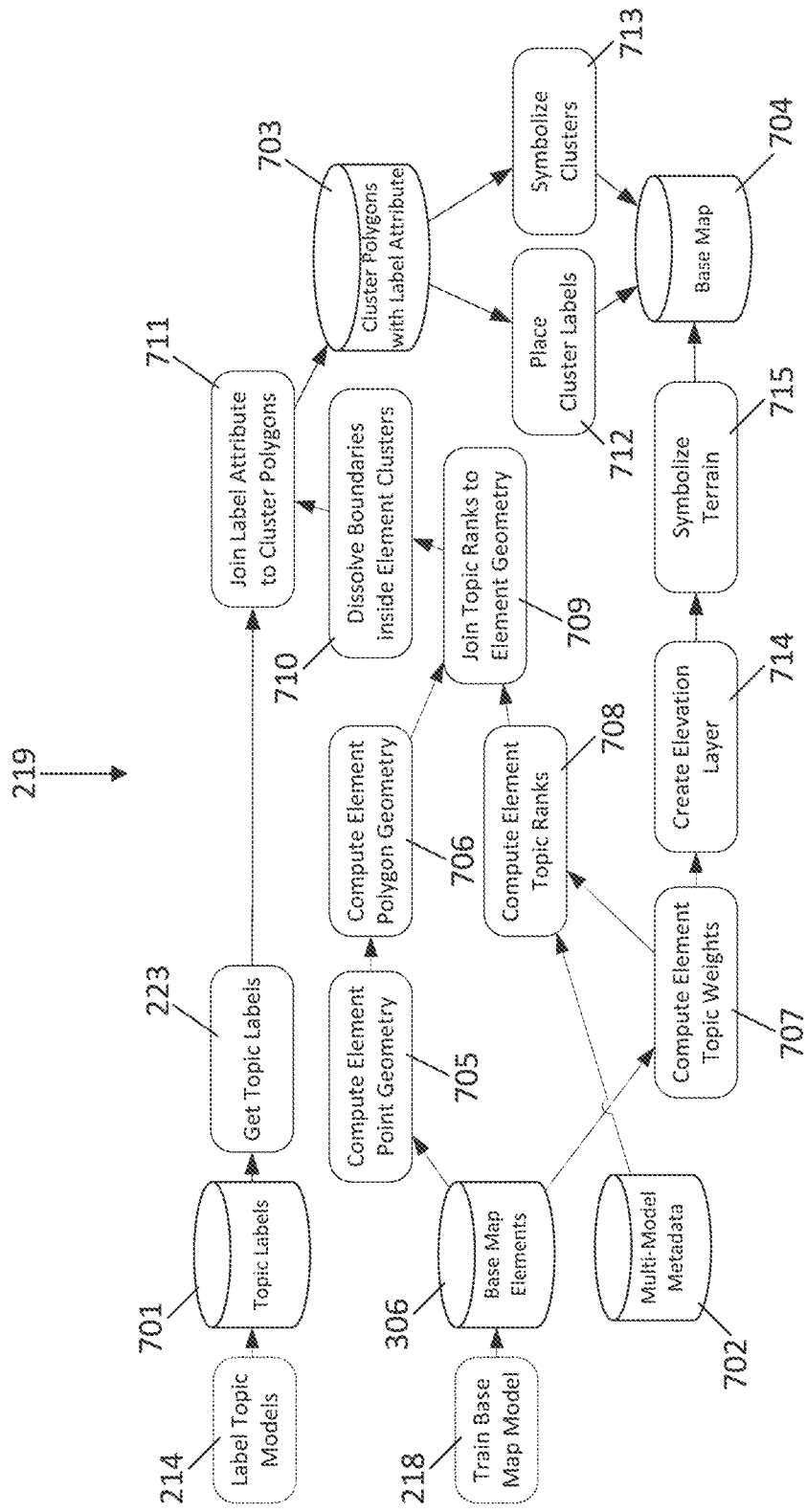
FIG. 7 is a flow chart showing an example process for constructing a visualized base map in accordance with a visualize base map component of FIG. 2, in accordance with some embodiments.

An example is shown in the flowchart of FIG. 7 for the process for constructing a visualized base map (i.e., the base map visualization at 219) of FIG. 2, in accordance with some embodiments. The base map visualization process 219 produces the base map 704 based on the labeled topic models 701 produced at 214 and the base map elements 306 produced at 218 and multi-model metadata 702 about the multi-topic model. The particular steps, order of steps, and combination of steps is shown for explanatory purposes only. Other embodiments may use other steps or combinations of steps or in a different order to perform the same general functions. Additionally, one or more applications, routines and physical devices can perform the process 219.

Based on the base map elements 306 and depending on the specific locator information stored with base map elements, further geometric information may be computed for base map elements at 705 and 706. For example, if the geometry information stored for base map elements 306 does not contain point geometry, then point geometry may be computed (at 705) for each base map element. After 705, if base map elements do not contain polygon geometry, then polygon geometry is generated (at 706) for each element. An example is the generation of Voronoi regions or Thiessen polygons from point geometry. Additionally, based on the base map elements 306, topic weights are computed (at 707) for each element. After 707, based on the topic weights and the multi-model metadata 702, topic ranks are computed (at 708) for each element. The rank of a topic for a given base map element computed (at 708) is dependent on the weight or numeric value of the topic in consideration of all weights or numeric values of topics for the base map element and information received from the multi-model metadata 702. In some embodiments, this may involve ranking of topic weights separately for each component model of a multi-topic model. In other embodiments, ranking may be performed across multiple component models of a multi-topic model.

After 706 and 708, based on the point geometry, polygon geometry and the topic ranks, the topic ranks are joined (at 709) to the element geometry (point geometry and polygon geometry) for each element. This joining is enabled by the base map element identifier stored with each base map element in the base map elements 306. At this point (after 709), every base map element has associated with it a polygon geometry and information about topic ranks. After 709, the polygons representing element geometry are merged (at 710) by dissolving boundaries between adjacent polygons if they refer to the same topic at a particular rank. This merging of polygon geometries leads to the formation of clusters, with each cluster representing a particular topic. After 710, based on the topic labels 701 and the clusters formed from element geometries, label attributes are joined (at 711) to the cluster polygons, thereby forming and storing cluster polygons with label attributes 703. Based on the cluster polygons with label attributes 703, the placement of labels for the element clusters is determined and cluster labels are placed (at 712), and symbolization for the element clusters is determined and clusters are symbolized (at 713). Additionally, after 707, based on the topic weights of the elements, an elevation layer is created (at 714), such that locations within the low-dimensional space obtain elevation information, e.g., when the low-dimensional space has three-dimensions. In some embodiments, this may involve interpolation of individual or combined topic weights across the low-dimensional space. After 714, symbolization for the terrain is determined and the terrain is symbolized (at 715) for the base map. Then the terrain symbolization, cluster label placement, and cluster symbolization are assembled to form the base map 704. Additional details of the process 219 are described below.

Since base map models will often include thousands of elements (e.g., 10,000 neurons in a 100-by-100 neuron SOM), each such element may participate in multiple cluster solutions—from coarse clusters to fine clusters—that each will be stored as polygon geometry with associated label attributes (703) that are placed at appropriate locations (712). The base map (704) includes prescriptions of the zoom levels at which each of the base map layers are displayed. While this follows the prescription of U.S. patent application Ser. No. 15/502,764, the current disclosure makes key advances to clustering of base map model elements that derive from the novel multi-model approach to topic modeling and thus were unanticipated by U.S. patent application Ser. No. 15/502,764.

Tables 2a-2d, displayed in FIG. 29, illustrate how base map models created from multiple topic models may support multiple means for generating and displaying clusters of map elements and their labels. First, Table 2a illustrates details of how the ranking of topics within each base map element relates to clustering of elements. In each case, a given base map element is associated with a vector of topic loadings. This vector of n loadings obtained from the base map elements 306 may be used in raw form or topic loadings may be normalized (at 707) according to commonly used methods, such as z-score, min-max normalization, or unit vectors. The resulting topic weights are then ranked within each base map element (at 708). Ultimately, the rank held by a particular topic within a particular element will determine the scale or size at which that topic is visualized in the base map for that element. The top-ranked topic would be used at a high-level small scale (i.e., overview), while a lower-ranked topic would be used at a low-level larger scale (i.e., detailed view) (as shown in Tables 2a-2d).

Table 2a illustrates in detail how this ranking of topics translates into clusters that are then displayed at various scales. Any number of base map elements and any appropriate number of ranks can be used. In the example of Table 2a, however, details are shown for seven base map elements out of a large base map model that includes 10,000 elements with only three ranks. Base map elements 1, 2, 3, 5547, and 5548 all have Topic 2 as their top-ranked topic. Accordingly, Topic 2 will supply the label that will be used to visualize these elements at a high-level, small, overview scale. Further, since elements 1, 2, and 3 are neighbors in the two-dimensional space, the polygon boundaries between them will be dissolved (e.g., at 710) to form a cluster polygon (e.g., at 703) for topic 2. Elements 5547 and 5548 are neighbors and have the same Topic 2 as top-ranked topic, so their polygon boundaries are also thus dissolved. However, since they are far away from elements 1, 2, and 3 in the display space, this will result in another polygon being created for topic 2. Topic 2 thus becomes represented by multiple, discontiguous cluster polygons (e.g., at 703), reflecting different contexts in the knowledge space.

When the base map model is constructed (e.g., at 704) from multiple topic models, then metadata 702 about them must be supplied suppled, which contains information about the number and size of topic models. The system can then either rank topics across all models (as shown by Table 2b) or perform ranking constrained by individual models (as shown by Tables 2c and 2d).

Table 2b illustrates how this works for one base map element and a nine-dimensional reference system score involving three topic models, each including three topics. The top-ranked topic for the element ("1") happens to be the top-ranked topic for model 3. The second-ranked topic ("2") happens to be the top-ranked topic for model 1. The third-ranked topic ("3") is the second-ranked topic for model 1. The fourth-ranked topic ("4") is the top-ranked topic for model 2, etc. Correspondingly, at high-level small scales, this base map element will be expressed through labels for the top-ranked topics of models 1 and 3, while the top-ranked topic of model 2 will only come into play at intermediate-level medium scales. This approach leaves an opportunity for model 2, while of secondary fit for this base map element, to play a more dominant role elsewhere on the map. In other words, ranking across multiple models allows for different models to play different roles in different regions across the map.

At other times, the nature of the models being used in multi-model base maps will justify more stringent segmentation of reference system scores, with ranking of topics constrained within their respective models. Table 2c illustrates this for multi-granularity models, namely a twelve-dimensional reference system score to which three models contributed: a coarse detail model of three topics, a medium detail model of four topics and a high detail model of five topics. Multi-granularity models realistically involve a much larger range in model size, from models that include a handful of topics to models involving several hundred topics or more. This range in granularity lends itself to a very straightforward translation of within-model ranks to scale-dependent clusters. In the example in Table 2c, only the top-ranked topics within each model are utilized, with the top-ranked topic model 1 used in small-scale clusters, the top-ranked topic of model 2 used in medium-scale clusters, etc.

Table 2d illustrates a different scenario, with topic models created for different domains being integrated. For example, a base map can be built from topic models for cybersecurity, machine learning, and software engineering. Here, the top-ranked topics of the different models are treated as equals in the creation of clusters. There will thus be three top-level cluster layers available for display at high-level small-scale. While this may seem to introduce graphic conflicts in the base map, the strong layering and labeling controls of contemporary GIS software make it feasible to resolve such conflicts with ease.

Figure 8:
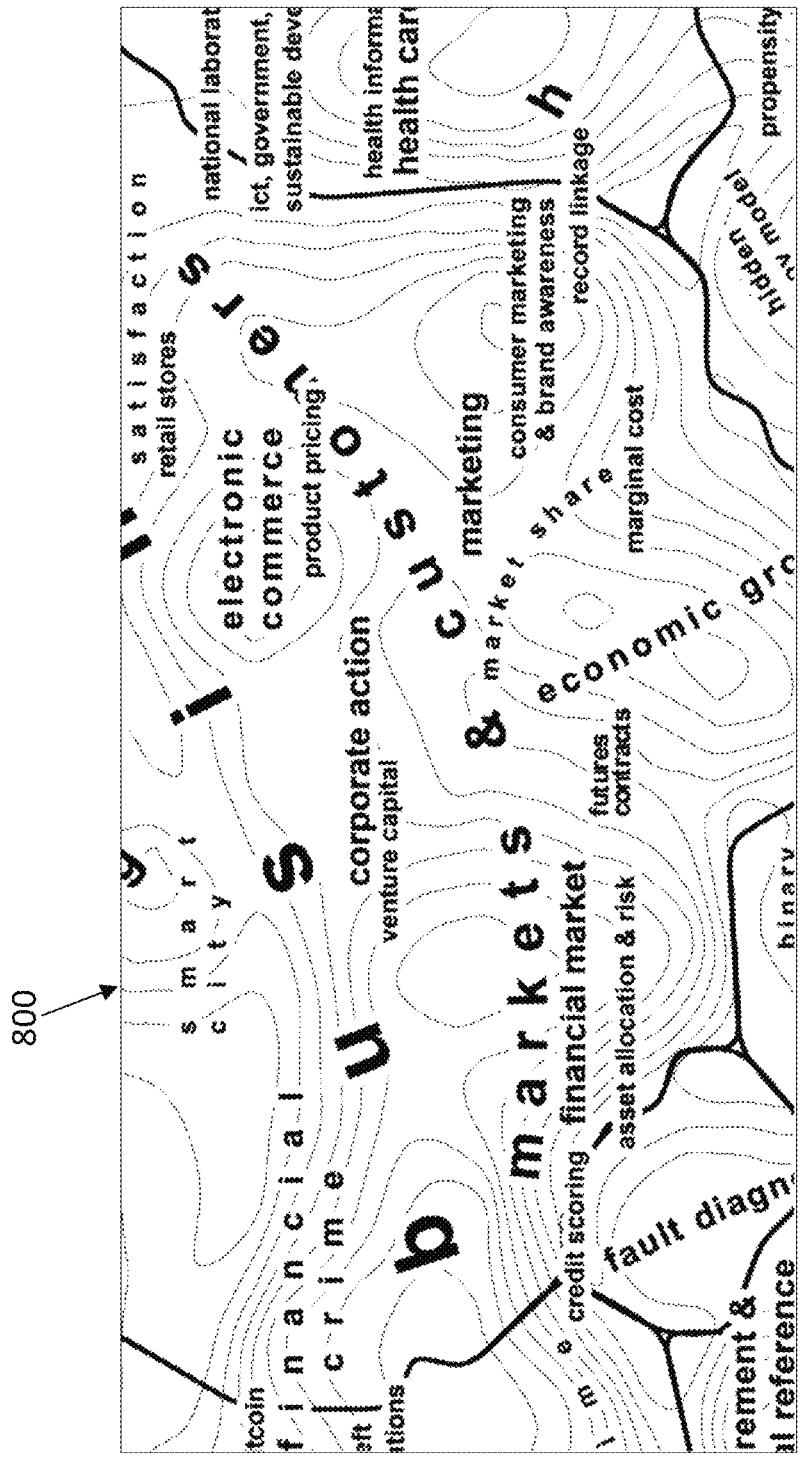
FIG. 8 is an image of an example base map with an overlay of cluster symbols, cluster labels, and terrain, in accordance with some embodiments of the disclosure.

The range of ranking approaches laid out above allow the creation of base maps that contain a great amount of conceptual detail about a knowledge space, in a uniquely coherent visual manner. For example, FIG. 8 shows an example base map 800 with an overlay of cluster symbols, cluster labels, and terrain showing the hierarchical structuring of a "business" region, where the "markets & customers" area includes "financial market", "corporate action", "electronic commerce", "marketing", and "economic growth". Each of these topical regions contains further detail, which is revealed upon zoom-in. FIG. 4 shows an example of the effects of scale changes between three zoom levels; however, any appropriate number of zoom levels may be used. While all this evokes the hierarchical structures typically encountered in formal domain ontologies and knowledge graphs, the present disclosure lets these relationships emerge without ever needing access to such graph-type representations, in a clear departure from the dominance of knowledge graphs in knowledge management technology.

1.3.2 Base Map Deployment

Contemporary GIS technology provides comprehensive solutions for capturing, storing, manipulating, analyzing, sharing and displaying of geographically referenced data. The disclosed methods and systems provide a unique solution for how those capabilities can be applied to data that are not referenced in geographic space, but in a high-dimensional space. Once the base map elements 306 are available, point geometry (at 705) and polygon geometry (at 706) can be derived therefrom for base map elements, and then the full complement of hundreds of GIS functions become applicable. These include relational joins (e.g., at 709, 711), merging of polygons (e.g., at 710), GIS database storage (e.g., as with the cluster polygons with label attributes 703), raster interpolation (e.g., as with the elevation layers created at 714), and a rich choice of symbolization methods (e.g., at 712, 713, 715). Further, the separation of data into layers in GIS allows flexible combination of symbolized layers in the base map (704), including scale-dependent display, where layers are shown only within certain zoom levels.

All this makes it possible to then utilize proven web GIS technologies to deploy the base map, despite those technologies having been created for a completely different purpose. The map server component 207 (FIG. 2), using conventional map server technology, can serve the base map in the form of a Tile Map Service (TMS) 208, Web Map Service (WMS) 209, Web Feature Service (WFS) 210, or similar standards-based services. Examples for GIS server software that can be used to that end include ArcGIS Server, QGIS Server, GeoServer, MapServer, and others.

One embodiment for the complete process of publishing the base map on a map server (e.g., 207) involves setting up symbolization and scale dependency of each base map layer in the TileMill software, exporting the complete base map to the MBTiles format, importing that MBTiles file to GeoServer, and publishing the complete base map as a layer using the WMS standard, with map tiles formatted in JPEG format. The base map is then fully accessible, including interactive zooming in a web browser (FIG. 9), via a simple URL, like in this snippet for a base map of the management consulting domain:

"http://localhost:8080/maps/MGMT/
  wms?service=WMS&version=1.3.0&request=
  GetMap . . . "

Figure 9:
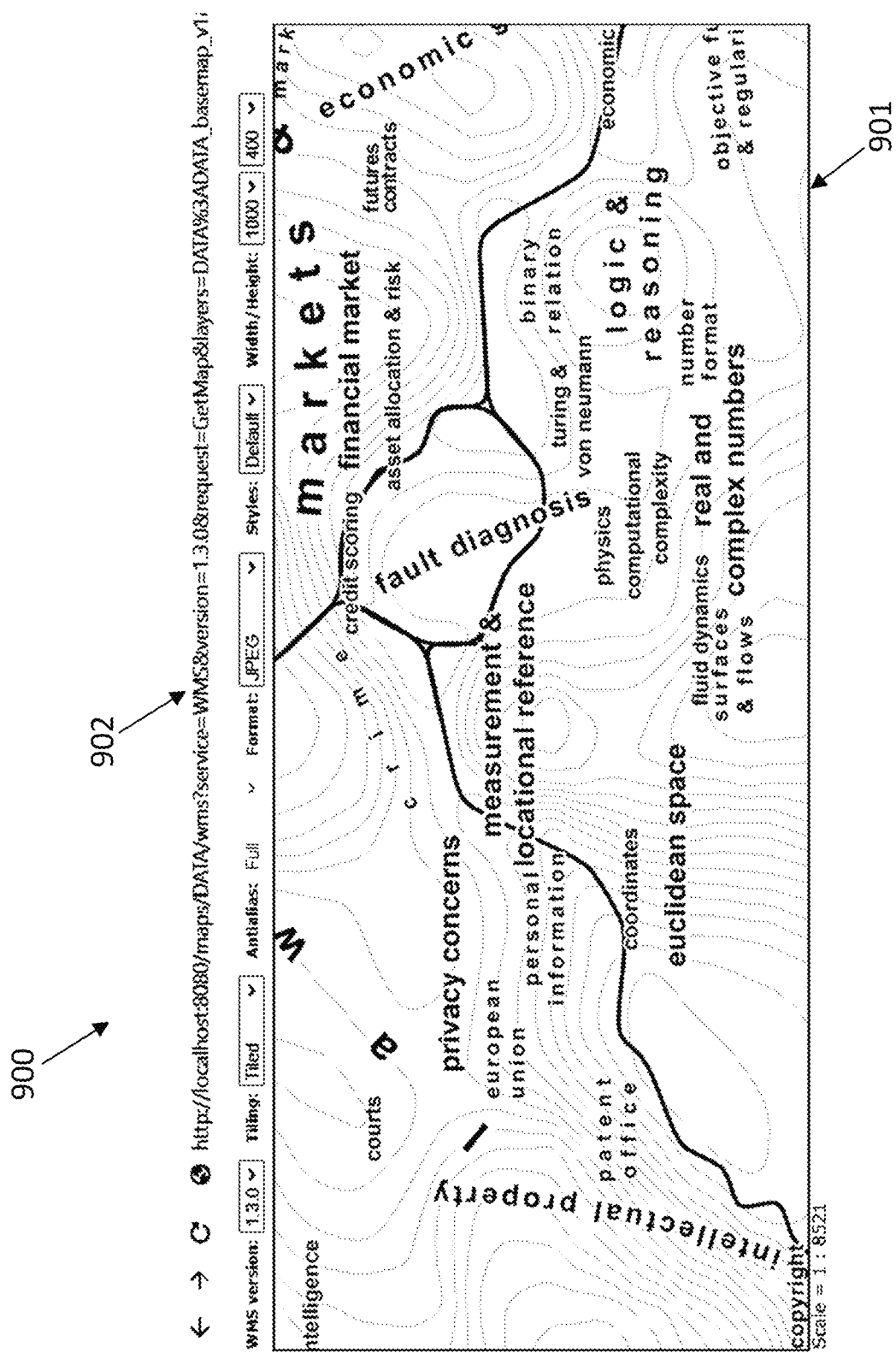
FIG. 9 is an image of an example user interface with a base map being served in accordance with a map server component of FIG. 2, in accordance with some embodiments.

An image is shown in FIG. 9 of an example user interface 900 with a base map 901 being served using the URL 902 in accordance with a map server component 207 (FIG. 2), in accordance with some embodiments. The WMS version, the tiling style, the desired antialias, the image format, the presentation style, and the width/height are also selected in the user interface 900.

The maturity of web GIS technologies is such that other embodiments could involve publishing the base map using a different combination of GIS server software and deployment settings. For example, different server software (replacing GeoServer), different services provided (replacing WMS), and different image formats used (replacing JPEG).

It would also be possible to forego GIS server software completely, such as in an embodiment where the MBTiles file is converted to a tiled web map using a suitable software, like MBUtil. The result is also known as a slippy map or XYZ map, with map tiles stored in the PNG format and arranged in a hierarchical folder/file structure. In that case, the map server functionality (e.g., 207) can be fulfilled by a general-purpose web server and the tiled base map can be displayed in a web browser using any compatible web mapping framework. Examples of compatible frameworks include Leaflet, OpenLayers, and Google Maps API.

1.4 Map Overlays in Knowledge Space

The very idea of the base map is that it may serve as a common base onto which a wide variety of data could be overlaid. That implies the existence of an inference mechanism for accomplishing this. In traditional cartography and GIS, the answer has been to (1) express the location of an entity in the locational reference system, such as latitude and longitude, then (2) project those geographic coordinates to a flat, two-dimensional map coordinate system via map projection formulas, and (3) use those map coordinates to position cartographic symbols. This is what the systems and methods described here accomplish, except that they deal with knowledge space instead of geographic space and with knowledge artifacts instead of geographic phenomena and that a high-dimensional reference system based on topic models and a two-dimensional map coordinate system based on dimensionality reduction are being used.

In implementing base maps, deliberate use is made of existing GIS standards and web mapping frameworks, making it possible to leverage commodity GIS and mapping technology for deployment. However, the differences between geographic space and this approach to representing knowledge space are such that it would not be obvious how to actually implement overlays of knowledge artifacts onto a base map.

Knowledge artifact here refers to any artifact whose content is suitable to undergo topic inferencing, with the result expressed as a reference system score. Overlay refers to the process of determining and visualizing the location of the artifact in the low-dimensional base map space. Since an inferred reference system score and the reference system scores associated with base map elements are of the same dimensionality n, one can readily compute the similarity between an artifact and a base map element, using any common similarity measure, such as Cosine, Euclidean, and others. When this is done for one artifact over all base map elements, it populates what is referred to herein as a map score, i.e., a vector of similarity values. The length of that vector is equal to the number of base map elements. For example, if the base map includes 10,000 elements, then a map score for a given artifact will include a vector of similarities of length 10,000.

Since each base map element further has a defined location in the two-dimensional map space, a map score effectively encodes a magnitude distribution of the artifact across the map space. That inferred spatial distribution is the basis for any overlay of the artifact in the map space. Analyzing, slicing, and subsetting of a map score is the basis for the different types of overlays, such as point overlay, line overlay, area overlay, or surface overlay.

Anything encoded using text strings expressing content related to the domain can be meaningfully treated as an artifact to be overlaid in the map space. Two key types of such artifacts are text documents and user-specified text queries. In other words, the system can receive a query text that a user types or pastes into the user interface, and then the system can project that text into the map space or, alternatively, the system can extract the text content from a document and then project the text content of that document into the map space.

Figure 10:
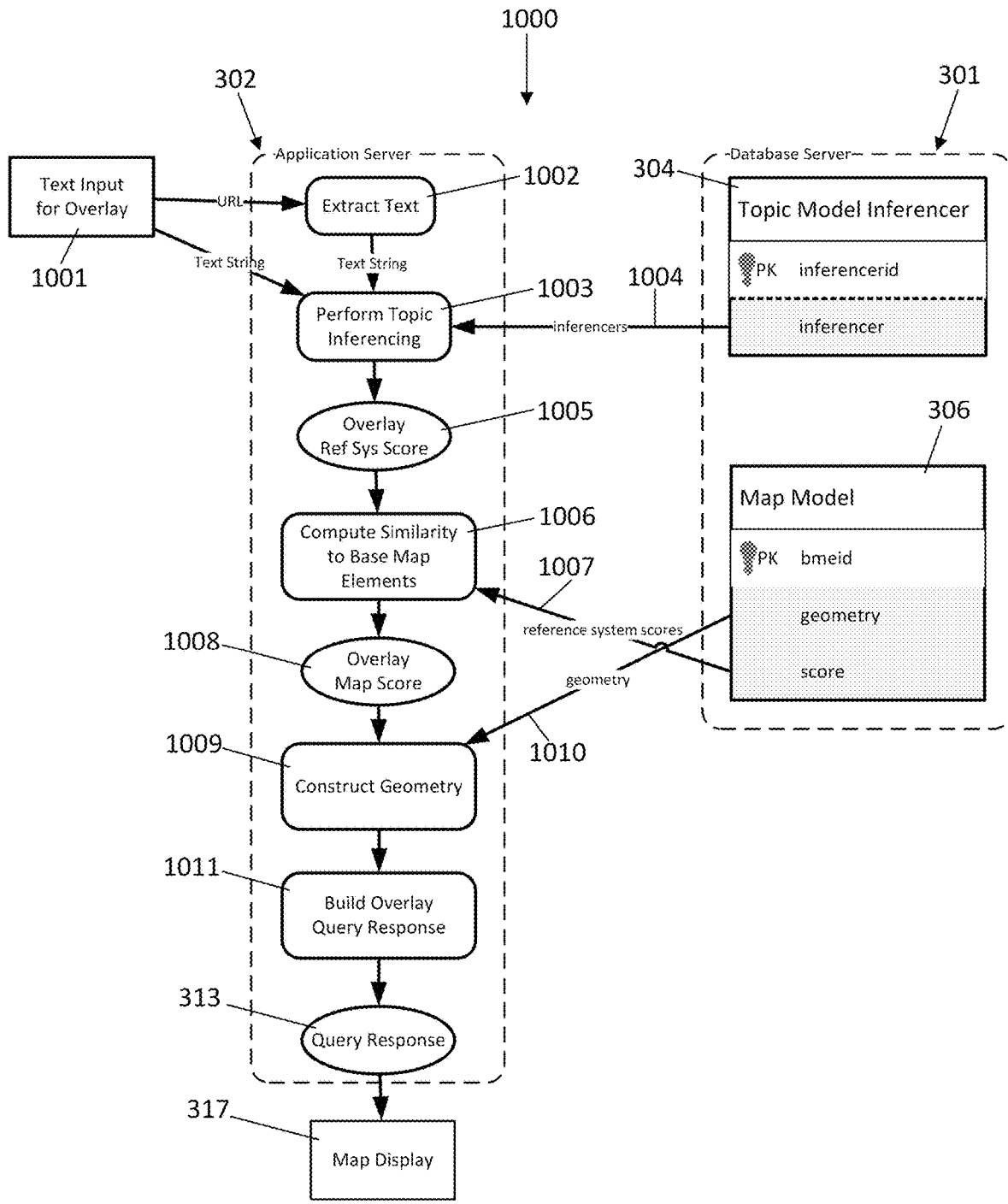
FIG. 10 is a flow chart showing an example process for transforming a text query into a query response that can be displayed as a map overlay, in accordance with some embodiments.

On-demand computation of overlays can be initiated by issuing a Base Map API call (at 206) to the Inference Server 204, with the query content populated by typing or pasting of an input text string as shown in a process 1000 of the flowchart in FIG. 10 performed by the application server 302. The particular steps, order of steps, and combination of steps is shown for explanatory purposes only. Other embodiments may use other steps or combinations of steps or in a different order to perform the same general functions. Additionally, one or more applications, routines and physical devices can perform the process 1000.

A text input or overlay is provided to or entered into (at 1001) the application server 302. Thus, the text-based query 310 is entered as either an input text string or a URL (or other resource locator information). If the input text string is not a pointer to a resource, like a URL, but instead includes plain-text content itself, then it can be passed directly to the inferencer(s) for the performance of topic inference (at 1003).

On the other hand, if the input text string is provided as a URL, URI, file path name, or other resource locator information, then the respective resource is accessed, content retrieved or extracted (at 1002) and then passed (as a text string) to the inference(s) at 1003. Concrete examples for such resources include URLs of web pages, URIs that encode calls to other APIs, and the location of locally stored files. One advantage of such resource locator information is that it allows to effectively pass to the inferencer(s) the content of much longer documents than would typically be allowed when input text is directly included within Web API calls. That is particularly useful when Web API calls for query overlays are issued from web applications running in a web browser.

The performance (at 1003) of topic inference is based on the received or extracted text string and the topic model inferencers 304 accessed (at 1004) from the topic model inferencer (with inferencer IDs, "inferencerid") in the database server 301. The application server 302 generates an overlay reference system score 1005 (i.e., a reference system score generated for the purpose of generating the overlay of a text input) by the topic inferencing at 1003. When using a multi-topic model approach, the overlay reference system score 1005 corresponds to the combined topic model loadings 507. At 1006, the application server 302 computes a value for the similarity between the overlay reference system score 1005 and the reference system scores of base map elements 306 (with base map element IDs "bmeid") accessed from the database server 301 at 1007. This produces an overlay map score 1008. At 1009, the application server 302 constructs the geometry for the query response based on the overlay map score 1008 and the geometry information accessed from the database server 301 at 1010 for the base map elements 306. At 1011, the application server 302 builds an overlay of the query response 313 based on the constructed geometry. The application server 302 then passes the query response 313 to the web server 303 for the map display 317.

The following shows an example Base Map API call (at 206) to an overlay service hosted by the Application Server 302:

```
http://localhost:8080/DATA/services/overlay?inputType=query&ge
omType=point&input=GPS
```

In this example, the inference engine of the base map is accessible as an application at the URL http://localhost:8080/DATA. It exposes overlay capabilities through the overlay end point. The parameter inputType specifies that a query is to be overlaid. The type of geometry to generate is indicated by the geomType parameter, here specifying point geometry. The input parameter contains the text string on which inference is to be performed, here "GPS".

As compared to U.S. patent application Ser. No. 15/502,764, there are significant differences in how overlays are computed, due to the use of multiple topic models in the creation of the base map and in performing inference. Further, disclosed below is an expanded set of geometry types. Whereas U.S. patent application Ser. No. 15/502,764 involved only a single topic model and described approaches to generating point and landscape overlays from text input, the present disclosure additionally describes approaches to generate line overlays and area overlays from text input. This allows supporting significantly different analytical tasks, for example tracking evolution of an author's writings over time as a trajectory across the knowledge space (i.e., line overlay) or the detection of gaps in someone's skills.

An example for the use of resource locator information is shown in the following Base Map API call, with the query being passed (e.g., at 1001) as a URL encoded string, to ensure proper handling:

```
http://localhost:8080/DATA/services/overlay?inputType=query&ge
omType=point&input=
https%3A%2F%2Fen.wikipedia.org%2Fwiki%2FGlobal_Positioning_Sys
tem
```

Note the implications of the difference between the two example calls. An input of "GPS" would process a single text token, compute a reference system score, a map score, and finally a point location. In contrast, the input of https://en.wikipedia.org/wiki/Global_Positioning_System is detected to be a URI, based on the https prefix, triggering the retrieval of the content of a Wikipedia page, the full content of which is then presented for inference to compute a reference system score, a map score, and finally a point location.

A key architectural advance of the system lies in its leveraging of GIS principles and GIS standards for non-geographic locations. This is illustrated by this Base Map API response in the point overlay of "GPS":

```
{
    "features": [{
        "geometry": {
            "coordinates": [
                -127.4814,
                0.0071
            ],
            "type": "Point"
        },
        "type": "Feature",
        "properties": {
```

-continued

```
        "mapelementid": 9182,
        "cat": "query",
        "fit": 0.57,
        "label": "GPS",
        "time": "Thu Mar 18 17:54:24 UTC 2021",
      }
    }],
    "type": "FeatureCollection"
}
```

This response uses the GeoJSON format, which is a widely adopted open standard for representing simple geographic features and associated attributes. In this example, the use of geographic coordinates (longitude: −127.4814, latitude: 0.0071) and the provision of various properties that can be used for filtering and symbolization, such as the fit, which is the similarity value for the most similar base map element. As an output format, GeoJSON accommodates all the geometry types that could be specified in the overlay query, including points, lines, polygons, and landscapes. As would be expected, each of the different geometry types may involve additional parameters, as indicated in the sections below.

Further, the use of multiple topic models advanced in the present disclosure allows further analytical control over overlays. Specifically, when computing map scores, i.e., computing similarities between an inferred reference system score and the reference system scores associated with base map elements, it is possible to assign different weights to different segments of the reference system score. For example, for a reference system score involving a model of the domain of biology and a model of the domain of informatics, the topics associated with the two models may be weighted differently. Reasons for doing so may include an observed imbalance in the content of overlaid queries or the desire to focus on aspects of a particular domain. Such nuanced weighting of topic segments is also advantageous when dealing with multi-granularity topic models. There it is then possible to counteract the fact that inference using coarser topic models tends to produce loadings with higher absolute values as compared to those using finer topic models, causing the coarser segment to dominate the similarity computation. As an example, in the multi-granular Data Science & Analytics model producing a reference system score of 1,603 dimensions (9+23+84+390+1,097) the first segment of nine topics produces much higher loadings than the last segment of 1,097 topics (the last five of which are listed here):

[0.02438, 0.02979, 0.73797, 0.03724, 0.02251, 0.02928, 0.04904, 0.02917, 0.04058, ... , 0.00120, 3.74846E−4, 0.00136, 0.00127, 0.00112]

1.4.1 Point Overlay

If the goal is to overlay a query as a point feature, then the location of that point feature will correspond to the location of the base map element that is most similar to the query. Specifically, first a reference system score for the query (overlay reference system score 1005) is computed by performing topic model inferencing (e.g., at 1003). Second, a map score is determined based on the similarities between the overlay reference system score and the base map elements (e.g., at 1006 and 1008). Third, the base map element with the strongest similarity will be the source of the point location for the query. All this is enabled by the fact that the base map elements 306 contain the base map element reference system scores in the high-dimensional knowledge space (i.e., a vector of weights equal in length to the total number of topics) and the geometry information in the low-dimensional map space.

Depending on the specific similarity measure used, the specific computation used to determine the most similar base map element will differ. For example, if using the Euclidean similarity measure, then the base map element with the lowest value within the map score will be the most similar one. In other cases, the most similar base map element will be the one with the highest value within the map score, like when using the cosine similarity value.

1.4.2 Line Overlay

If a query is presented as a linear sequence or otherwise a linearly connected set of text inputs, then for each of these inputs a high-dimensional topic vector can be inferred. Each such topic vector is then projected onto the base map, based on its similarity to the reference system scores of base map elements, and a low-dimensional geometric vertex is determined. When the resulting vertices are linked in their prescribed sequence, then they will follow a low-dimensional trajectory, which can be visualized with a line symbol and overlaid on the base map. For example, if four text inputs are presented in a prescribed sequence, then four n-dimensional topic vectors are inferred, then four map score vectors are computed, each yielding one point location, and the four point locations are connected to form a line feature that is visualized as the line overlay.

The following are some examples for the kinds of sequences of text inputs that can drive the generation of trajectories or line overlays:

a) Explicitly prescribed sequence of discrete text chunks, such as providing a sequence of text input fields, each receiving different inputs by typing, pasting, voice input or some other suitable technique that provides text strings. For example, as compared to the use of a single text input field illustrated in FIG. 11, additional text input fields can be provided for.

b) A set of text inputs accompanied by metadata fields that prescribe the desired ordered sequence, e.g., time stamps accompanying separate text items in a database. If multiple trajectories are to be visualized, differentiated according to entities, then text inputs should be accompanied by suitable entity identifiers, like the organization, author, etc.

c) Corresponding to an observed or inferred graph structure of text chunks, such as extracted from social media content networks (replies, forwards, etc.) or corresponding to some other network structure, such as social media follower networks, co-citation networks and the like.

d) Derived through linguistic chunking of flowing text, such as based on turn-taking in recorded conversations.

1.4.2.1 Constructing Line Geometry

In order to visualize line objects, individual vertices, each corresponding to a discrete portion of the overall query, are connected in a prescribed sequence. This could be done either on the client or server side.

If line geometry is to be constructed by the client, then as many calls for point overlays are issued as there are query portions and one point location is extracted from each response to serve as a vertex of the line feature. For example, for a query that includes a sequence of four portions, four point overlay calls are made and the resulting four query responses are parsed.

Alternatively, all query portions can be sent as a single API call to the server and a single response is received that includes a line feature, in which each vertex corresponds to one of the query portions. Here is an example of a Base Map API call for the overlay of five query portions as a line feature, with each portion separated by double underscores: http://localhost:8080/DATA/services/ overlay?inputType=query&geomType=line&input= 1G_2G_3G_4G_5G. The response would trace the history of cellular communications as a line feature in the map space.

1.4.3 Area Overlay
1.4.3.1 Extracting Base Map Elements

Whereas individual point overlays or the individual vertices of line overlays are based on finding base map elements with peak similarity, area overlays translate the query into a grouping of multiple base map elements. Suitable bases for such grouping include count thresholds, similarity thresholds, and other means to select entries from the query map score. In the case of a count threshold of n, the top n highest-similarity base map elements may be retrieved. For example, if a count threshold of ten is chosen, then a maximum of ten base map elements with the highest similarity values are retrieved for the query response.

In the case of similarity thresholds, base map elements may be selected based on similarity values in the query map score. This will typically take the form of a minimum similarity threshold, but could also be constructed as a similarity band, with a minimum threshold different from the minimum observed similarity value and a maximum threshold different from the maximum observed similarity value. This allows examining nuanced patterns in similarity between the query and the base map.

This is an example of a Base Map API call for the overlay of the query string "GPS" as a polygon with a minimum similarity threshold of 0.1:

```
http://localhost:8080/DATA/services/overlay?inputType=
query&geomType= polygon&threshold=0.1&input=GPS
```

1.4.3.2 Constructing Area Geometry

Once a subset of base map elements is identified by thresholding of values within the query map score, those individual base map elements are transformed into an overall area geometry.

If base map elements are only stored as point or line geometry, then individual areas are first generated through suitable geometric functions, which are commonplace in off-the-shelf GIS software and software libraries. An example for such a function is the creation of area buffers, with each base map element being represented as a buffer of defined maximum distance from its original point or line geometry. Another example is the creation of Thiessen polygons or Voronoi regions, which generates a space-filling tessellation of the complete map space.

Figure 11:
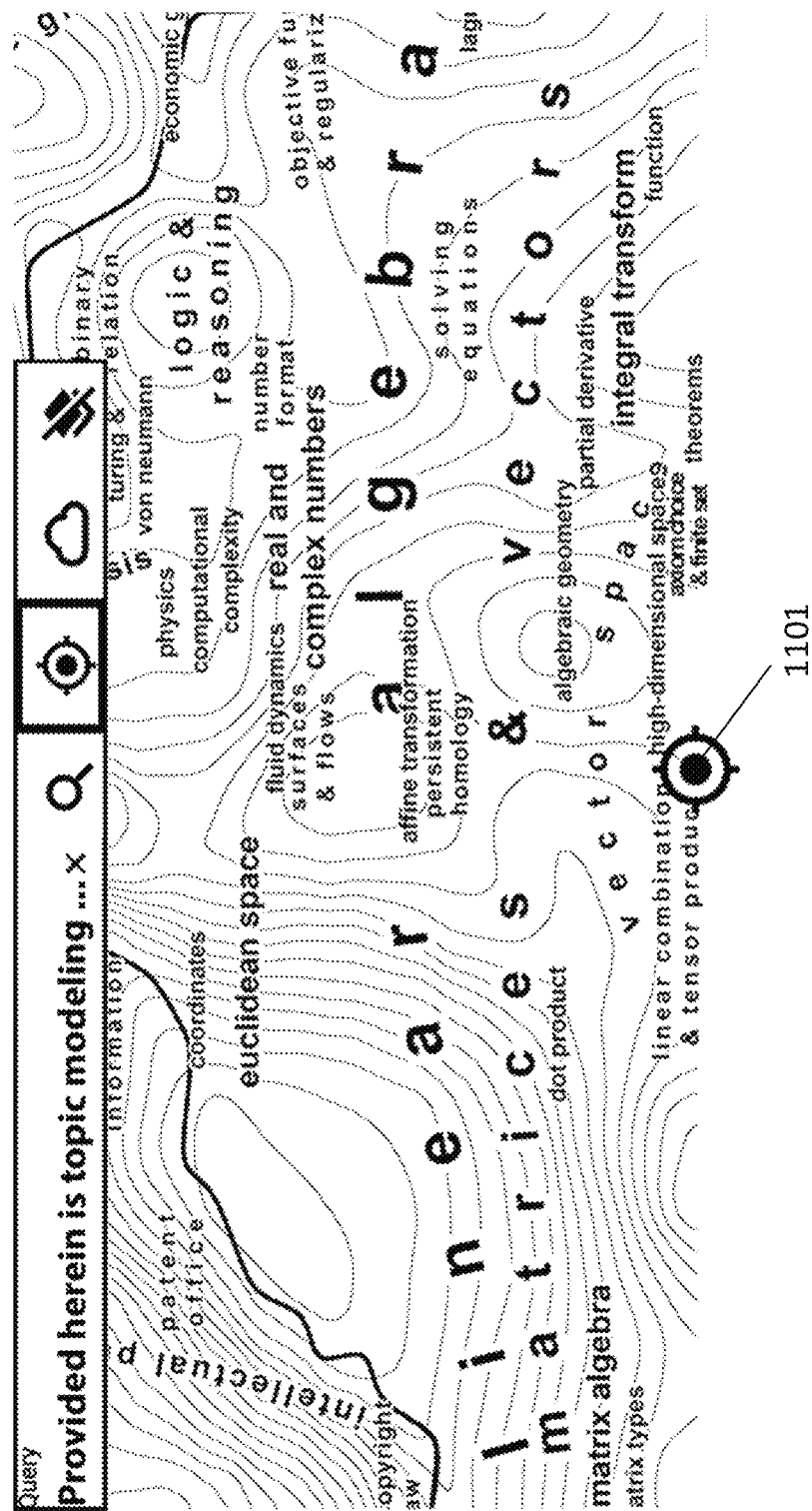
FIG. 11 is an image of an example base map with a text query being visualized as a point feature in accordance with a Base Map API component of FIG. 2, in conjunction with the base map being displayed in accordance with the map server component of FIG. 2, in accordance with some embodiments.
Figure 12:
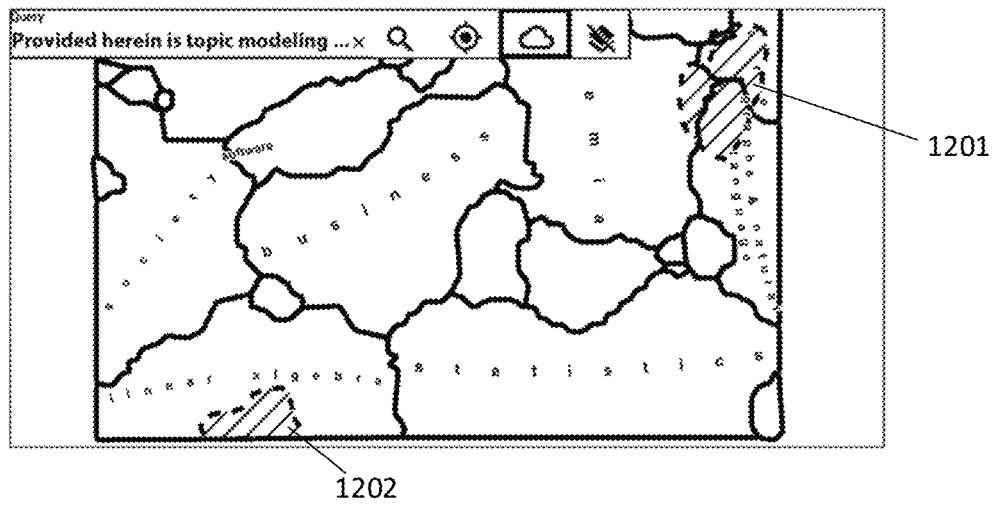
FIG. 12 is images of portions of an example base map with a text query visualized as a multi-part area feature in accordance with the Base Map API component of FIG. 2, in conjunction with the base map being displayed in accordance with the map server component of FIG. 2, in accordance with some embodiments.
Figure 12:
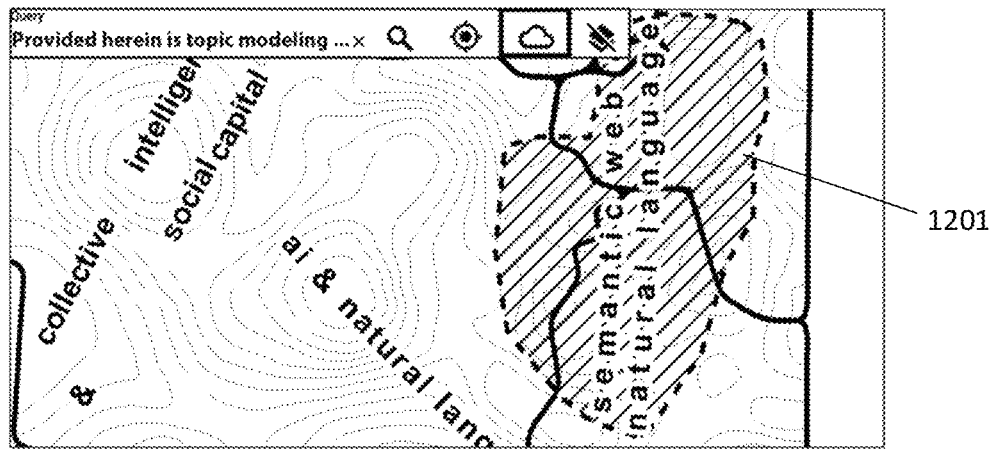
Figure 12:
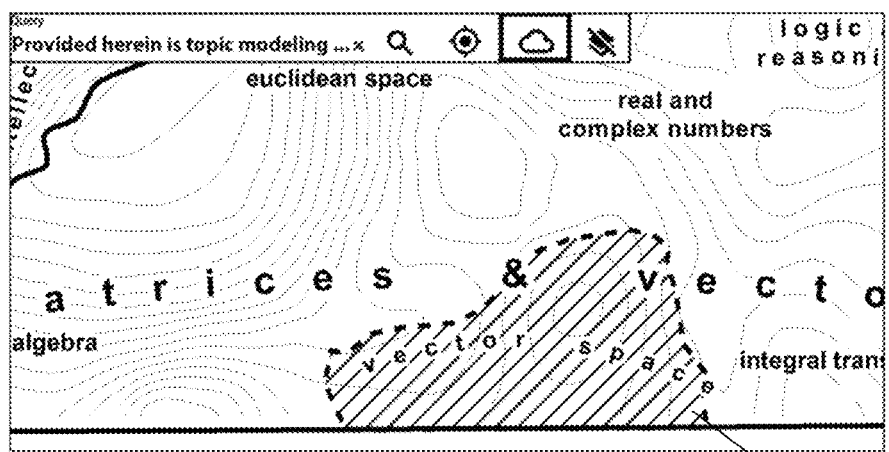

Individual areas are then merged through what is known as the Dissolve operator in GIS software, which dissolves boundaries between neighboring areas. As a result, contiguous regions of individual base map elements can form large areas. Further, any discontiguity among individual base map elements leads to the emergence of discontiguous areas. This allows identifying secondary regions in the knowledge space matching the query. For example, FIG. 12 involves the same query string as FIG. 11, but the area overlay (FIG. 12, top image) reveals a secondary match 1201 in the "semantic web" area (FIG. 12, middle image), in addition to the primary match 1202 in the "vector space" area (FIG. 12, bottom image) that contains the location of the point overlay 1101 (FIG. 11).

Figure 13:
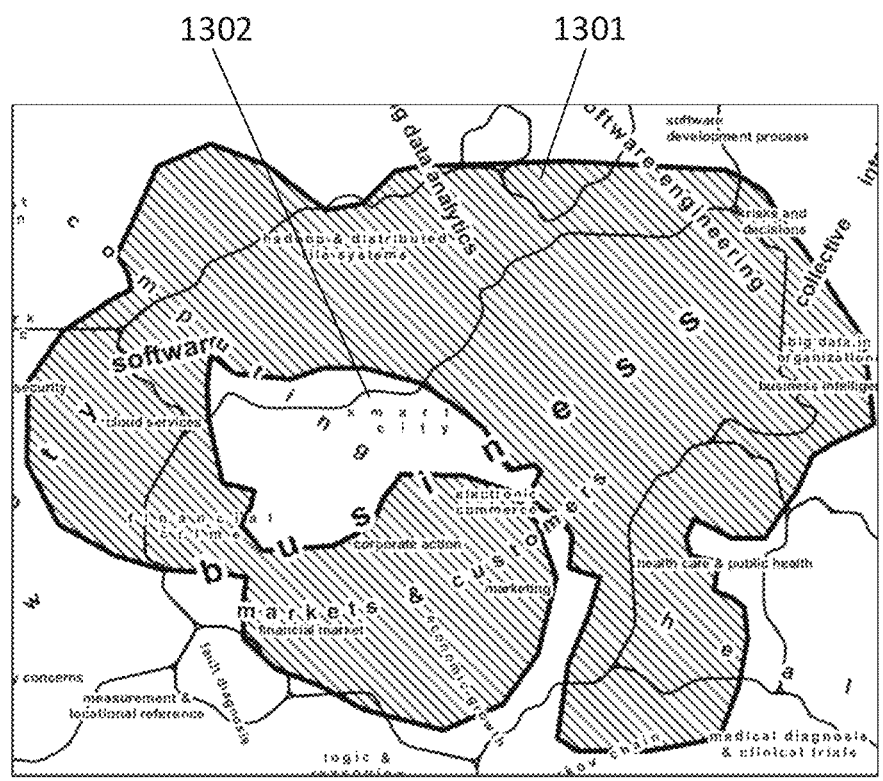
FIG. 13 is an image of an example base map with a topical gap being discovered with a text query visualized as an area feature in accordance with the Base Map API component of FIG. 2, in conjunction with the base map being displayed in accordance with the map server component of FIG. 2, in accordance with some embodiments.

Another advantage of this method of merging the area geometry of neighboring base map elements is that it allows the discovery of gaps or structural holes in the query with respect to the base map. As an example, FIG. 13 shows an area overlay 1301 produced by a text query that included a concatenation of the resumes of several speakers at a data science conference. The overlay reveals a hole 1302 or absence of expertise in a region labeled as "smart city" in the base map.

1.4.4 Landscape Overlay

The point, line, and area overlays of queries rely on identifying a subset of base map elements (at 1007) based on the similarity values that are captured by the query map score 1006 derived from query input 1001. In contrast, the landscape overlay of a query utilizes the full query map score 1006 when constructing geometry at 1007. The most straight-forward approach includes assigning to each base map element a symbol that is proportional to its value in the query map score 1006. The field of cartography provides a rich set of techniques for implementing this, such as proportionally sized point symbols or choropleth mapping. A more computationally involved option includes interpolating contour lines. Either way, the landscape overlay will express the spatial variation of similarity values across the map space.

1.4.5 Multi-Query Overlay

Figure 14:
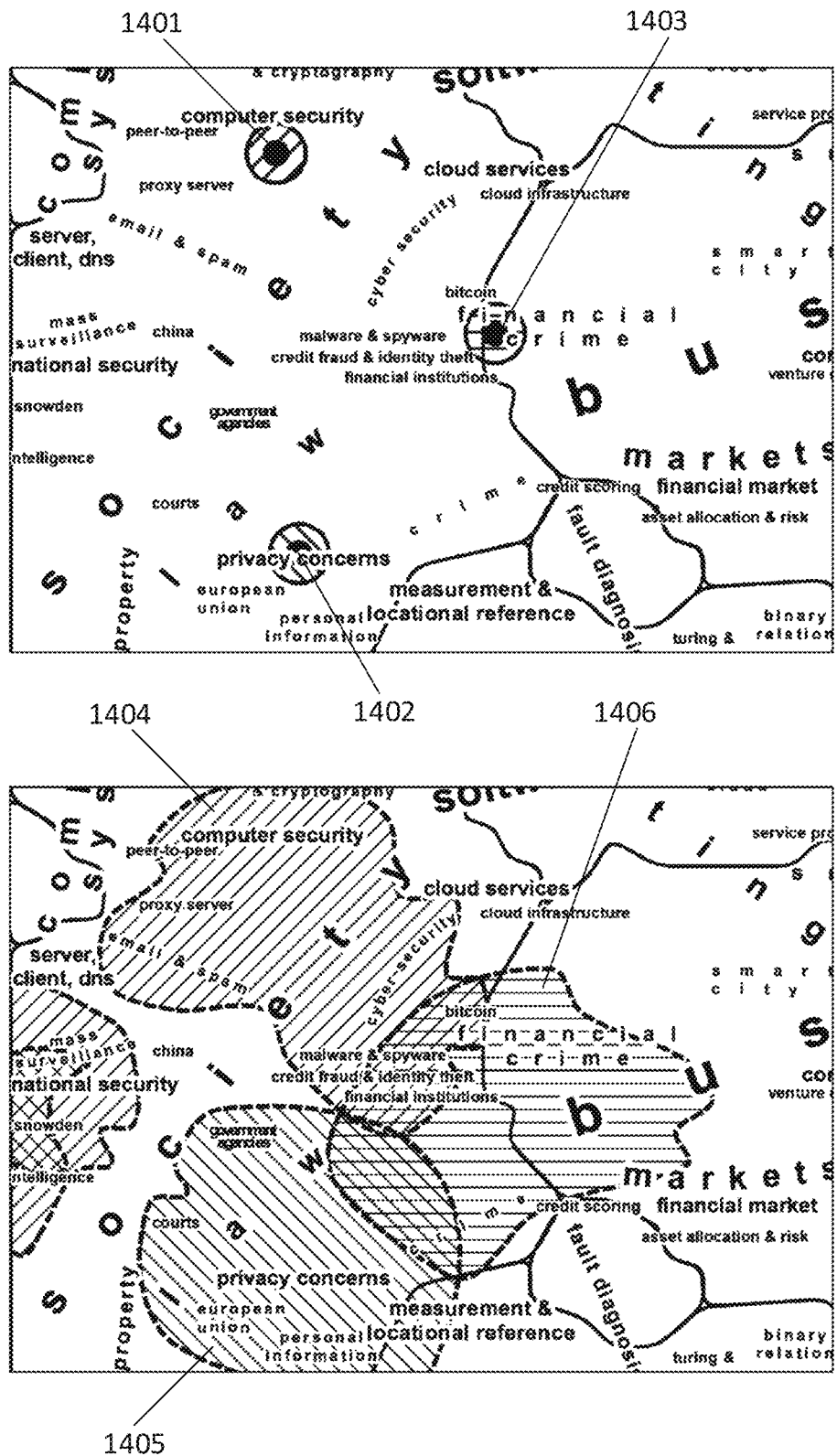
FIG. 14 is images of example base maps with multiple text queries being visualized simultaneously in accordance with the Base Map API component of FIG. 2, in conjunction with the base map being displayed in accordance with the map server component of FIG. 2, in accordance with some embodiments.

The notion of the base map, supported by an underlying inference engine, as presented here, makes it possible to overlay not only one individual query, but multiple queries (FIG. 14). That gives rise to a new form of spatial analysis, in which the spatial relationships among a larger number of overlaid queries can be investigated. Within the realm of spatial analysis, point pattern analysis (FIG. 14, top image showing three point overlays 1401, 1402, 1403) and polygon overlay analysis (FIG. 14, bottom image showing three area overlays 1404, 1405, 1406, corresponding to the point overlays 1401, 1402, 1403, respectively) are typical approaches, and could be fed by simply sequencing a series of individual overlays. In some embodiments, the visual appearance of multiple overlaid queries may be varied, for example using different colors or symbols. FIG. 14 illustrates the visualization of three queries, for "cybersecurity" (1401 and 1404), "blockchain" (1403 and 1406), and "privacy" (1402 and 1405).

1.5 Documents in Knowledge Space

The system put forth here not only allows the visualization of individual artifacts or a small number of artifacts onto the base map. But also, the provision of a base map and inference engine allows the integration of large numbers of documents in the knowledge space, supporting analytical operations unlike anything previously proposed or demonstrated. Notably, this novel approach allows the integration of documents that were not used during base map creation.

1.5.1 Database Server

As explained above, when a visualization of the base map in the map server is combined with an application server performing inference on a query that produces an individual text string, the system can first compute a reference system score for that text string, then compute a map score expressing the similarity of the reference system score to each base map element (i.e., the vector of similarity values), and then visualize that similarity vector in form of a point, area, or landscape feature. When a sequence of two or more text strings are used to represent an artifact, it is further possible to create a line feature. Even though overlays involve multiple inference steps (e.g., to produce the reference system score, base map score, and geometry), the process is quite fast for a small number of queries, like when three queries are overlaid in sequence (as in the example of FIG. 14). For example, in experiments involving a topic model of 1,300 topics and a base map model that includes 10,000 elements, a text query being entered through a web front-end application (see query input "cybersecurity" in FIG. 14) took just over 70 ms to generate a point overlay.

However, this also implies that, when hundreds or thousands of artifacts are to be overlaid on a base map of thousands of elements, then batch computation of inferences and storage of inference results are advantageous. That is what the Database Server 301 provides, including storage of several types of data. Some of these involve data produced by the processes of the reference system creation component 202 and base map creation component 203, respectively, and are the topic model inferencers 304 and the base map elements 306. The topic model inferencers 304 store serialized inferencers that are deserialized as needed to perform inferences. The base map elements 306 store geometric information about the location of base map elements in map space and the reference system scores that characterize the location of base map elements in the high-dimensional topic space. The database server 301 also provides access to documents, either on the same server or from a separate document server. Further types of data are generated through batch processing of documents. These include reference system scores (e.g., 305) and map scores (e.g., 307). Note that the different types of data could be stored on a single server or in a distributed manner, each on its own server.

There is a module for batch computation (at 308) of reference system scores 305 that performs topic model inferencing on an arbitrary number of documents. The resulting scores 305 are stored with a document identifier as additional property. Since the computation of a reference system score for any one document is independent from that of any other document, this process is very suitable for speedy parallel processing. The same is true for the computation (at 309) of map scores 307, during which for every reference system score accessed from 305 a map score is computing. This map score is a similarity vector that is equal in length to the number of base map elements. Each map score is stored, together with a document identifier, in the map scores 307.

1.5.2 Search in Document Spaces

The different types of data provided by the database server 301 support new forms of interaction, exploration, and discovery in knowledge spaces. This includes exploiting patterns involving individual documents and groups of documents, once documents are projected into the same high-dimensional space (performed as topic model inference and stored as reference system scores) and low-dimensional space (performed via similarity computation and stored as map scores). Document search—or the scoring, filtering, and display of documents in response to a query—is a key example of what can be accomplished. The representation of artifacts in three different forms in the database server 301—as text documents (in the document database 201), reference system scores 305, and map scores 307—is what affords a rich and flexible set of mechanisms for document search. This includes text-based queries 310, document-based queries 311, and map-based queries 312.

The API through which the corresponding interaction with the inference server component 204 is handled is called the reference system API 205, reflecting the central role played by the high-dimensional reference system in the processing of queries.

A distinction can be made between how a reference system score for a query is determined depending on the different query triggers, such as the triggers at 314, 315 and 316 for the text-based queries 310, document-based queries 311, and map-based queries 312, respectively. However, in each case, once the query is transformed into a query reference system score, its similarity to the reference system scores 305 stored in the database server 301 can be evaluated. Documents from the document database 201 are then processed according to similarity to the query (as shown in a process 1500 in the flowchart of FIG. 15).

The particular steps, order of steps, and combination of steps of process 1500 is shown for explanatory purposes only. Other embodiments may use other steps or combinations of steps or in a different order to perform the same general functions. Additionally, one or more applications, routines and physical devices can perform the process 1500.

Using the received text-based query 310, document-based query 311, or map-based query 312, the application server 302 determines the query reference system score 1505 described above. At 1501, the application server 302 determines the query-to-document similarity (similarity scores) using the query reference system score 1505 and the document reference system score 305. At 1502, the application server 302 uses the document ID (docid) to get or access the metadata for the documents from the document database 201 and combines this metadata with the similarity values. For each document, the document ID, metadata, and similarity value is passed as attributes to 1504 Additionally, at 1503, the application server 302 uses the document IDs (docid) for the documents to get or access the geometry of the documents from the map scores 307. Then, using the attributes obtained at 1502 and the geometry of the documents obtained at 1503, the application server 302 builds (at 1504) the query response 313. The query response 313 can be used as input to the map display 317 and the list display 318.

The following is an example for a text-based query ("type=text") of a specified portion of document database 201 ("collection=scidata"), with the text to be extracted from the URL supplied by the input parameter:

http://localhost:8080/DATA/services/query?collection=scidata&type=text&sort=minscore&size=100&input=https%3A%2F%2Fen.wikipedia.org%2Fwiki%2FGlobal_Positioning_System Further parameters could be added as needed, examples being temporal filters ("startdate", "endsdate"), maximum dissimilarity threshold ("maxdissim"), maximum number of retrieved items ("size"), a parameter on which to sort retrieved items ("sort"), and other parameters leveraging properties of document content, document metadata, reference system scores, and map scores.

The following shows an example response (i.e. 313) to that above query, with data for the top two documents shown, including retrieved point locations, allowing immediate visualization of the query results in the map:

```
{
meanscore: 0.33,
minscore: 0.090,
count: 100,
maxscore: 0.454,
type: "FeatureCollection"
   "features": [
      {
         "geometry": {
            "coordinates": [
               -127.48144,
               0.007039
            ],
            "type": "Point"
         },
         "type": "Feature",
         "properties": {
            "score": 0.090,
            "cat2": "Science China Technological Sciences",
            "cat3": "Sci. China Technol. Sci.",
            "cat": "Zhang JianJun and Xue Ming and Xie Jun",
            "id": "2cdcd221-3c6a-34a3-8bfc-b23736f7c560",
            "label": "Research on assessment method of intrasystem and intersystem
of the global navigation satellite system",
            "time": "2015-07-09"
         }
      },
      {
         "geometry": {
            "coordinates": [
               -127.481465,
               0.007025
            ],
            "type": "Point"
         },
         "type": "Feature",
         "properties": {
            "score": 0.100,
            "cat2": "Sensors",
            "cat": "Dabove, Paolo and Manzino, Ambrogio M.",
            "id": "9c0a4677-93e6-3ddb-b786-b00e3abb83e4",
            "label": "GPS & GLONASS Mass-Market Receivers: Positioning Performances
and Peculiarities",
            "time": "2014-11-25"
         }
      },
      ...
]}
```

1.5.2.1 Visualizing the Query Response

Figure 16:
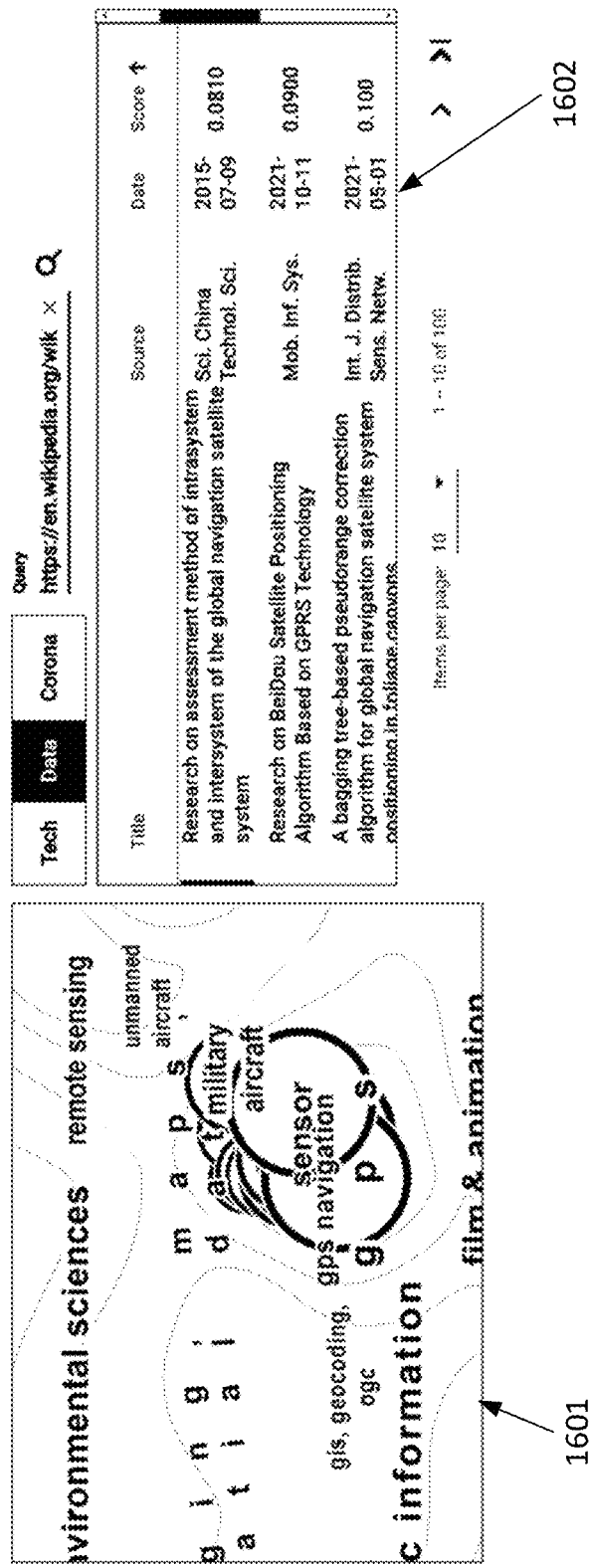
FIG. 16 illustrates an example for a text-based query being processed using a URL as input and the resulting query response being produced and displayed in accordance with FIG. 15, in accordance with some embodiments. The query response is displayed as map overlay of documents and as a sortable list of documents and one selected document is highlighted as point overlay.

The query response 313 returned by the Reference System API contains information that allows visualization of the discovered documents in the map space (at 317) and as a sortable list (at 318). The query response also contains data that can be used for symbol styling and similar operations. Examples are the maximum and minimum scores of the documents contained in the query response, which allow size scaling and color scaling (e.g., where size, color and shading indicate relevance of underlying documents) in a map display 1601 and a list display 1602 (FIG. 16). Examples of map displays 1703-1705, the list display 1602, and a content display 1706 are also shown in FIG. 17.

Figure 17:
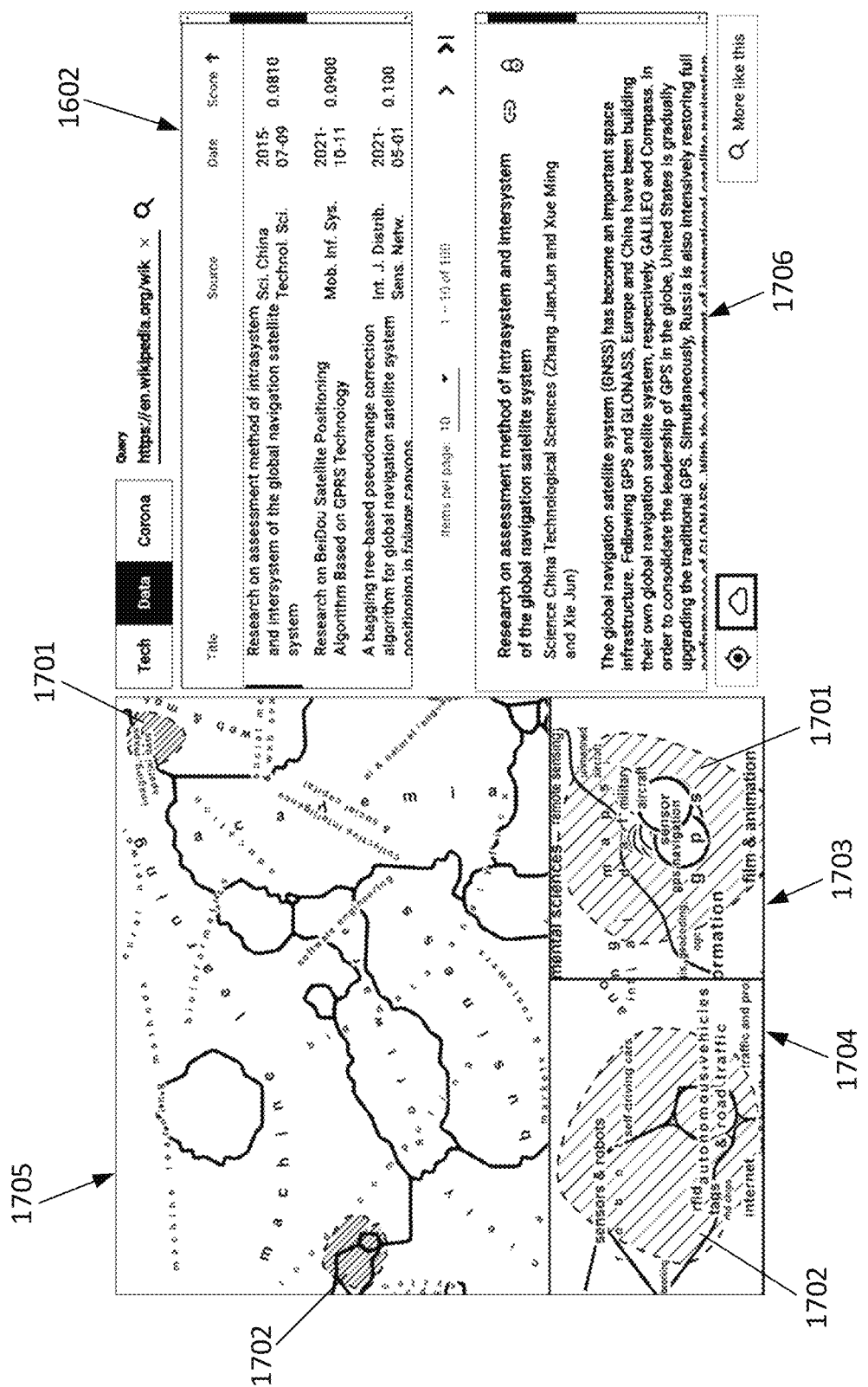
FIG. 17 illustrates an example for a text-based query being processed using a URL as input and the resulting query response being produced and then displayed in accordance with FIG. 15, in accordance with some embodiments. The query response is displayed as clustered map overlay and as a sortable list of documents and one selected document is highlighted as area overlay.
Figure 18:
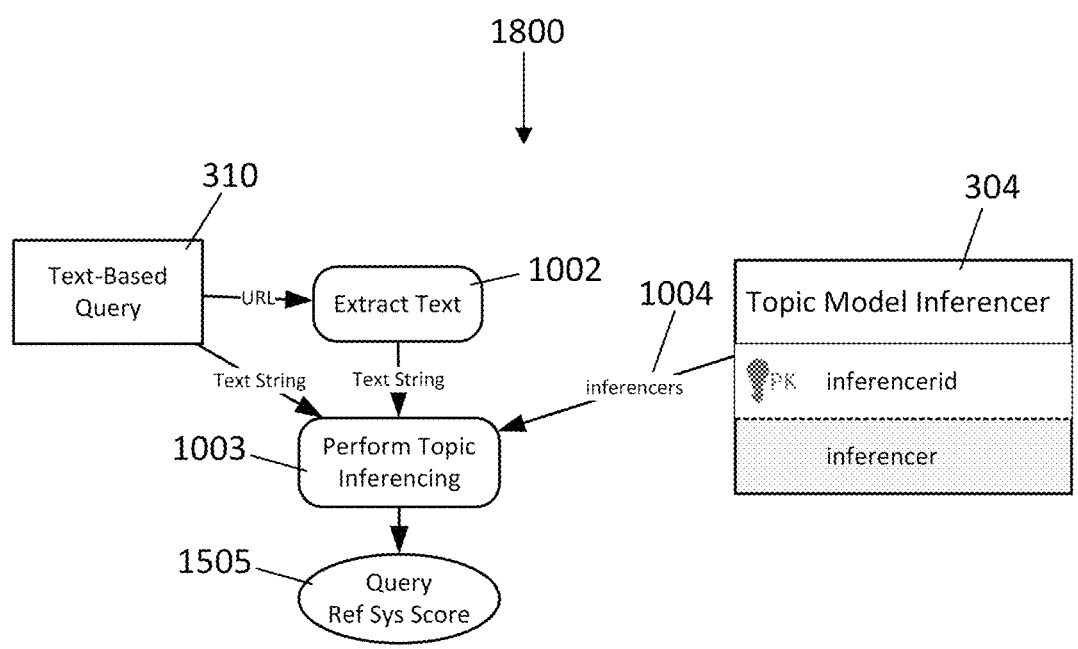
FIG. 18 is a flow chart showing an example process for processing a text-based query into a query reference system score in accordance with a text-based query of FIG. 3, in accordance with some embodiments.

The map and list displays 1601 and 1602 both allow point-and-click selection of documents and having selected documents visually highlighted using the methods of feature overlay, including but not limited to point overlay (FIG. 16) and polygon overlay (FIG. 17). Different embodiments could symbolize these overlays in many different ways, in accordance with the full range of techniques known in the fields of cartography and data visualization. As one example, for the point overlays in FIG. 16, the size of the point overlay circles are indicative of the similarity score, e.g., larger size indicates a better similarity score, and smaller size indicates a worse similarity score. Generating the feature overlays is sped up by having the map scores 307 of individual documents stored in the document database 201, from which specific geometry for the feature overlays can then be constructed on-the-fly, such as point, line, polygon, or landscape. This flexibility in document visualization allows an examination of more subtle patterns in how a document fits into the map space. For example, the top-ranked document in the query for the Wikipedia page on GPS ("https://en.wikipedia.ordwiki/Global_Positioning_System") has its best fit (point location) in the region labeled "gps" (as shown in FIG. 16), but switching to a polygon overlay (FIG. 17) reveals the selected document to strongly fit into two regions 1701 and 1702, the "gps" region in the top-right and the "autonomous vehicles & road traffic" region towards the left. These can be investigated in more detail, as shown in the finer detailed views 1703 and 1704, respectively, of the coarser map display 1705 (FIG. 17). In these examples, the point overlays shown in FIG. 16 become apparent in the finer map display 1701 in FIG. 17.

1.5.2.2 Text-Based Document Query

Document search can be driven (i.e., the text query trigger 314) by a text string, which could either be expressly entered or extracted from an external source indicated by a resource locator. The query reference system score 1505 for that query is computed by performing topic inference on the text string at 1003 (as shown within process 1800 in FIG. 18).

The following is an example query, with the query implemented in a REST API, specifying the collection of documents to query ("scidata"), the query type ("text"), and the input text string ("GPS").

```
http://localhost:8080/DATA/services/query?collection=scidata&t
    ype=text&input=GPS
```

1.5.2.3 Document-Based Query

Figure 19:
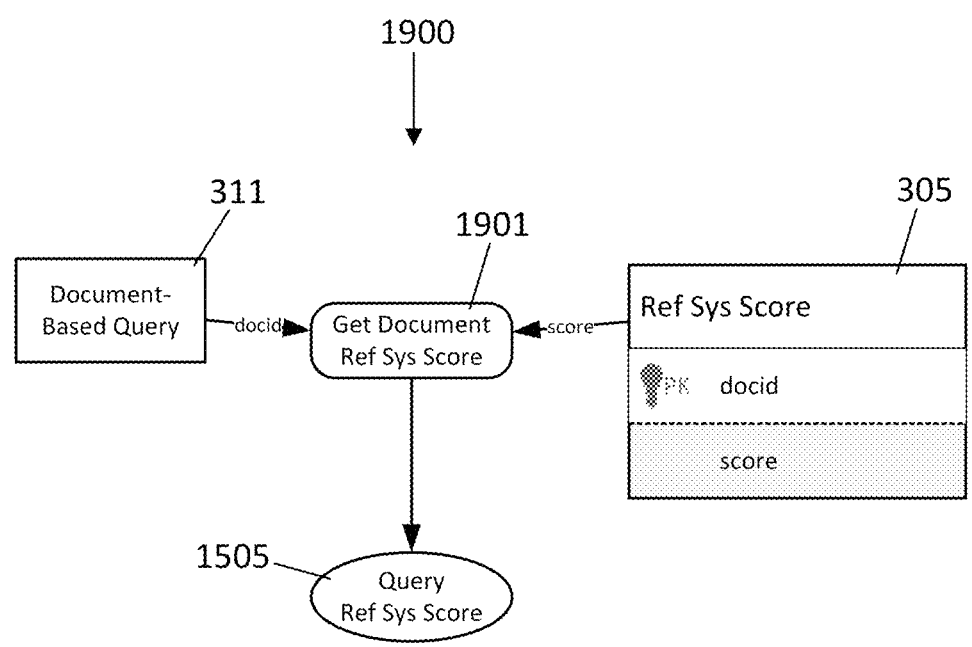
FIG. 19 is a flow chart showing an example process for processing a document-based query into a reference system score in accordance with a document-based query of FIG. 3, in accordance with some embodiments.

A query can emanate from any document (i.e., the document query trigger 315) that has already been represented by a reference system score 305 in the database server 301. This is the simplest form of a document-based query 311, since process 1901 simply includes retrieving the reference system score of a document from the stored reference system scores 305, based on the document ID (i.e. docid) provided by the document-based query 311 (as shown in FIG. 19). That retrieved document reference system score can then be used as the query reference score 1505.

The following is an example, with the query implemented in a REST API and specifying the collection of documents to query against ("scidata"), the query type ("doc"), and the identifier of the document from which the query is emanating, such as a UUID ("2cdcd221-3c6a-34a3-8bfc-b23736f7c560").

```
http://localhost:8080/DATA/services/query?collection=scidata&t
    ype=doc&uuid=2cdcd221-3c6a-34a3-8bfc-b23736f7c560
```

In processing the query, the reference system score 305 of the document is retrieved from the database server 301, based on its identifier (docid). The similarity of that reference system score to the reference system scores of other documents in the database server 301 is computed and documents ranked according and retrieved.

A document-based query could be triggered by interacting with any discrete depiction of the source document, including but not limited to a map symbol representing the document (e.g., one of the circles in FIG. 16, left image), an entry in a list display 1602 of documents (e.g., any one of the documents in FIG. 16, right image), or a preview of the document (e.g., via a "More like this").

1.5.2.4 Map-Based Document Query

With the map-based query for documents (i.e., the map location trigger 316), the disclosed system introduces a radically different approach to search and serendipitous discovery in a knowledge space. This approach is designed to counteract some shortcomings of text-based and document-based queries. The text-based query requires general familiarity with the concepts of a particular domain. For example, entering a query for the text string "GPS" or the URL "https://en.wikipedia.org/wiki/Global_Positioning_System" requires some familiarity with domain concepts and terminology. Meanwhile, document-based query requires having already identified a particular document as the starting point.

In contrast, the map-based query does not require prior familiarity with domain concepts and does not require having a document of interest already identified. Instead, by presenting domain concepts in a highly interactive visualization, users are able to serendipitously discover domain concepts. This includes hierarchical relationships that are exposed through zoom operations. Simple point-and-click interactions in regions of interest are then used to trigger map-based queries for documents that are related to the query location or even multiple query locations.

1.5.2.4.1 Query Geometry

Figure 20:
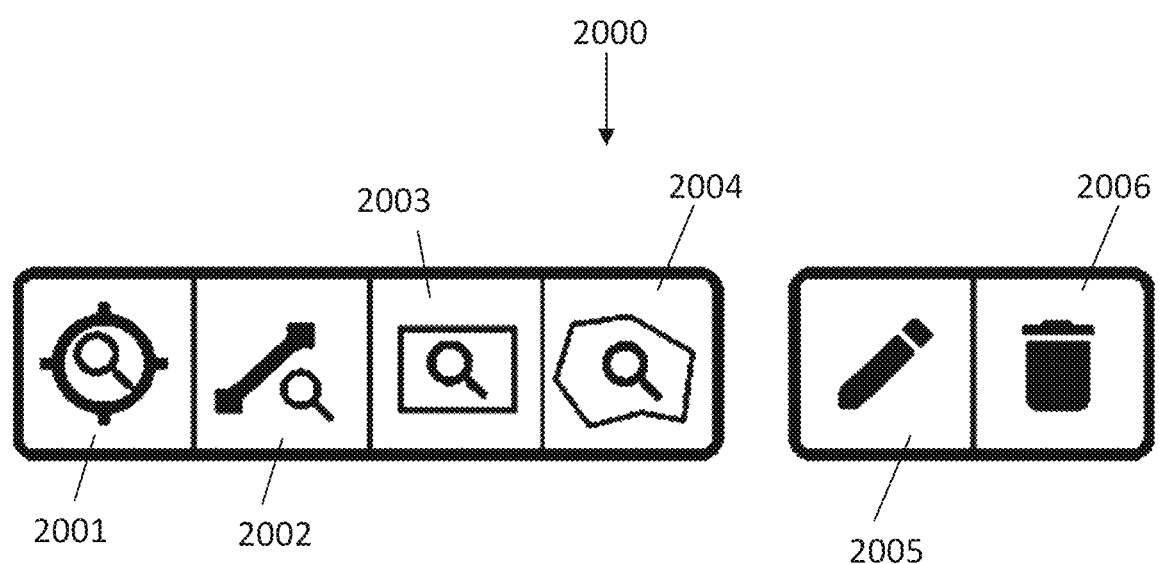
FIG. 20 illustrates an example of a user interface widget for choosing query geometry type for map queries and performing editing and deletion of query geometry in accordance with a map location trigger of FIG. 3, in accordance with some embodiments.

In a map-based query, users trigger the query by entering geometric information on the map, which is received by the system. This user-generated query geometry input information could include a single geometric object, such as a point, line, or area or it may include multiple geometric objects, such as multiple points, lines, or areas, or mixtures thereof, according to user interactions determined by receiving user input selections in a user interface 2000 for causing a map location trigger 316 as shown in FIG. 20. The user interface 2000 includes a point input button 2001 for user input of a geometric point, a line input button 2002 for user input of a geometric line, a regular rectangle input button 2003 for user input of a regular rectangular geometric area, an irregular polygon input button 2004 for user input of an irregular polygon geometric area, an edit button 2005 for editing the query geometry input information, and a delete button 2006 for deleting the query geometry input information.

1.5.2.4.2 Query Targets

A map-based query involves computing a spatial overlay between the query geometry and the geometry of query targets. In other words, the map location of the query geometry is matched to the map location of query targets.

If the set of query targets includes the set of documents that are actually being queried, then the map-based document query can be executed exclusively in the map space. This is referred to as direct document targeting.

Meanwhile, with indirect document targeting, the query targets are different from the documents being queried. In that case, it is the high-dimensional reference system that serves as the link between query targets and the documents that are actually being queried.

1.5.2.4.2.1 Direct Document Targeting

Figure 15:
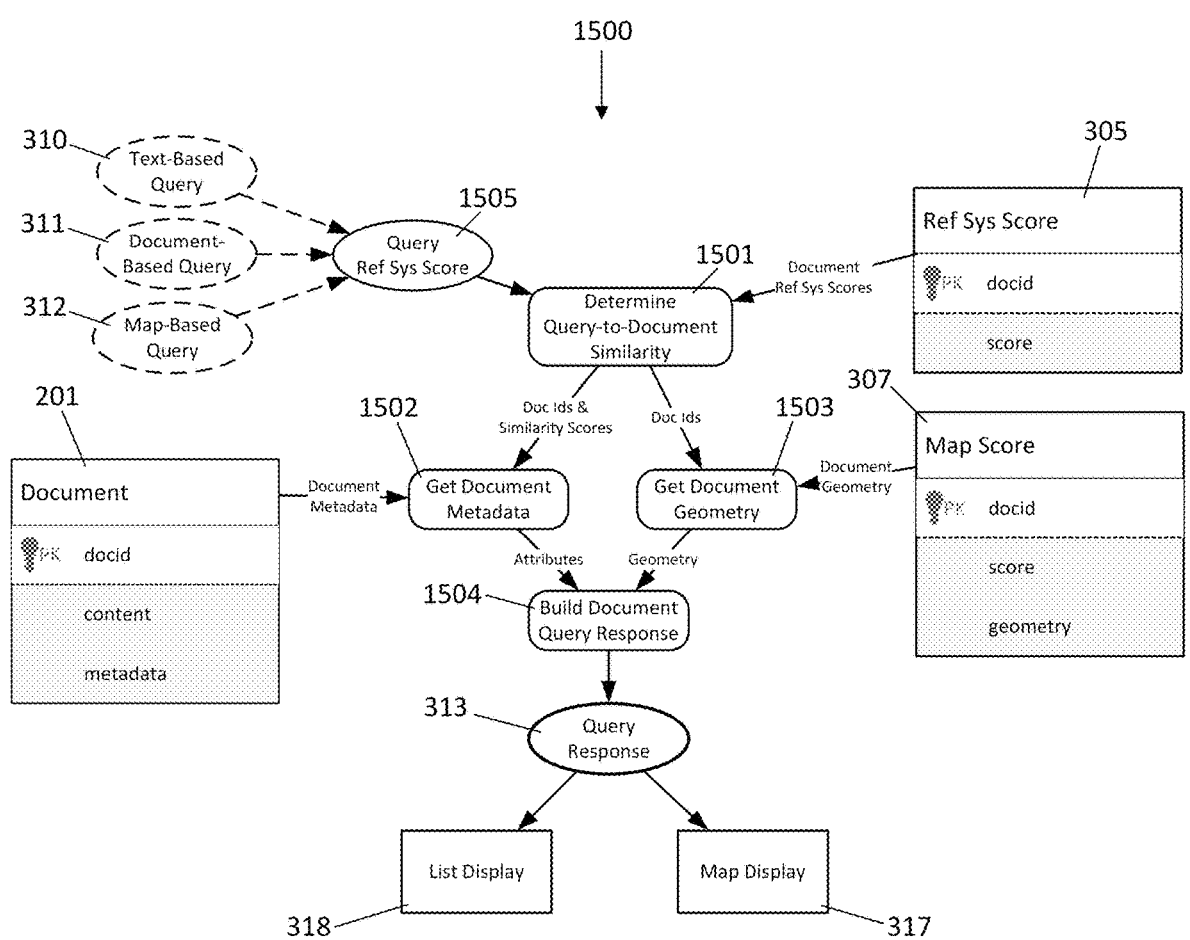
FIG. 15 is a flow chart showing an example process for processing a reference system score representing a query into a query response in accordance with an Application Server component of FIG. 3, in accordance with some embodiments.

The database server 301 contains a map score 307 for each document in the document database 201. Since the map score 307 (as shown in FIG. 15) in the database server 301 includes explicit geometric information for each document, that information can be used as target geometry. In other words, documents already have geometric information, and executing a map-based query can be performed through spatial overlay of query geometry with document geometry in the low-dimensional map space to identify matching documents.

While this spatial overlay operation in map space can be executed at great speed, it may result in a large number of matched documents, especially when the query geometry includes large rectangle or polygon area objects, long line objects, or many objects overall. In that case, meaningful ranking and filtering of documents based on high-dimensional similarity between query objects and matched documents is desirable. Consequently, the methods for processing of map queries described below are invoked.

1.5.2.4.2.2 Indirect Document Targeting

The rationale for an indirect targeting of documents is best understood in terms of the nature of similarity relationships between entities, specifically that the rank order of similarities between entities is not symmetric. For an example, consider the similarity computed between the reference system score of a document "A" and the reference system score of a base map element "B". If the entry for "B" in the map score of "A" indicates that "B" is the most similar element with respect to "A" then the point location of "B" will determine the point location of "A". However, since the rank order of similarities is not symmetric, "A" may not be the most similar document with respect to "B". Thus, unless a user explicitly chooses to directly select documents in the map space (i.e., direct document targeting), a more reasonable interpretation of a map query is that the user is interested in documents that are representative of the portion of the high-dimensional space that is depicted in the selected map region. That is what indirect document targeting provides.

The only requirement for query targets to be usable during indirect document targeting is that each target needs to be associated with (1) a map location, used to target it, and (2) a reference system score, since that will be the basis for computing similarity to the reference system scores of documents in the database.

As has been shown, in the system disclosed here there are two types of objects for which a low-dimensional map location and a high-dimensional reference system score are stored: base map elements and documents. The map model contains explicit low-dimensional geometry and a vector of topic loadings for each base map element. Meanwhile, a document processed by the system will have a reference system score 305 and a map score 307.

Accordingly, either the base map elements 306 or any set of processed documents could serve as query targets. In the latter case, if documents are used as indirect query targets, then reference system scores 305 and map scores 307 can together take the place of base map elements 306 in processes 2200, 2300, 2500, and 2700 (FIGS. 22, 23, 25, 27). Importantly, there is no requirement for query targets to be explicitly visible. Instead, the fact that the visible map, the query targets, and processed documents all share the same underlying low-dimensional space means that any query performed on the visible map can be matched against the stored geometry of query targets, even if these are not visible at the time.

1.5.2.4.2.3 Spatial Operators

The specific operators and methods for examining the spatial relationship between query geometry and the target geometry through overlay analysis depend on the specific geometric primitives involved. Both query geometry and target geometry may employ point, line, or area primitives. Since the system disclosed here uses representations of geometry that are standard in GIS technology (e.g., as in Longley, et al. (2015))— despite not operating on actual geographic entities—it is possible to use spatial relationship types and operators found in common software implementations. The specifics of this depend on the database and application server technology and programming language used, which would be familiar to someone skilled in GIS. For example, if the geometry of query targets is stored in a MongoDB database, then the MongoDB query selectors $geoIntersects, $geoWithin, and $near are applicable. Alternatively, if target geometry is stored in a PostGIS database, then such spatial join operators as ST_Intersects, ST_Contains, or ST_DWithin could be used. These operators can be accessed via the corresponding data base APIs in specific programming languages. (Longley, et al. (2015) (Longley, P. A., Goodchild, M. F., Maguire, D. J., & Rhind, D. W. (2015), *Geographic Information Science and Systems*, Wiley) is incorporated herein by reference.)

Figure 21:
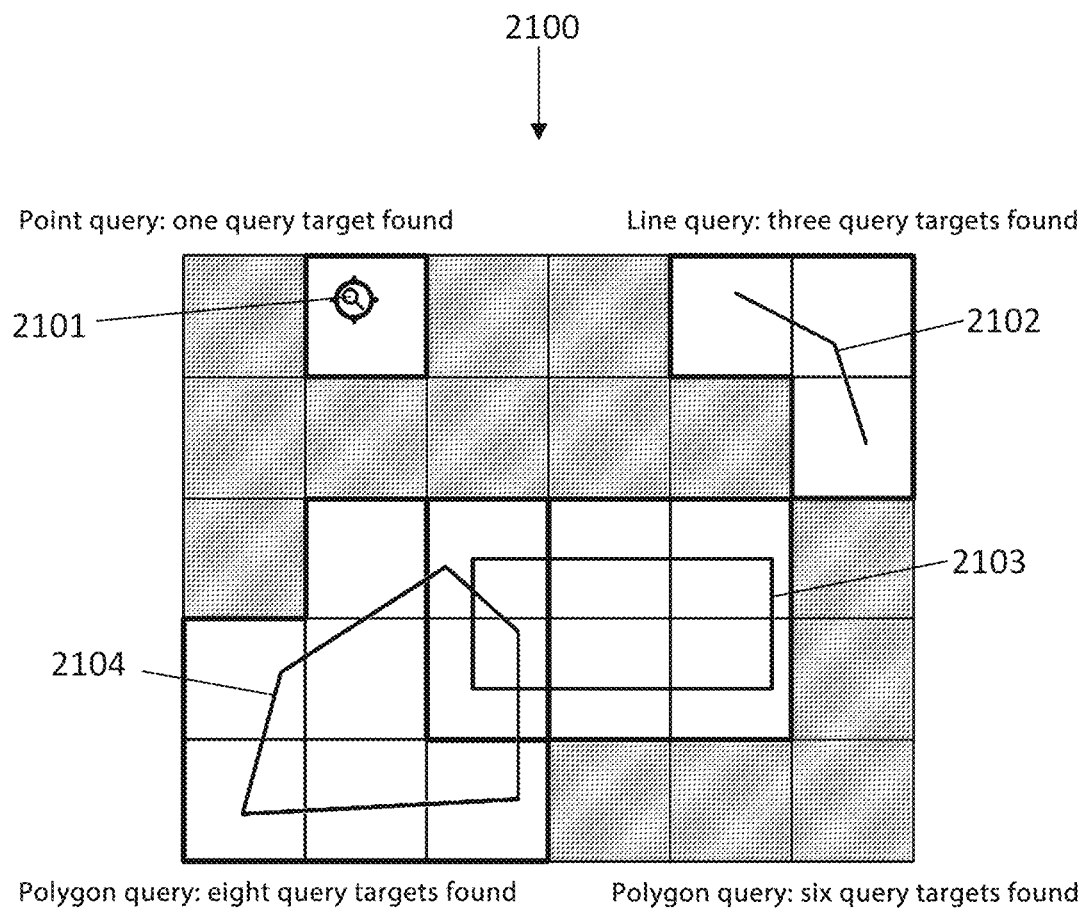
FIG. 21 illustrates examples for how query targets can be identified for further processing by performing spatial matching between query geometry and query targets in accordance with a map-based query of FIG. 3, in accordance with some embodiments.

FIG. 21 illustrates how spatial matching between the geometry of map-based queries and the geometry of query targets occurs. The illustrated geometric map queries in simplified base map 2100 include a point query 2101 (selecting or finding one query target), a line query 2102 (selecting or finding three query targets), a regular rectangle polygon query 2103 (selecting or finding six query targets), and an irregular polygon query 2104 (selecting or finding eight query targets). If this example represented a single map query, it would involve a user entering all four query objects, specifically the one point object, one line object, and two polygon objects. These are found to spatially intersect with sixteen different query targets, including two duplicate query targets identified by both polygon queries.

1.5.2.4.3 Processing of Map Queries

The system supports two different approaches for processing of map-based queries. One approach involves the creation of a single query reference system score by performing an aggregation of reference system scores of matching query targets. The similarity of that query reference system score to the reference system scores of documents can then be computed. The other approach involves the recognition of groupings of query targets and associated documents, to which logical and numerical operators are then applied.

1.5.2.4.3.1 Map Query with Aggregation of Reference System Scores

Figure 22:
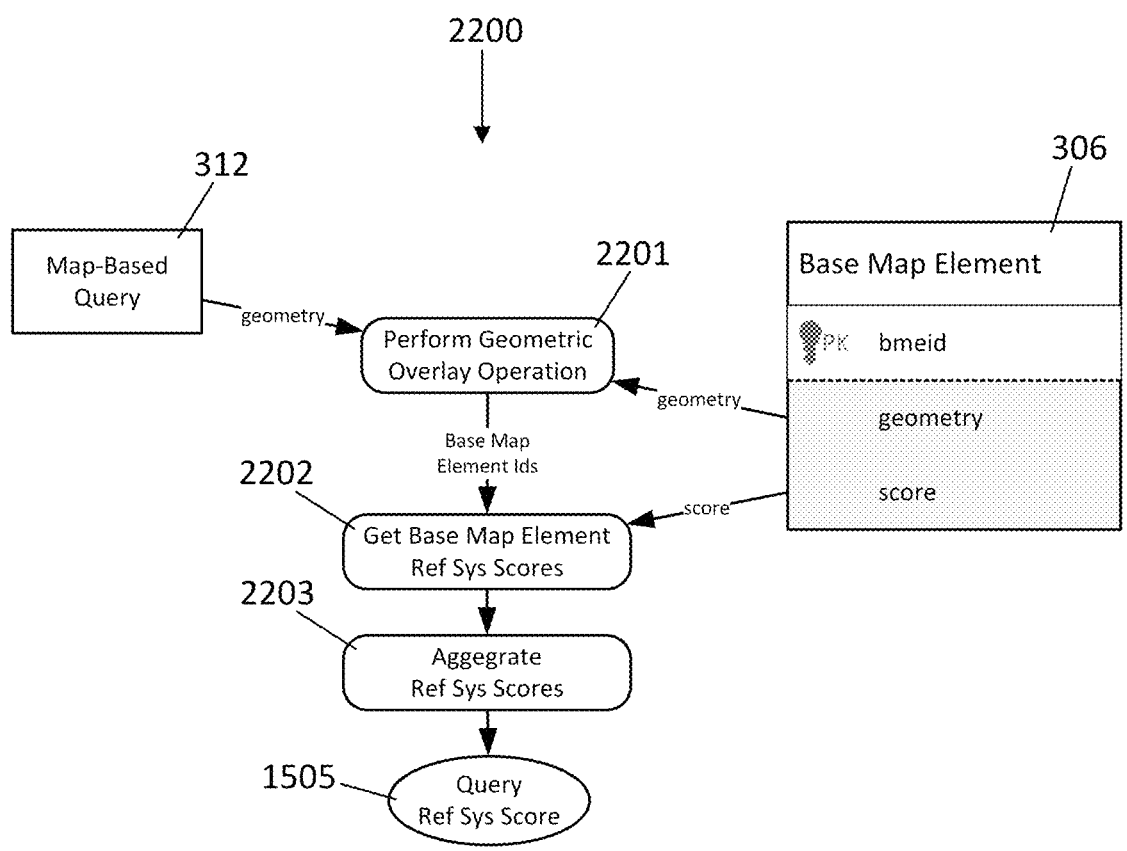
FIG. 22 is a flow chart showing an example process for processing a map query into a query reference system score by aggregating the reference system scores of base map elements identified through a spatial overlay operation in accordance with the Map-based Query component of FIG. 3, in accordance with some embodiments.
Figure 23:
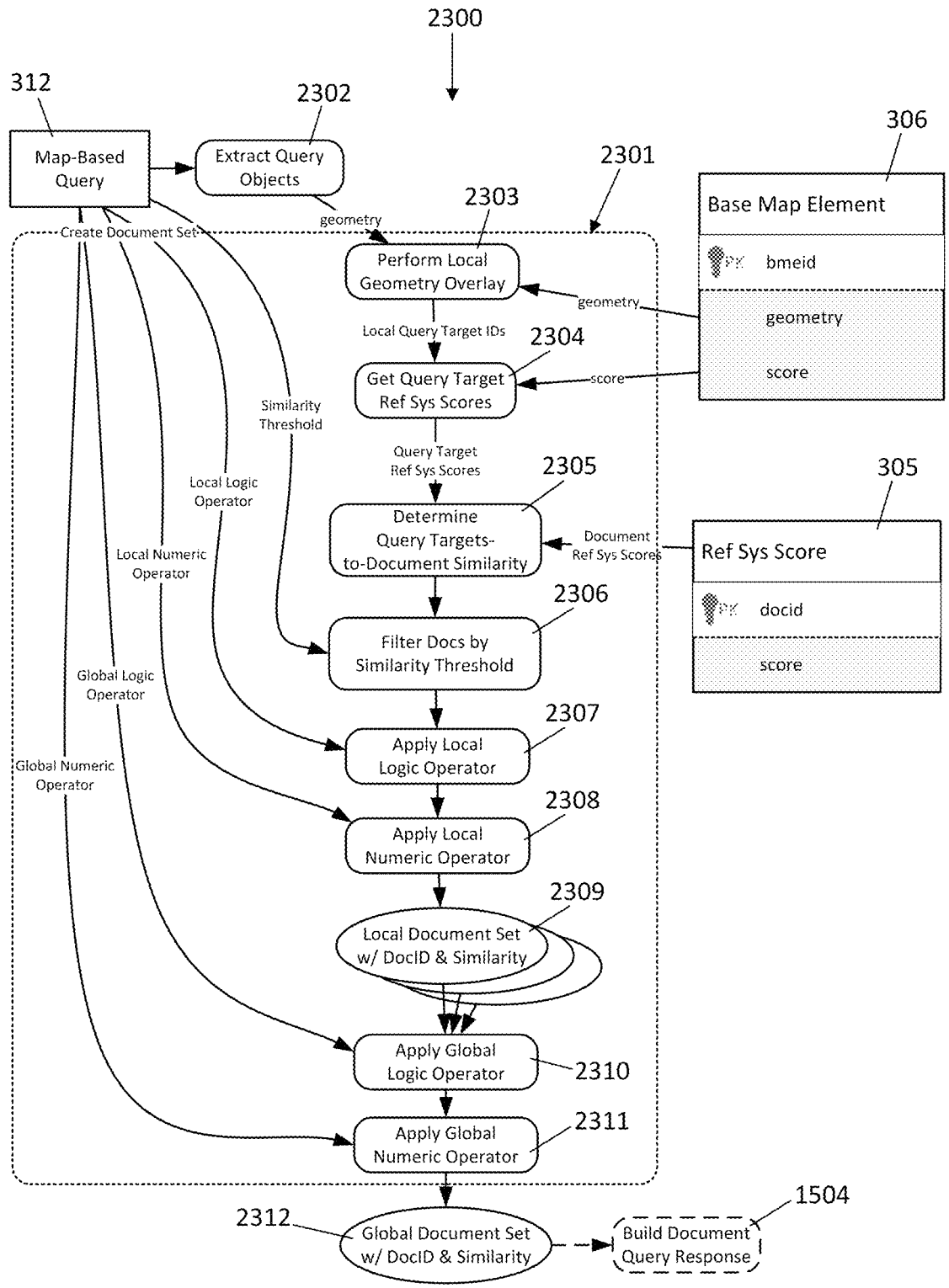
FIG. 23 is a flow chart showing an example process for processing a map query in accordance with the Map-based Query component of FIG. 3, by extracting multiple query objects from the query, creating a local document set for each query object, and combining local document sets into a global document set, in accordance with some embodiments.

The simplest form of map-based query produces a reference system score by performing an overlay operation (at 2201) between the query geometry (from the map-based query 312) and the target geometry (from the base map elements 306) and aggregating the targets' reference system scores as shown in a process 2200 of the flowchart in FIG. 22. The particular steps, order of steps, and combination of steps of process 2200 is shown for explanatory purposes only. Other embodiments may use other steps or combinations of steps or in a different order to perform the same general functions. Additionally, one or more applications, routines and physical devices can perform the process 2200.

Since the query geometry may include one or more point, line, or area objects, there may be multiple query targets with matching map location. For example, FIG. 21 illustrates a query that includes four query objects and a total of 30 query targets. The overlay operator results in sixteen different query targets being spatially matched (e.g., at 2201) and their reference system scores extracted (e.g., at 2202).

After retrieving (at 2202) the reference system scores of spatially matched targets (based on the results of the overlay operation at 2201), the scores are then aggregated (at 2203) into a single query reference system score 1505 by a suitable numerical operator. An example numerical operation would be to compute an average value for each dimension (i.e., topic loading) across all the matched query targets. Application of the numerical operator results in an aggregate reference system score that can then serve as the query reference system score 1505. The similarity of that score to the stored reference system scores of documents can then be computed (FIG. 15) to generate the query response 313.

1.5.2.4.3.2 Map Query with Local and Global Operators

While conceptually simple, the aggregation of multiple reference system scores into a single score for the query ignores nuanced patterns in how the high-dimensional topic space is distributed across the low-dimensional map space. This can be addressed by a more complex approach that investigates sets of documents associated with query targets as shown in a process 2300 in the flowchart of FIG. 23, which includes a create document set component 2301 (2303-2311) to create a document set with which to build the document query response. The particular steps, order of steps, and combination of steps of process 2300 is shown for explanatory purposes only. Other embodiments may use other steps or combinations of steps or in a different order to perform the same general functions. Additionally, one or more applications, routines and physical devices can perform the process 2300.

The map-based query 312 contains query objects, a similarity threshold, a local logic operator, a global logic operator, and a global numeric operator. The application server 302 extracts (at 2302) the query objects from the map-based query 312. At 2303, the application server 302 performs a local geometry overlay using the geometry from the extracted query objects and the geometry of the base map elements 306 to obtain local query target IDs, which identifies the base map elements that match the geometry of the query objects. At 2304, the application server 302 gets the reference system scores (i.e., query target reference system scores) from the base map elements 306 for the query targets identified by the overlay at 2303. At 2305, the application server 302 determines the similarity values (i.e., query targets-to-document similarity) between the query target reference system scores and the reference system scores 305 for all of the documents. At 2306, the application server 302 filters the documents according to the similarity threshold to filter out documents that have a low similarity value, so only the more highly relevant documents remain. At 2307, the application server 302 applies the local logic operator as described below. At 2308, the application server 302 applies the local numeric operator as described below. After 2306-2308, the application server 302 has reduced the initial documents to a local document set 2309, with document IDs (DocID) and similarity values. If the map-based query 312 contains multiple query objects that are extracted at 2302 then 2303-2308 are executed for each of those query objects. This results in multiple local document sets 2309. At 2310, the application server 302 applies the global logic operator to th local document sets as described below. At 2311, the application server 302 applies the global numeric operator as described below. At this point, the application server 302 has assembled a global document set 2312, in which each document has a document ID (DocID) and a similarity value. The global document set 2312 is used to build the document query response (at 1504).

The basic principle is to determine for each identified query target a list of documents, ranked by similarity of target reference system score to document reference system score (as determined at 2305), aggregate that into one local set of documents 2309 per query object (at 2306-2308), and aggregate (at 2310-2311) those local sets into a single, global set of documents 2312.

Similarity Threshold. As there may be reference system scores for a very large number of documents stored, it is advisable to apply a similarity threshold to filter out documents with insufficient similarity value (at 2306).

Local Logic Operator. With the exception of a point query object, there may be multiple query targets spatially associated with one query object (see FIG. 21). In other words, for a given query object, there may exist a local group of query targets. Each individual target within that group has its own set of similarity-ranked documents (as determined at 2305). For example, a line query object intersecting three query targets (FIG. 21) results in three document sets. These target document sets are combined into a local document set 2309 by applying a logic operator and a numeric operator. The logic operator specifies the manner in which the association of a document with multiple target document sets is considered. For example, when using the local AND operator, a document is only considered for the local set if it is associated with all query targets within the local group. This will favor documents that are associated with the full extent of a query object. Alternatively, the local OR operator allows any document that is associated with any of the local query targets to be considered.

Local Numeric Operator. If a document is associated with multiple local query targets, then there is the question of how to combine the different similarity values. For example, a document associated with three local targets will accordingly have three different similarity values. Useful numeric operators include, but are not limited to the local average, local sum, local best score, and local worst score. These are chosen in conjunction with the choice of local logic operator and the size of the query object in the map space. For example, when relaxing local set membership with the local OR operator—which will be necessary for very large query objects—then the local sum or local count operators can ensure that dominant documents still rise to the top of rankings within the local document set.

Global Logic Operator. When multiple map query objects are used in a single query, then this will result in multiple local document sets 2309 created. For example, a query involving four query objects (FIG. 21) will result in four local document sets. These local document sets are combined into a global document set 2312 by applying a logic operator (at 2310) and a numeric operator (at 2311). The logic operator specifies to which degree the occurrence of documents in multiple local document sets is considered. For example, when using the global AND operator, then a document is only considered for the global set if it is associated with all local sets. Meanwhile, the local OR operator allows a document that is associated with any of the local sets to be considered for the global set. Global logic operators allow map queries to function as an intuitive Boolean mechanism for navigating high-dimensional knowledge spaces.

Global Numeric Operator. When merging local document sets 2309 into one global document set 2312, then a document occurring in multiple local sets will have multiple similarity values. The global numeric operator prescribes how to transform these into a single value for the global set. Useful numeric operators include, but are not limited to the global average, global sum, global best score, and global worst score.

Figure 24:
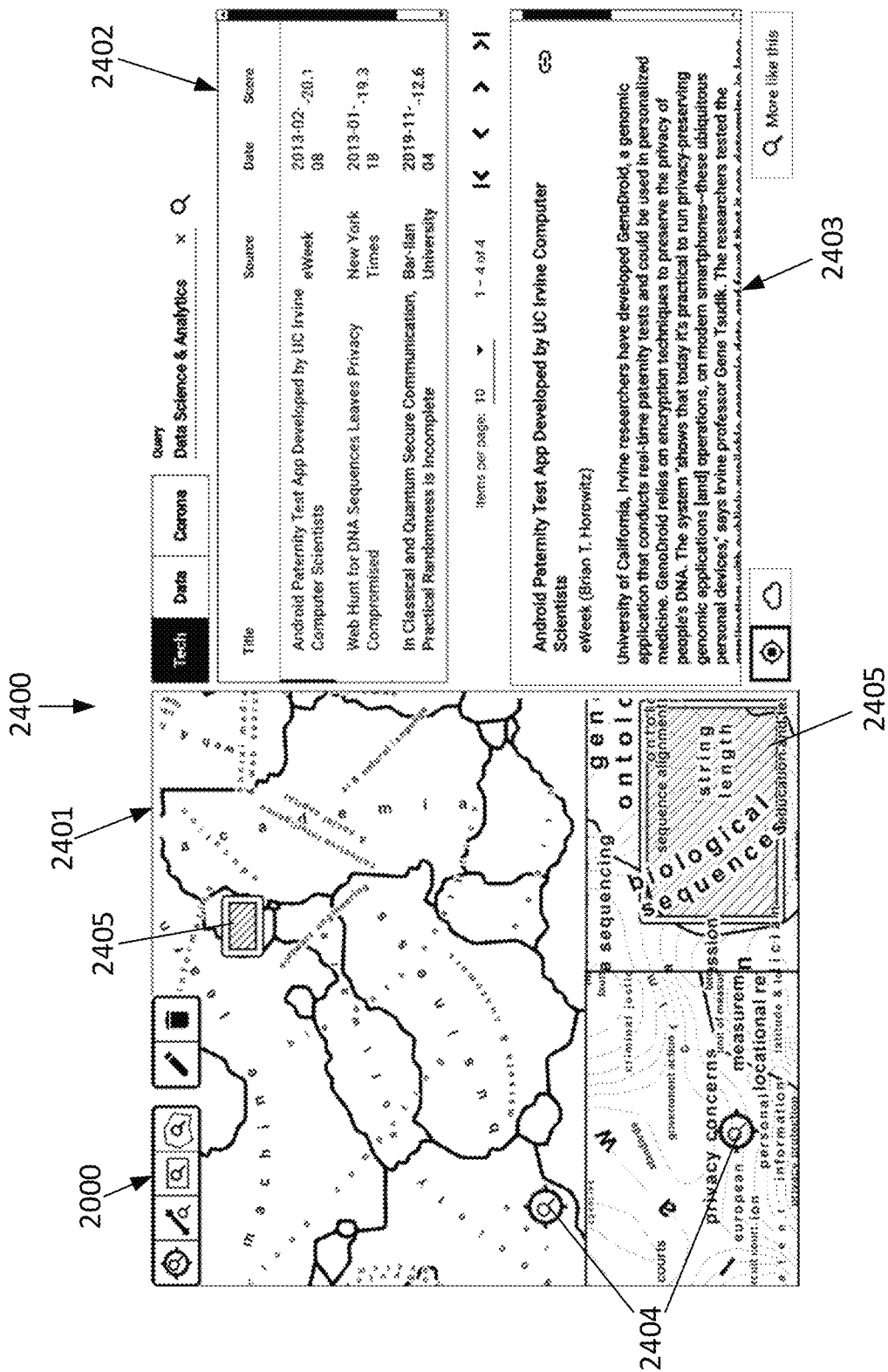
FIG. 24 illustrates an example for how the input of multiple query geometry objects in a user interface results in a query response being processed in accordance with FIG. 23, in accordance with some embodiments.

FIG. 24 shows an embodiment of the present disclosure as a user interface 2400 in a web application showing a map display 2401 (with a point overlay 2404 and an area overlay 2405), a list display 2402, and a content display 2403. In this example, a database containing technology articles is queried using a map-based query, with local OR, local average, global AND, and global sum operators. The user has entered or drawn two map query objects: a point location (at point overlay 2404) in the "privacy concerns" region and a rectangular polygon (at area overlay 2405) in the "biological sequences" region.

For this example, the API call from the web application looks as follows:

```
http://localhost:8080/DATA/services/query?collection=tech&type=loc&sort=min
score&size=100&params=logicoplocal:or,numoplocal:avg,logicopglobal:and,numo
pglobal:sum&input=["type":"FeatureCollection","features":[{"type":"Feature"
,"properties":{ },"geometry":["type":"Polygon", "coordinates":[[[-
127.484172,0.005606],[-127.484172,0.006008],[-127.483704,0.006008],[-
```

```
127.483704,0.005606],[-
127.484172,0.005606]]]}},["type":"Feature","properties":{ },"geometry":{"typ
e":"Point","coordinates":[-127.487499,0.001815]}}]}
```

This query would be URL-encoded for safe passage prior to being issued by the web application. In this embodiment, the query input is encoded in the GeoJSON format, with all query objects contained in a FeatureCollection, which includes one Polygon object and one Point object.

In this web application, the query response is presented as map display 2402 and list display 2403, and the content of the top-ranked document presented in the list display 2403.

1.5.2.4.3.3 Map Query with Negative Selection

Map query objects could also be used to drive negative selection, i.e., to specify regions of the knowledge space from which one does not want to retrieve documents. These negative query objects can either be subjected to a negative logic operator, like a NOT operator, or one can perform a more subtle operation of applying a negative numeric operator. An example for the latter is to attach a negative weight to the similarity values of documents associated with negative regions. This will result in those documents being ranked lower. In conjunction with the similarity threshold (as filtered at 2306 in FIG. 23), it may also eliminate documents from consideration altogether.

Figure 25:
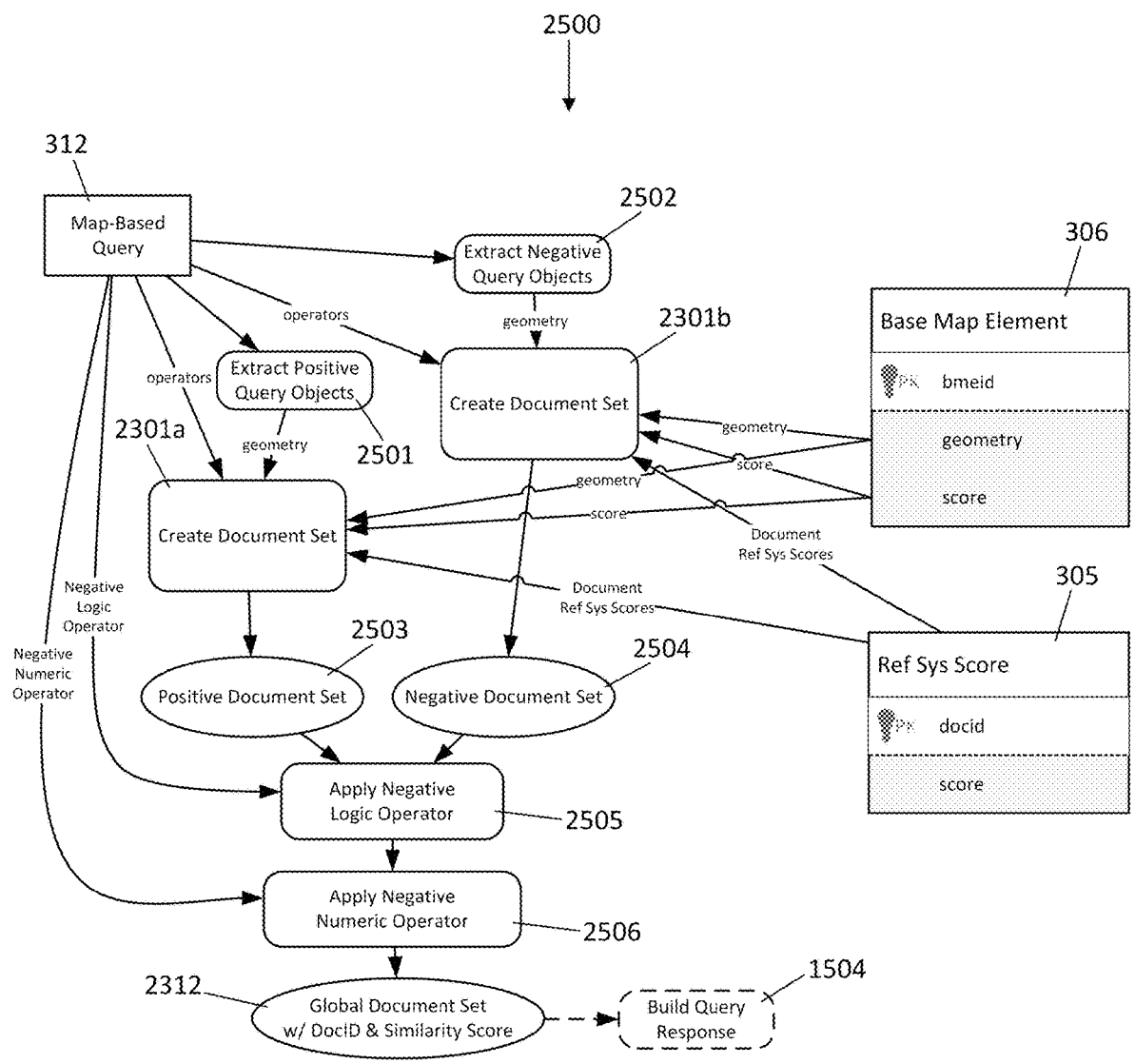
FIG. 25 is a flow chart showing an example process for processing a map query into a set of return documents by distinguishing between positive and negative query components and processing each in accordance with a Create Document Set component of FIG. 23, followed by the application of negative operators to produce a set of return documents, in accordance with some embodiments.

FIG. 25 is a flow chart showing an example process 2500 for processing a map-based query into a query response containing a set of return documents by distinguishing between positive and negative query components and processing each as the local and global document sets 2309 and 2312 (i.e., the create document set component 2301 of FIG. 23), followed by the application of negative operators to produce the set of return documents, in accordance with some embodiments. The particular steps, order of steps, and combination of steps of process 2500 is shown for explanatory purposes only. Other embodiments may use other steps or combinations of steps or in a different order to perform the same general functions. Additionally, one or more applications, routines and physical devices can perform the process 2500.

The map-based query 312 includes operators (e.g., any of the local/global, logic/numeric operators mentioned above with respect to FIG. 23), as well as negative logic and numeric operators. At 2501, the application server 302 extracts positive query objects from the map-based query 312, similar to the extraction of query objects at 2302 above. Additionally, at 2502, the application server 302 extracts negative query objects from the map-based query 312. At 2301a, the application server 302 performs some or all of the above-described steps for the create document set component 2301 (FIG. 23) to create a document set based on the positive query objects, i.e., a positive document set 2503.

Additionally, at 2301b, the application server 302 performs some or all of the above-described steps for the create document set component 2301 to create a document set based on the negative query objects, i.e., a negative document set 2504. At 2505, the application server 302 applies the negative logic operator to the positive document set 2503 and the negative document set 2504. At 2506, the application server 302 applies the negative numeric operator. After 2505 and 2506, the application server 302 assembles the global document set 2312, with document IDs (DocID) and similarity values with which to build the document query response (at 1504).

Like with all queries, this can be communicated from a web application to the application server 302 with minor additions to the API call. Negative map geometry is here included as a second FeatureCollection in the input parameter, separated by double underscores from the positive FeatureCollection (Polygon geometry is abbreviated in this URL snippet), with a negative weight of 0.1 indicating a 10% penalty.

```
http://localhost:8080/DATA/services/query?collection=tech&type=loc&sort=mi
nscore&size=100&params=logicoplocal:or,numoplocal:avg,logicopglobal:and,nu
mopglobal:avg,negweight:0.1&input=["type":"FeatureCollection","features":[
{"type":"Feature","properties":{ },"geometry":["type":"Polygon","coordinate
s":[[[-127.486261,0.002661], ...
127.486261,0.002661]]]}}]} __ ["type":"FeatureCollection","features":[{"type
":"Feature","properties":{ },"geometry":["type"Polygon", "coordinates":[[[
-127.486122,0.001762],[-127.486122,0.002684],[-127.485564,0.002684],[-
127.485564,0.001762],[-127.486122,0.001762]]]}}]}
```

Figure 26:
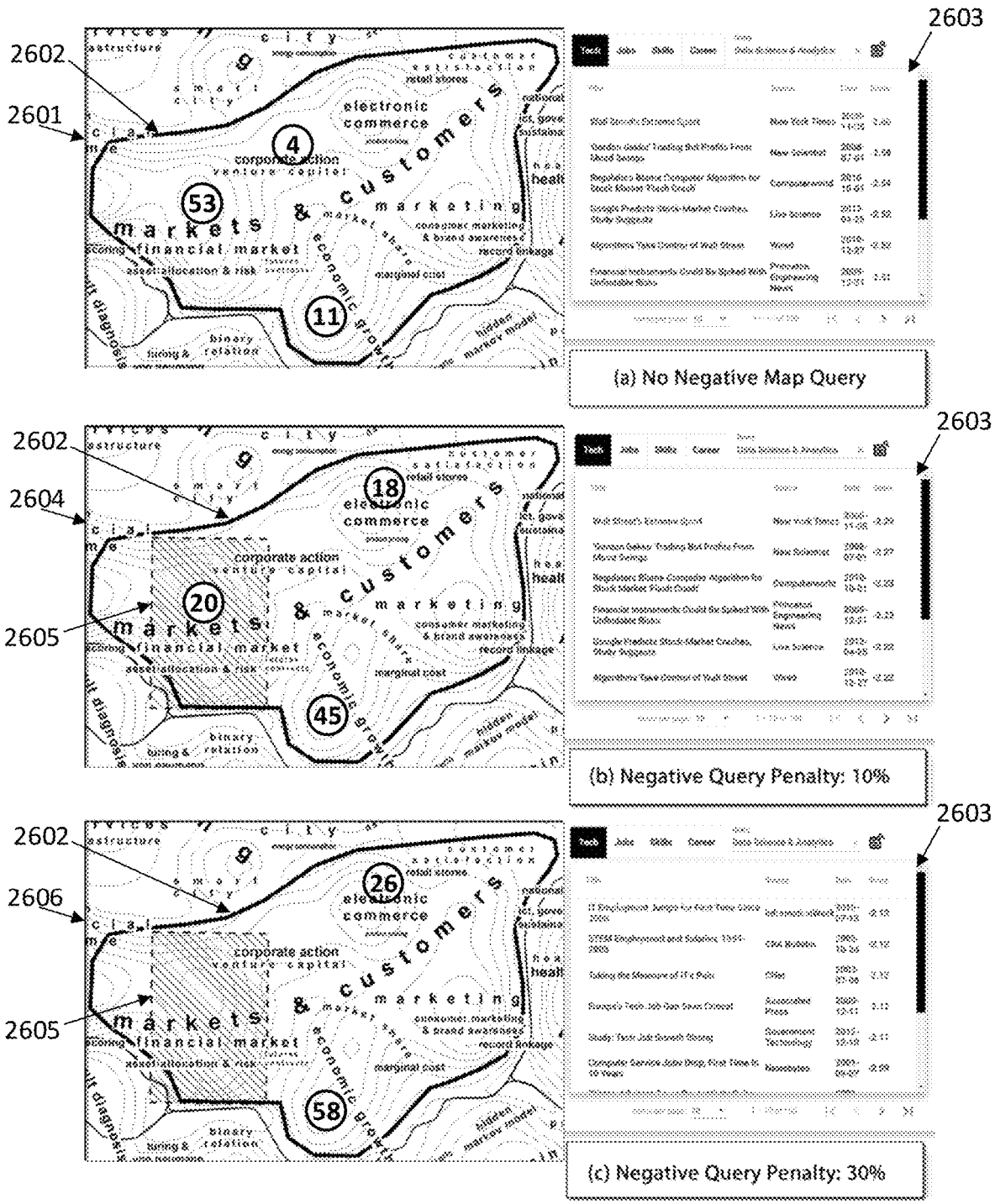
FIG. 26 illustrates an example of the effect of processing a map query containing positive and negative components and varying the negative numeric operator in accordance with FIG. 25, in accordance with some embodiments.
Figure 27:
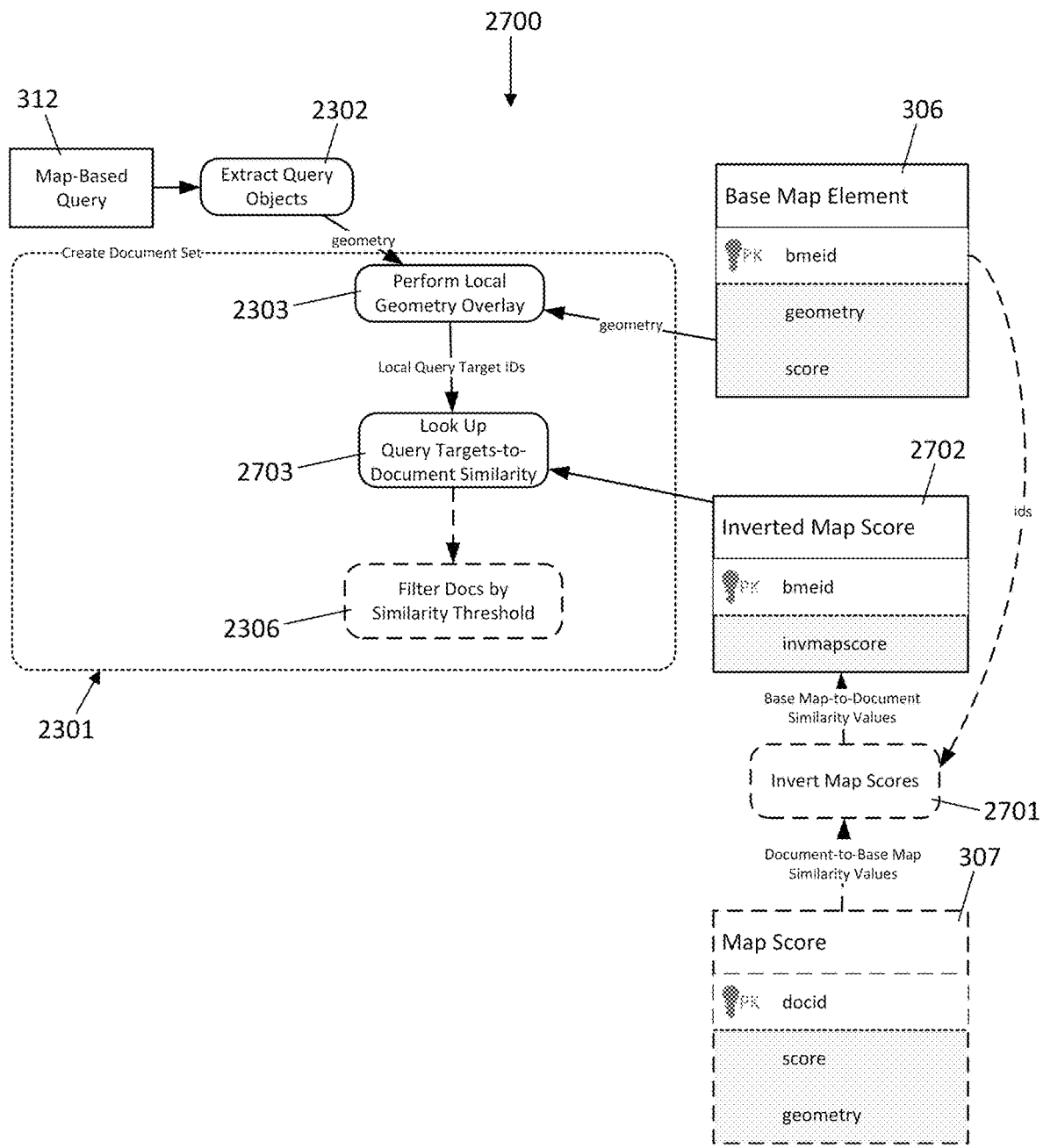
FIG. 27 is a flowchart showing an example process for processing a map query that modifies the Create Document Set component of FIG. 23 to perform a look-up of inverted map scores, in accordance with some embodiments.

FIG. 26 shows the nuanced effect of using a numeric operator to negatively weigh regions in the map. The top panel 2601 shows a query response for a map-based query for documents being visualized, with a large, irregularly shaped query polygon 2602 covering the "markets & customers" region. Of the top 100 ranked documents, a majority of 53% are in the "financial market" area, including the top six documents shown in the list display 2603. The middle panel 2604 shows a negative map-based query 2605 being added, received by user input of a rectangle around the "financial market" region. At 10% penalty for that negative area, the top six documents remain the same in the list display 2603, though with lower scores. More importantly, the top-100 documents are now less dominated by the negative region, with other regions within the positive map query polygon for the query response 2602 receiving recognition, including 45 documents in the "economic growth" region and 18 in the "electronic commerce" area. Finally, the bottom panel 2606 shows the effect of a 30% penalty for the negative map-based query 2605, which results in no documents in the list display 2603 from the "financial market" region making it into to top-100, which are now dominated by "economic growth" and "electronic commerce".

1.5.2.4.4 Map Query with Inverted Map Scores

The execution of map queries as similarity computation between the reference system scores of query targets and documents (e.g., at 2305) performs very well for small to medium sized collections of documents. However, processing times will increase significantly when reference system scores 305 for several hundred thousand documents or more are involved. This can be counteracted by exploiting the fact that the stored map scores of documents 307 already contain a complete accounting of similarities between base map elements 306 and documents in accordance with a process 2700 in the flowchart of FIG. 27. The particular steps, order of steps, and combination of steps of process 2700 is shown for explanatory purposes only. Other embodiments may use other steps or combinations of steps or in a different order to perform the same general functions. Additionally, one or more applications, routines and physical devices can perform the process 2700.

A map score is an array of similarity values between the reference system scores of one document to all base map elements (document-to-base map similarity values). Since each entry in that map score corresponds to one base map element, map scores 307 can be inverted (at 2701) to form inverted map scores 2702, so that each base map element then becomes associated with an array of similarity values to documents and corresponding document identifiers (base map-to-document similarity values). This makes it possible to replace the computation of similarities (at 2305) in the above-described steps for the create document set component 2301 with a fast look-up of stored similarities (at 2703) (look up query targets-to-document similarity) after performing the local geometry overlay at 2303 and before filtering the documents according to the similarity threshold at 2306.

These inverted map scores can similarly be used to speed up text-based queries and document-based queries, where the computation of similarities between query reference system score and document reference system scores can be replaced by a computation of similarities between query reference system score and the scores of base map elements, followed by a look-up of inverted map scores and respective documents. The speed-up is due to the fact that the number of base map elements is generally far smaller than the number of stored documents.

1.6 Overview of Computing Systems

Figure 28:
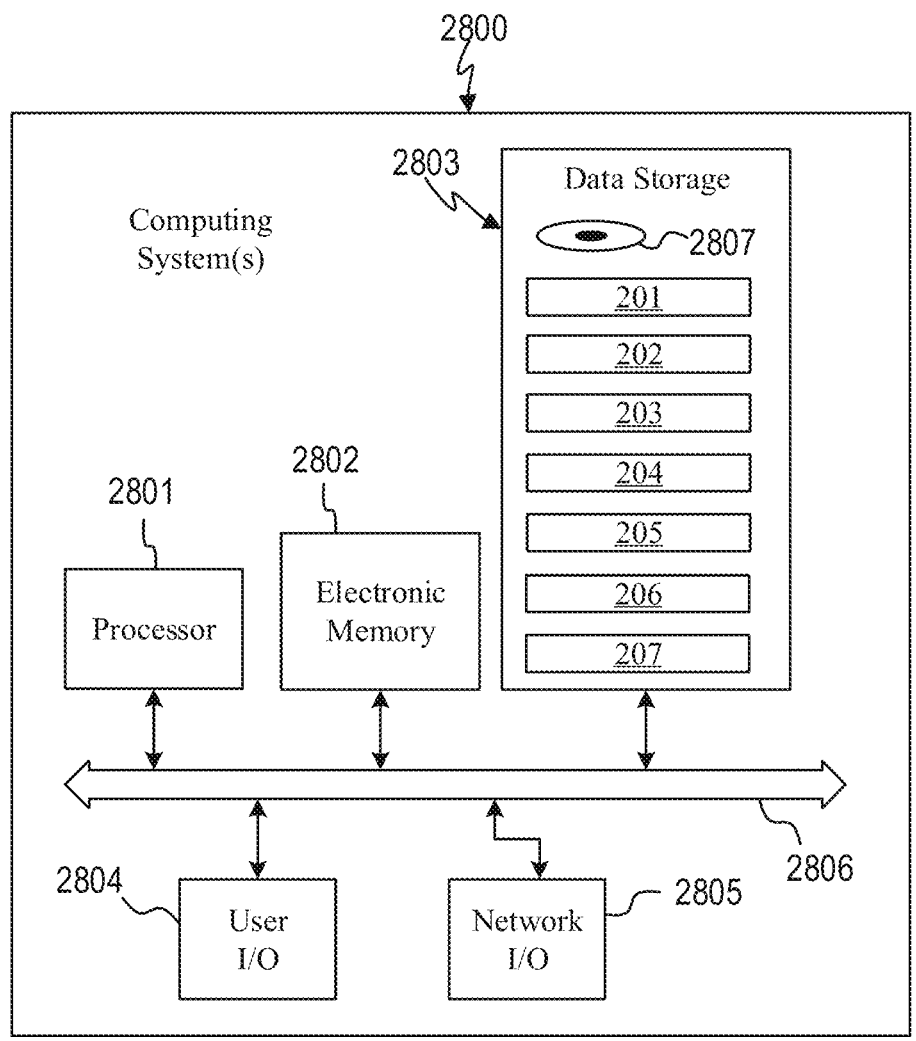
FIG. 28 is a simplified schematic diagram of a knowledge space computerized system for use in the example knowledge space shown in FIG. 1, in accordance with some embodiments.

FIG. 28 is a simplified schematic diagram of a knowledge space computing 2800 system for use in the example knowledge space 101 shown in FIG. 1 and for performing any of the functions described herein, in accordance with some embodiments. Other embodiments may use other components and combinations of components. For example, the computing system 2800 may represent one or more physical computer devices, such as web servers, rack-mounted computers, network storage devices, desktop computers, laptop/notebook computers, etc. In some embodiments implemented at least partially in a cloud network potentially with data synchronized across multiple geolocations, the computing system 2800 may include a cloud server or cloud database. In some embodiments, the functions of the computing system 2800 are enabled in a single computer device. In more complex implementations, some of the functions of the computing system 2800 are distributed across multiple computer devices, whether within a single server farm facility or multiple physical locations. In some embodiments wherein the computing system 2800 represents multiple computer devices, some of the functions of the computing device 2800 are implemented in some of the computer devices, while other functions are implemented in other computer devices. In the illustrated embodiment, the computing system 2800 generally includes at least one processor 2801, a main electronic memory 2802, a data storage 2803, a user I/O 2804, and a network I/O 2805, among other components not shown for simplicity, connected or coupled together by a data communication subsystem 2806.

The processor 2801 represents one or more central processing units on one or more printed circuit boards (PCBs) in one or more housings or enclosures. In some embodiments, the processor 2801 represents multiple microprocessor units in multiple computer devices at multiple physical locations interconnected by one or more data channels, such as the Internet, a WAN, a LAN, etc. When executing computer-executable instructions for performing the above-described functions of the knowledge space 101 in cooperation with the main electronic memory 2802, the processor 2801 becomes a special purpose computer for performing the functions of the instructions.

The main electronic memory 2802 represents one or more RAM modules on one or more PCBs in one or more housings or enclosures. In some embodiments, the main electronic memory 2802 represents multiple memory module units in multiple computer devices at multiple physical locations. In operation with the processor 2801, the main electronic memory 2802 stores the computer-executable instructions executed by, and data processed by, the processor 2801 to perform the above-described functions of the knowledge space 101.

The data storage 2803 represents or comprises any appropriate number or combination of internal or external physical mass storage devices, such as hard drives, optical drives, network-attached storage (NAS) devices, flash drives, etc. In some embodiments, the data storage 2803 represents multiple mass storage devices in multiple computer devices at multiple physical locations. The data storage 2803 generally provides persistent storage 2807 (e.g., a non-transitory computer readable medium) for the programs (e.g., computer-executable instructions) and data used in operations described above for the knowledge space 101 (e.g., operations of the processor 2801 and the main electronic memory 2802), such as, but not limited to, the document database 201, the reference system creation component 202, the base map creation component 203, the inference server component 204, the reference system API 205, the Base Map API 206, and the map server component 207, among others not shown for simplicity. Under control of these programs and using this data, the processor 2801, in cooperation with the main electronic memory 2802, performs the above-described functions for the knowledge space 101.

The user I/O 2804 represents one or more appropriate user interface devices, such as keyboards, pointing devices, displays, etc. In some embodiments, the user I/O 2804 represents multiple user interface devices for multiple computer devices at multiple physical locations. A user of the knowledge space 101, for example, may use these devices to access, setup and control the computing system 2800 to perform any or all of the above-described functions.

The network I/O 2805 represents any appropriate networking devices, such as network adapters, etc. for communicating through a network, such as the Internet, a WAN, a LAN, etc. In some embodiments, the network I/O 2805 represents multiple such networking devices for multiple computer devices at multiple physical locations for communicating through multiple data channels.

The data communication subsystem 2806 represents any appropriate communication hardware for connecting the other components in a single unit or in a distributed manner on one or more PCBs, within one or more housings or enclosures, within one or more rack assemblies, within one or more physical facilities, etc.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method comprising:
receiving, by a processor, content of first text documents;
training, by the processor, multiple topic models based on the content of the first text documents;
filtering and harmonizing, by the processor, the multiple topic models;
performing, by the processor, topic labeling for the multiple topic models;
producing, by the processor, topic model inferencers for the multiple topic models;
loading, by the processor, of the topic model inferencers;
loading, by the processor, of a base map model;
accessing, by the processor, content of second text documents;
providing, by the processor, a reference system API;
providing, by the processor, a base map API;
storing, by a database server, the topic model inferencers;
storing, by the database server, the second text documents;
storing, by the database server, reference system scores;
storing, by the database server, the base map model;
storing, by the database server, map scores;
computing, by the processor, the reference system scores by accessing the topic model inferencers and performing inferencing on the second text documents; and
computing, by the processor, the map scores by accessing the base map model and the reference system scores.

2. A method comprising:
receiving, by a processor, content of first text documents;
training, by the processor, multiple topic models based on the content of the first text documents;
filtering and harmonizing, by the processor, the multiple topic models;
performing, by the processor, topic labeling for the multiple topic models;
producing, by the processor, topic model inferencers for the multiple topic models;
loading, by the processor, of the topic model inferencers;
loading, by the processor, of a base map model;
accessing, by the processor, content of second text documents;
providing, by the processor, a reference system API; and
providing, by the processor, a base map API;
wherein the base map API comprises using an application server to produce a query response to a text input by:
producing an overlay reference system score by accessing the topic model inferencers and performing topic inference on a text string extracted from the text input;
producing an overlay map score by computing a similarity measure between the overlay reference system score and reference system scores associated with base map elements of the base map model; and
constructing a response geometry using the overlay map score and a geometry of the base map elements.

3. The method of claim 2, wherein the response geometry is constructed by analyzing the overlay map score and utilizing the geometry of one or more of the base map elements to create point objects, line objects, area objects, or landscape objects.

4. A method comprising:
receiving, by a processor, content of first text documents;
training, by the processor, multiple topic models based on the content of the first text documents;
filtering and harmonizing, by the processor, the multiple topic models;
performing, by the processor, topic labeling for the multiple topic models;
producing, by the processor, topic model inferencers for the multiple topic models;
loading, by the processor, of the topic model inferencers;
loading, by the processor, of a base map model;
accessing, by the processor, content of second text documents;
providing, by the processor, a reference system API; and
providing, by the processor, a base map API;
wherein the reference system API comprises using an application server to respond to either a text-based query, a document-based query, or a map-based query, with a query response being produced using processes that comprise:
determining a query reference system score;
computing a similarity value between the query reference system score and reference system scores stored by a database server;
retrieving document identifiers for selected text documents from the second text documents whose similarity value compared to the query reference system score falls within user-definable upper and lower bounds;
obtaining document metadata by using the document identifiers to find the selected text documents stored by the database server;
obtaining document geometry by using document identifiers to find map scores for the selected text documents stored by the database server; and
constructing the query response containing geometry information and metadata for the selected text documents.

5. The method of claim 4, wherein determining the query reference system score in response to the text-based query comprises:
extracting a text string from the text-based query;
accessing the topic model inferencers; and
performing topic inferencing on the text string using the topic model inferencers.

6. The method of claim 4, wherein determining the query reference system score in response to the document-based query comprises:
extracting a document identifier from the document-based query;

using the document identifier to find a document reference system score among the reference system scores stored by the database server; and using the found document reference system score as the query reference system score.

7. The method of claim 4, wherein determining the query reference system score in response to the map-based query comprises:

extracting query geometry from the map-based query;

performing spatial overlay between the query geometry and a target geometry to find matching query targets; and using the matching query targets to find matching documents from among the documents stored by the database server.

8. The method of claim 7, wherein a set of query targets is identical to a set of the second text documents being queried and the spatial overlay between the query geometry and the target geometry directly identifies the matching documents.

9. The method of claim 7, wherein a set of query targets is not identical to a set of the second text documents being queried and a process for finding matching documents comprises:

retrieving the reference system scores of matched query targets; and aggregating the retrieved reference system scores into the query reference system score.

10. The method of claim 7, wherein a set of query targets is not identical to a set of the second text documents being queried and a process for finding matching documents comprises:

extracting one or more query objects from the map-based query;

performing the spatial overlay between each query object and the target geometry to find the matching query targets;

retrieving, for each matching query target, its target reference system score;

computing, for each target reference system score, the similarity value to each of the reference system scores and filtering documents within user-definable bounds of similarity;

forming one local document set for each query object by combining sets of documents associated with individual query targets through local logic operators and local numeric operators;

forming a global document set by combining the sets of documents associated with each local document set through global logic operators and global numeric operators; and transforming the global document set into the query response by retrieving geometry information and metadata for the selected text documents.

11. The method of claim 10, wherein the map-based query contains positive query objects and negative query objects that are combined using a process that comprises:

extracting from the map-based query one or more of the positive query objects;

extracting from the map-based query one or more of the negative query objects;

creating a positive global document set by using the positive query objects;

creating a negative global document set by using the negative query objects;

forming the global document set by combining the positive global document set and the negative global document set through negative logic operators and negative numeric operators; and transforming the global document set into the query response by retrieving geometry information and metadata for documents.

12. The method of claim 10, wherein computing for each target reference system score the similarity to each of the reference system scores comprises a look-up of target-to-document similarity, which comprises accessing inverted map scores.

\* \* \* \* \*